(12) United States Patent
Akyildiz

(10) Patent No.: US 12,116,918 B2
(45) Date of Patent: Oct. 15, 2024

(54) EXHAUST SYSTEM AND COMPONENTS THEREOF

(71) Applicant: ECC TEC MSJ INCORPORATED, Boca Raton, FL (US)

(72) Inventor: Saban Akyildiz, Boca Raton, FL (US)

(73) Assignee: ECC TEC MSJ INCORPORATED, Boca Raton, FL (US)

( * ) Notice: Subject to any disclaimer, the term of this patent is extended or adjusted under 35 U.S.C. 154(b) by 18 days.

(21) Appl. No.: 18/512,403

(22) Filed: Nov. 17, 2023

(65) Prior Publication Data

US 2024/0093627 A1    Mar. 21, 2024

Related U.S. Application Data

(63) Continuation of application No. 18/267,261, filed as application No. PCT/US2022/040366 on Aug. 15, 2022.

(Continued)

(51) Int. Cl.
*F01N 3/20* (2006.01)
*B01D 53/86* (2006.01)
(Continued)

(52) U.S. Cl.
CPC ....... *F01N 3/2013* (2013.01); *B01D 53/8696* (2013.01); *B01D 53/9431* (2013.01);
(Continued)

(58) Field of Classification Search
CPC ............ B01D 53/8696; B01D 53/9431; B01D 53/9495; B01D 2258/01; B01D 2258/02;
(Continued)

(56) References Cited

U.S. PATENT DOCUMENTS

| 3,956,614 A | 5/1976 | Hervert |
| 4,276,066 A | 6/1981 | Bly |

(Continued)

FOREIGN PATENT DOCUMENTS

| CN | 2597684 Y | 1/2004 |
| CN | 205948865 U | 2/2017 |

(Continued)

OTHER PUBLICATIONS

U.S. Appl. No. 18/209,780, filed Jun. 14, 2023.

(Continued)

*Primary Examiner* — Dapinder Singh
(74) *Attorney, Agent, or Firm* — Dentons US LLP

(57) ABSTRACT

A heater for an exhaust system that includes a housing having a connector coupled to the exterior thereof, a first terminal and a second terminal that are each disposed to the interior of the housing and electrically coupled to the connector, a heating element coupled to the first and second terminals, a heating wire coupled to the first and second terminals, and a plurality of heating rods inserted into the heating element to conduct heat from the heating wire throughout the heating element, wherein the connector receives power from an external power supply to supply electrical current to the heating element and the heating wire and wherein at least one of the heating rods supports the heating wire. The combination of elements are configured to heat and disrupt the flow of exhaust gases and aid in removing and/or reducing toxic gases and pollutants from the exhaust system.

33 Claims, 36 Drawing Sheets

Related U.S. Application Data

(60) Provisional application No. 63/233,019, filed on Aug. 13, 2021.

(51) Int. Cl.

| | | |
|---|---|---|
| *B01D 53/94* | (2006.01) | |
| *F01N 3/035* | (2006.01) | |
| *F01N 3/28* | (2006.01) | |
| *F01N 13/18* | (2010.01) | |

(52) U.S. Cl.
CPC ......... *B01D 53/9495* (2013.01); *F01N 3/035* (2013.01); *F01N 3/206* (2013.01); *F01N 3/208* (2013.01); *F01N 3/2892* (2013.01); *F01N 13/1805* (2013.01); *B01D 2258/01* (2013.01); *B01D 2258/02* (2013.01); *F01N 2610/1406* (2013.01); *F01N 2610/1453* (2013.01); *F01N 2900/1602* (2013.01)

(58) Field of Classification Search
CPC ...... F01N 3/2013; F01N 3/208; F01N 3/0892; F01N 3/2066; F01N 3/035; F01N 3/023; F01N 13/1805; F01N 13/009; F01N 9/00; F01N 2610/1406; F01N 2610/1453; F01N 2900/1602; F01N 2900/1404; F01N 2900/1811; F01N 2240/16; F01N 2240/20; F01N 2560/06; Y02A 50/20; Y02T 10/12; Y02T 10/40

See application file for complete search history.

(56) References Cited

U.S. PATENT DOCUMENTS

| | | | |
|---|---|---|---|
| 4,450,681 A | 5/1984 | Sato | |
| 4,945,721 A | 8/1990 | Cornwell et al. | |
| 5,063,029 A | 11/1991 | Mizuno et al. | |
| 5,234,668 A | 8/1993 | Harada et al. | |
| 5,264,186 A | 11/1993 | Harada et al. | |
| 5,423,904 A | 6/1995 | Dasgupta | |
| 5,465,573 A | 11/1995 | Abe et al. | |
| 5,569,455 A * | 10/1996 | Fukui | B01J 35/33 |
| | | | 422/174 |
| 5,582,805 A | 12/1996 | Yoshizaki et al. | |
| 6,585,940 B2 | 7/2003 | Abe et al. | |
| 8,309,032 B2 * | 11/2012 | Plati | B01D 53/9454 |
| | | | 422/177 |
| 9,383,119 B2 * | 7/2016 | Kida | F24H 9/02 |
| 11,149,607 B2 | 10/2021 | Akyildiz | |
| 11,187,131 B2 * | 11/2021 | Brunel | F01N 3/2857 |
| 11,628,401 B2 * | 4/2023 | Beall | H05B 3/12 |
| | | | 219/202 |
| 2001/0043890 A1 | 11/2001 | Son | |
| 2002/0053283 A1 | 5/2002 | Akyildiz | |
| 2004/0118111 A1 | 6/2004 | Covit | |
| 2006/0204408 A1 | 9/2006 | Son | |
| 2009/0074630 A1 * | 3/2009 | Gonze | F01N 13/009 |
| | | | 422/174 |
| 2011/0162348 A1 * | 7/2011 | Kim | F01N 13/009 |
| | | | 60/303 |
| 2013/0061576 A1 | 3/2013 | Gonze et al. | |
| 2017/0218823 A1 | 8/2017 | Crawford | |
| 2017/0226909 A1 | 8/2017 | Hirth et al. | |

FOREIGN PATENT DOCUMENTS

| | | |
|---|---|---|
| CN | 206762544 | 12/2017 |
| DE | 102009014371 A1 | 9/2010 |
| EP | 153157 | 8/1985 |
| EP | 967174 | 12/1999 |
| EP | 1967712 | 9/2008 |
| GB | 2512845 | 10/2014 |
| JP | 2009097359 A | 5/2009 |
| WO | 9421900 | 9/1994 |
| WO | 52309 | 9/2000 |
| WO | 0157370 | 8/2001 |
| WO | 2017198292 | 11/2017 |

OTHER PUBLICATIONS

Mohit A. Bagul et al., "Emission Reduction using Magnetic Pollution Filter", International Journal of Innovative Research in Science, Engineering and Technology, vol. 5, Issue 7, Jul. 2016.

Ali S. Faris et al., "Effects of Magnetic Field on Fuel Consumption and Exhaust Emissions in Two-Stroke Engine", Energy Procedia, vol. 18, pp. 327-338, 2012.

Karthik Dhayakar et al., "Effect of Twin Sparkplug in Two Stroke IC Engine", International Journal of Science and Research (IJSR), vol. 4, Issue 2, pp. 2147-2153, Feb. 2015.

Adel Mahmmod Salih et al., "The effect of magnetic field on the boiler performance fueled with diesel", International Journal of Scientific & Engineering Research (IJSER), vol. 7, Issue 2, pp. 406-410, Feb. 2016.

H. R. Jackson et al., "Catalytic NOx Reduction Studies", SAE Technical Paper, 730568, 1973, doi: 10.4271/730568.

International Search Report and Written Opinion of Application No. PCT/US2019/063387 dated Feb. 7, 2020.

* cited by examiner

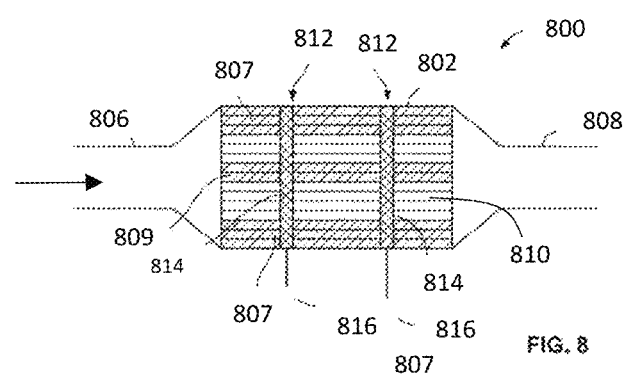
FIG. 8
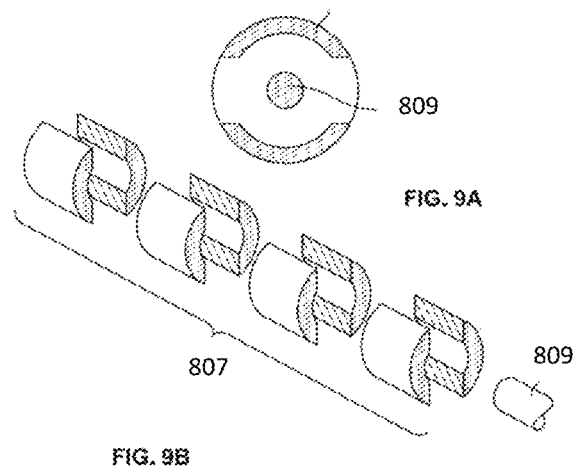
FIG. 9A
FIG. 9B

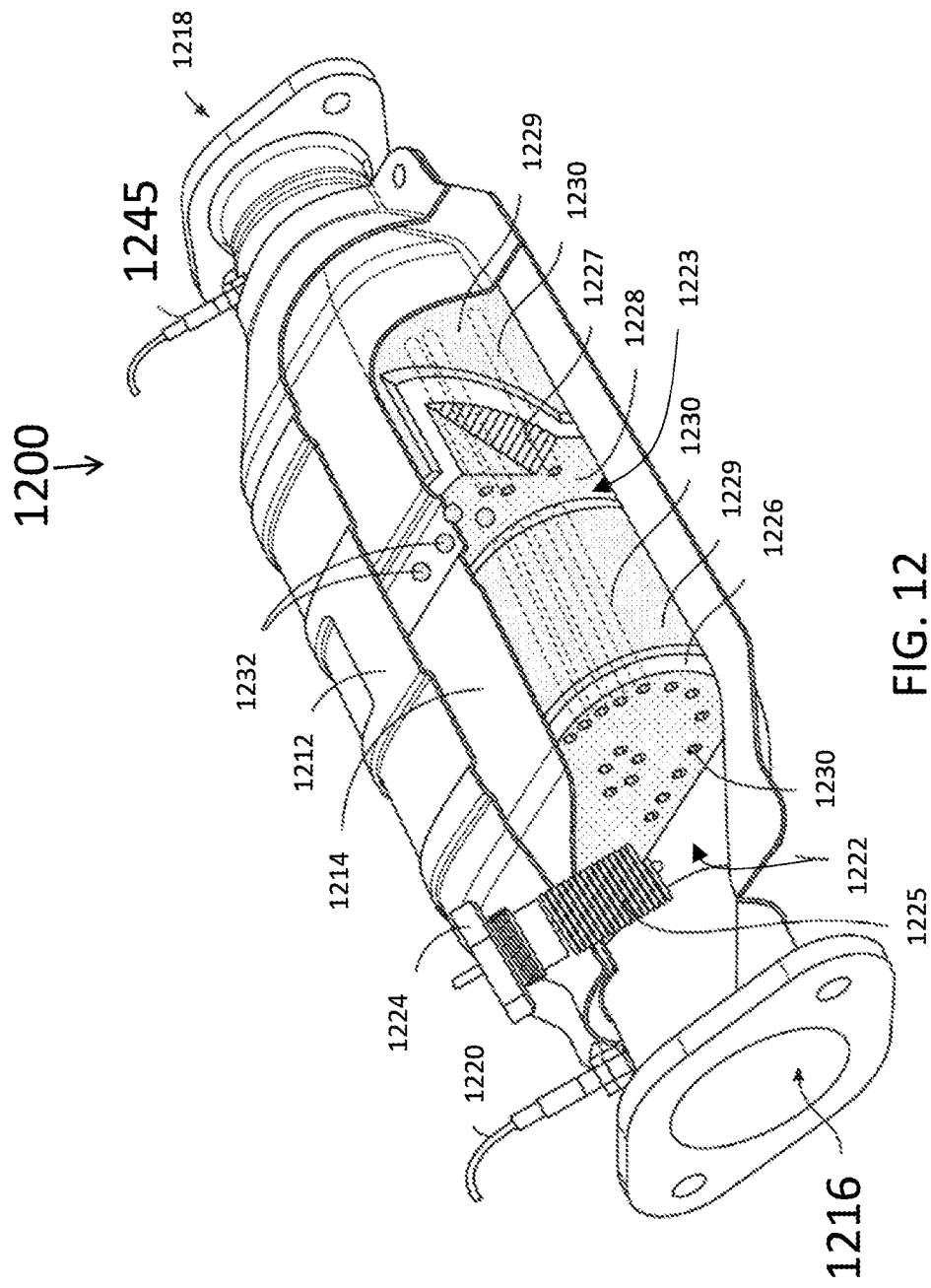

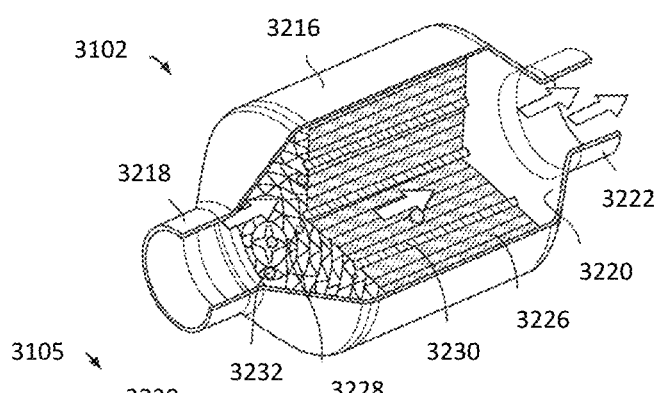
FIG. 31
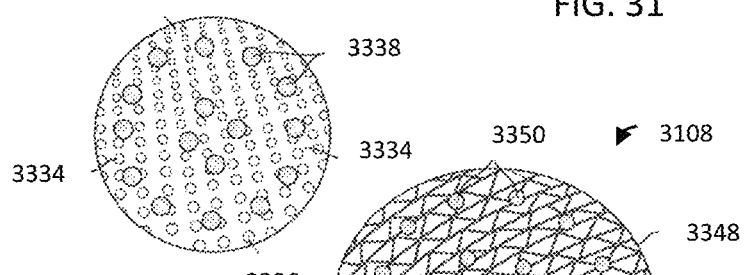
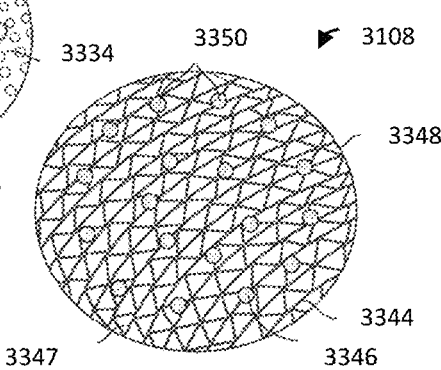
FIG. 32
FIG. 33

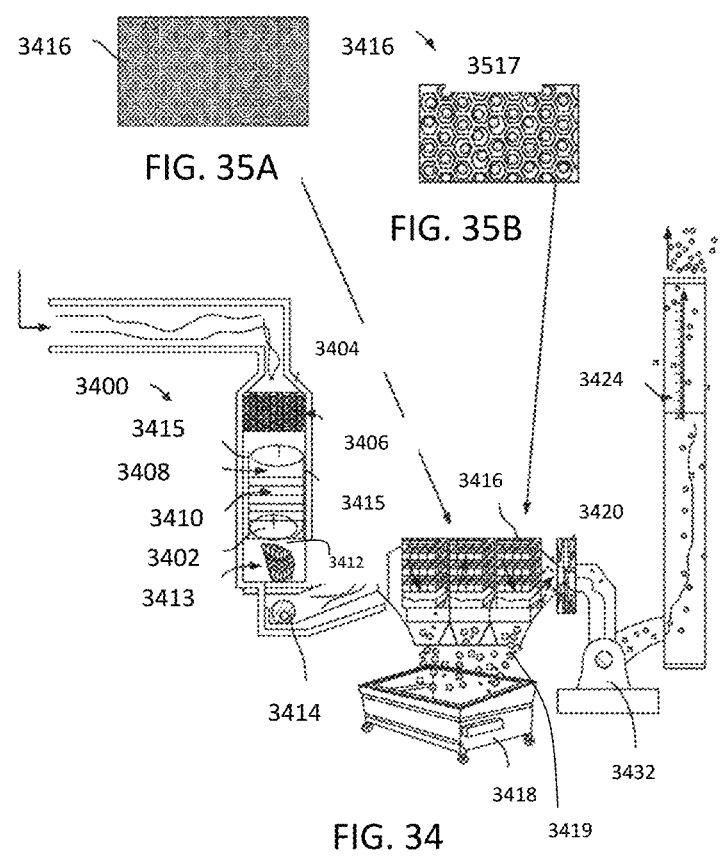

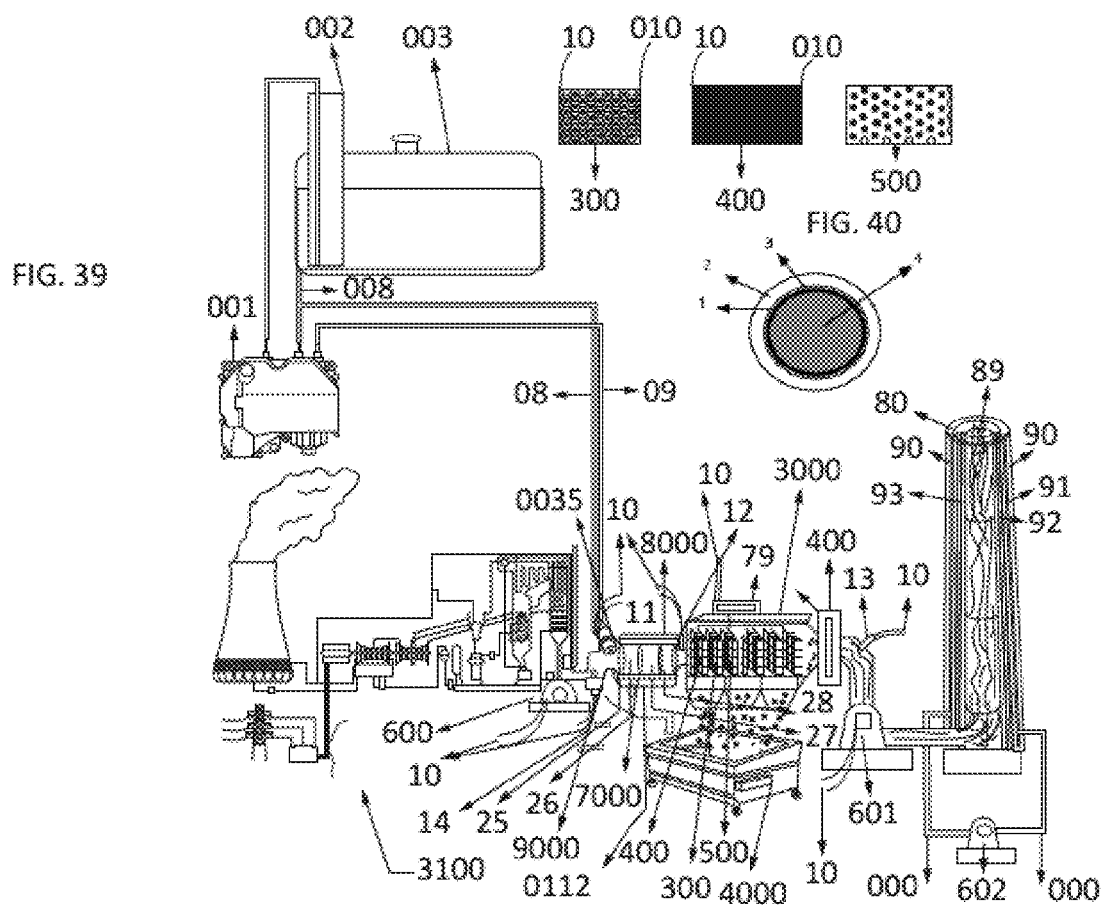

EXHAUST SYSTEM AND COMPONENTS THEREOF

CROSS-REFERENCE TO RELATED APPLICATION

This application is a continuation application of U.S. patent application Ser. No. 18/267,261, filed on Jun. 14, 2023, which is a National Stage of PCT/US22/40366, filed on Aug. 15, 2022, which claims priority to U.S. Provisional Application No. 63/233,019, filed on Aug. 13, 2021 under 35 U.S.C. § 119(e), the entire contents of all of which are hereby incorporated by reference.

FIELD OF THE INVENTION

The present invention relates generally to exhaust systems and more particularly to improvements to exhaust systems for removing and/or reducing harmful exhaust gases, particulate matters, and other debris that may be generated or emitted from an engine.

BACKGROUND OF THE INVENTION

Details in the background section do not constitute the related art but are given only as background information concerning the subject matter of the present disclosure.

Among the air pollutants gasoline and diesel engines emit are oxides of nitrogen-NO and $NO_2$, generically abbreviated as NOx. Nitrogen oxides have harmful direct effects on human health, and indirect effects through the damage they do to agricultural crops and ecosystems. Vehicle NOx emissions have been regulated since the 1960s.

NOx reacts with atmospheric chemicals to form secondary fine particulate matter (PM2.5), or soot. Exposure to PM2.5 can cause stroke, ischemic heart disease, chronic obstructive pulmonary disease, lung cancer, and lower respiratory infections. When combined with volatile organic compounds and sunlight, NOx helps form ground-level ozone, a major component of smog. Ozone can cause or exacerbate chronic lung diseases like asthma, chronic obstructive pulmonary disease, or emphysema, especially among vulnerable populations like children and the elderly, for whom it may prove deadly.

NOx emissions also affect ecosystems and agricultural crops. Ozone pollution is toxic to plants and contributes to loss of biomass, crop yields, and forest productivity. Such pollution reduces solar irradiation, decreasing photosynthesis in plants and reducing their biomass. The loss in biomass means less carbon is sequestered in plants, leaving more $CO_2$ in the atmosphere. Such pollution can directly change the way ecosystems work by affecting the exchange of $CO_2$ and water vapor across the surface of leaves, which can have significant effects on hydrology-even changing stream flows.

NOx in diesel exhaust is a particularly hard problem. Creation of some amount of NOx in the combustion process is unavoidable. The basic problem with NOx emissions from vehicles is, therefore, first to minimize the amount created, and second to remove NOx from the exhaust. The first task is mainly accomplished by lowering combustion temperature. The second is accomplished using an aftertreatment device to cause a chemical reaction reducing NOx in the exhaust to nitrogen and water and/or $CO_2$.

Too much oxygen present in the vehicle exhaust makes it more difficult for that chemical reaction to occur. Problematically, too little oxygen makes it more difficult to get rid of other pollutants in the exhaust, unburned hydrocarbons and carbon monoxide.

Diesel engines, because of their compression-ignition design, use much more combustion air, and diesel engine exhaust consequently contains much more oxygen than gasoline engine exhaust (more oxygen in, more oxygen out). That is an unfavorable environment for the chemical reaction reducing NOx to take place in. The technical challenges related to NOx control presented by light-duty and heavy-duty diesel vehicles differ. The relative lack of physical space in which to install emissions-control equipment is a key challenge for cars, especially small cars.

Exhaust systems for fossil fuel burning engines (e.g., internal combustion engines) typically include one or more catalytic converters and a muffler connected thereto. The exhaust systems with one or more catalytic converters include, but are not limited to, various vehicles (e.g., automobiles, trucks, buses, all-terrain vehicles (ATVs), etc.), as well as electric generators, forklifts, mining equipment, trains, motorcycles, jet skis, snow mobiles, leaf blowers, aircraft, wood stoves, etc.

Generally, a catalytic converter is configured to reduce and/or convert toxic gases and pollutants of exhaust gas into less toxic pollutants by catalyzing a redox reaction (oxidation or reduction).

Modern gasoline-engine vehicles are equipped with a three-way catalytic converter as part of the exhaust system. It's called a three-way catalytic converter because it controls three pollutants: carbon monoxide (CO), which combines with oxygen in the converter to become $CO_2$; unburned hydrocarbons, which combine with oxygen to produce $CO_2$ and water vapor ($H_2O$); and NOx, which is reduced over the catalyst to nitrogen and water and/or $CO_2$.

Three-way catalytic converters are effective when an engine operates within a narrow band of air-fuel ratios near stoichiometry such that the exhaust gas oscillates between rich (excess fuel) and lean (excess oxygen) conditions, which may be between about 14.6 and 14.8 parts air to 1 part fuel by weight for gasoline. The ratios for liquefied petroleum gas (LPG), natural gas, and ethanol fuels is each slightly different, requiring modified fuel system settings when using those fuels. However, conversion efficiency falls very rapidly when the engine is operated outside of the narrow band of air-fuel ratios.

Because the problem of controlling NOx in diesel exhaust is more complicated, diesel vehicles require different approaches. To begin with, most modern diesel vehicles incorporate exhaust-gas recirculation (EGR) into their design. EGR systems recycle a portion of the exhaust gas back into the combustion chamber, where it combines with "fresh" intake air. This reduces the oxygen content and increases the water vapor content of the combustion mixture. That has the effect of reducing peak combustion temperature. Because more NOx is created as peak combustion temperature rises, EGR effectively reduces the amount of NOx produced by the engine. However, recycling too much of the exhaust gas increases PM2.5 and reduces fuel efficiency, so proper design entails a delicate balance.

EGR addresses the problem of controlling NOx emissions inside the engine cylinder, at the point where NOx forms. Two methods are used in diesel vehicles to control NOx after the exhaust has permanently exited the engine. A lean NOx trap (LNT) uses a catalyst to temporarily store NOx from the exhaust. At intervals (ranging from seconds to minutes, depending on operating conditions), the engine controller briefly increases the proportion of fuel in the air-fuel mixture being combusted. The exhaust from burning the richer air-fuel mixture contains proportionally less oxygen and more unburned hydrocarbons, and the stored NOx at the catalyst reacts with hydrocarbons in the exhaust to produce nitrogen and water and/or $CO_2$. Selective catalytic reduction (SCR) reduces NOx over a catalyst using ammonia as the reductant. The ammonia is typically supplied in the form of urea, which must be stored in solution in a tank on the vehicle. For reasons relating to engine size, operating characteristics, and the cost of raw materials for the catalyst, as a practical matter heavy-duty vehicles being produced today use only SCR systems and light-duty vehicles can use either SCR or LNT.

EGR, LNT, and SCR are active systems, in contrast to the three-way catalytic converter. Their operation is controlled by the vehicle's engine control unit (which determines, for example, the intervals at which urea solution is injected into the exhaust for SCR, or the air-fuel mixture is enriched to regenerate the LNT) and they come with maintenance requirements and costs both direct (e.g., a service charge to refill a urea tank) and indirect (slightly reduced fuel economy from running the engine rich periodically or from recirculating exhaust gas).

When operating a gasoline or diesel vehicle at low temperatures (e.g., during engine cold-start), exhaust systems devices are generally not catalytically active enough to reduce engine emissions, such as hydrocarbons and NOx. Cold-start emissions—the dangerous gases produced during the first 60 seconds or so after ignition—represent the most toxic segment of the engine operating cycle. In fact, more than 70 percent of all the harmful gas emissions from a single average drive come during this cold-start immediately after start-up. That is because catalysts typically do not reach full efficiency until the engine exhaust gas heats the catalyst up to the temperature at which catalytic reactions are initiated within the catalytic converter. Since catalysts require a certain temperature (typically above 300° C.) to work to full efficiency, emissions are significantly higher during the warm-up phase of the car. The duration of this period and the emissions produced depend on the ambient temperature as well as on the initial temperature of the car's propulsion systems. Indeed, for gasoline cars, in average real-world driving conditions the majority of the CO (carbon monoxide) and HC (hydrocarbon) total emissions are due to cold-start extra emissions. Moreover, the cold-start emissions increase considerably at lower ambient temperatures. In contrast, cold-start emissions of diesel cars are lower than those of gasoline cars. Thus there exists a need to heat the catalytic converter fast such that catalytic ignition occurs almost from the moment of engine start-up.

The present disclosure is directed to overcoming one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE INVENTION

According to certain aspects of the disclosure, systems and methods are disclosed for improving removal and/or reduction of harmful exhaust gases, particulate matters, and other debris from an exhaust system.

In one embodiment, there is a heater for an exhaust system, the heater including a housing including a connector coupled to the exterior of the housing, and a first terminal and a second terminal, each disposed to the interior of the housing and electrically coupled to the connector; a heating element coupled to the first and second terminals; a heating wire coupled to the first and second terminals; and a plurality of heating rods inserted through openings in the heating element to conduct heat from the heating wire throughout the heating element, at least one of the heating rods to support the heating wire, wherein the connector is configured to receive power from a power supply that is external from the heater to supply electrical current to the heating element and the heating wire.

In one embodiment, the heating element includes a catalytic coating having two or more layers of noble metals.

In one embodiment, the noble metals include two or more of platinum, titanium, palladium, rhodium and gold.

In one embodiment, the catalytic coating includes: a first layer comprising titanium; a second layer comprising palladium that is disposed on the first layer; a third layer comprising rhodium that is disposed on the second layer; and an outermost layer comprising a ceramic material.

In one embodiment, the heating wire is displaced in at least two planes parallel to each other.

In one embodiment, the heating wire includes a first heating wire and a second heating wire, the first heating wire displaced from the second heating wire.

In one embodiment, the displacement between the first and second heating wires is orthogonal to the planes of the first and second heating wires.

In one embodiment, one or more of the heating rods include a rod portion and a tip portion.

In one embodiment, the tip portion is formed of an insulative material such that electrical current does not transfer from the heating wire to the rod.

In one embodiment, one or more of the heating rods includes a fastener disposed at the tip portion thereof, the fastener configured to support the heating wire.

In one embodiment, the fastener is formed of an insulative material such that electrical current does not transfer from the heating wire to the rod.

In one embodiment, the heating rods include a first length heating rod having a first length and a second length heating rod having a second length that is different than the first length, wherein the first length heating rod supports the heating wire at a first displacement and the second length heating rod supports the heating wire at a second displacement.

In one embodiment, the heating rods have at least two lengths.

In one embodiment, the heater is provided inside a catalytic converter.

In one embodiment, the heater is provided inside a cavity of an exhaust pipe of the exhaust system.

In one embodiment, the exhaust pipe is located between at least one of an exhaust manifold and a catalytic converter, or the catalytic converter and a selective catalytic reduction system (SCR), or the SCR and a muffler of the exhaust system.

In one embodiment, the exhaust pipe is located between at least one of a diesel oxidation catalyst and a diesel particulate filter (DPF), or between the DPF and a selective catalytic reduction system (SCR), or between the SCR and a muffler of the exhaust system.

In one embodiment, the exhaust pipe further includes a dosing system having a dosing solution injector and a dosing solution reservoir that houses a dosing solution, wherein the dosing solution injector is configured to spray the dosing solution towards the heater.

In one embodiment, the heater is configured to receive signals from a controller to control an amount of current supplied to the heater and the timing in which the current is supplied to the heater.

In one embodiment, the dosing system is configured to receive signals from the controller to control a timing and a duration of the dosing solution spray, whereby the supplied current and the timing and the duration of the dosing solution spray are based on one or more sensors located within the exhaust pipe.

In one embodiment, the exhaust pipe further includes a plurality of magnets arranged adjacent to an exterior surface of the exhaust pipe to aid in disruption and slowing of the flow of exhaust gases in the cavity of the exhaust pipe.

In one embodiment, the exhaust pipe includes a second surface positioned outside of the exterior surface and the plurality of magnets are arranged between the second surface and the exterior surface of the exhaust pipe.

In one embodiment, the plurality of magnets are neodymium magnets.

In one embodiment, the heating wire are formed of nickel and chromium.

In one embodiment, the connector is isolated from the housing by a ceramic spacer.

In one embodiment, the one or more of the openings of the heating element has a honeycomb or hexagonal shape.

In one embodiment, there is a structure that includes: an exhaust pipe configured to be coupled to an exhaust system component, the exhaust pipe including a heater disposed inside a cavity of the exhaust pipe, the heater including: a housing, a heating wire disposed inside the housing, and a connector attached to the housing and electrically connected to the heating wire, wherein the connector is configured to receive power from a power supply that is external from the heater to supply electrical current to the heating wire, whereby the heater is configured to heat gas inside the exhaust pipe to reduce toxic gases and/or particulate matter exiting the exhaust pipe.

In one embodiment, the exhaust system component includes one or more of the following: an exhaust manifold, a catalytic converter, a selective catalytic reduction system (SCR), a diesel oxidation catalyst, a diesel particulate filter (DPF), a selective catalytic reduction system (SCR), and a muffler.

In one embodiment, the exhaust pipe includes a plurality of magnets arranged adjacent to an exterior surface of the exhaust pipe to aid in disruption and slowing of the flow of exhaust gases in the cavity of the exhaust pipe.

In one embodiment, the exhaust pipe further includes a second surface positioned outside of the exterior surface and the plurality of magnets are disposed between the second surface and the exterior surface of the exhaust pipe.

In one embodiment, a structure includes a heater configured to be connected external to a component of a vehicle exhaust system, the heater including a housing, a heating element, and a sensor; and a magnet configured to be arranged adjacent to an exterior surface of the component to aid in disruption and slowing of the flow of exhaust gases in the component.

In one embodiment, the component is a catalytic converter.

In one embodiment, the component is one or more of the following: an exhaust manifold; a catalytic converter; a selective catalytic reduction system (SCR); a diesel oxidation catalyst; a diesel particulate filter (DPF); a selective catalytic reduction system (SCR); a muffler; and an exhaust system pipe.

In one embodiment, the heater includes a first heater configured to be connected external to a catalytic converter and a second heater configured to be connected external to a SCR.

In one embodiment, the heater further comprises a dosing system that includes a dosing solution injector and a dosing solution reservoir that houses a dosing solution, the dosing solution injector configured to spray the dosing solution towards the component.

In one embodiment, the sensor includes one or more temperature sensors and one or more gas sensors.

In one embodiment, the structure further includes a component gas sensor configured to be coupled to the component.

In one embodiment, the structure further includes an exhaust pipe gas sensor configured to be coupled to an exhaust pipe attached to an outlet port of the component.

In one embodiment, the structure further includes an exhaust pipe temperature sensor configured to be coupled to an exhaust pipe attached to an outlet port of the component.

Specific effects are described along with the above-described effects in the section of Detailed Description.

Aspects, features, and advantages of the present disclosure are not limited to those described above. It is understood that other aspects, features, and advantages not mentioned above can be clearly understood from the following description and can be more clearly understood from the embodiments set forth herein. Additionally, it is understood that various aspects, features, and advantages described herein can be realized via means and combinations thereof that are described in the appended claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 8 is a cross-sectional view of a catalytic converter, according to one or more embodiments of the present disclosure;

FIG. 9A is a cross-sectional view of one of the internal magnets of the catalytic converter of FIG. 8, according to one or more embodiments of the present disclosure;

FIG. 9B is an exploded view of the internal magnets of the catalytic converter of FIG. 8, according to one or more embodiments of the present disclosure;

FIG. 12 is a perspective cutaway view of a catalytic converter, according to one or more embodiments of the present disclosure;

FIG. 31 is a perspective cutaway view of an oxidation catalyst, according to one or more embodiments of the present disclosure;

FIG. 32 is an end view of a filter arranged in an oxidation catalyst, according to one or more embodiments of the present disclosure;

FIG. 33 is an end view of a filter arranged in a diesel particulate filter, according to one or more embodiments of the present disclosure;

FIG. 34 is an assembly view of an exhaust system for a coal related application, according to one or more embodiments of the present disclosure;

FIGS. 35A and 35B are front views of a filter arranged in the catalytic converter of the exhaust system of FIG. 35;

FIG. 39 is an assembly view of an exhaust system for an industrial power plant, according to one or more embodiments of the present disclosure;

FIG. 40 is a top view of the smoke stack shown in FIG. 34, according to one or more embodiments of the present disclosure.

DETAILED DESCRIPTION OF EMBODIMENTS OF THE INVENTION

Figure 1:
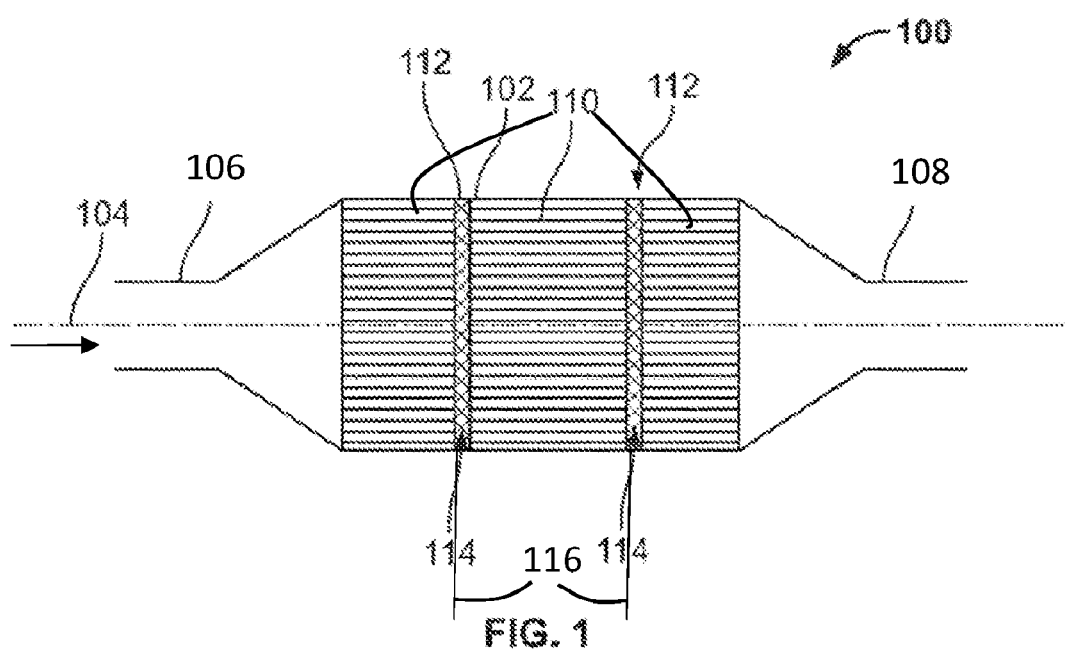
FIG. 1 is a cross-sectional view of a catalytic converter, according to one or more embodiments of the present disclosure.

The subject matter of the present disclosure will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of 5% of a stated or understood value.

With reference now to the drawings, and in particular to FIGS. 1-41, embodiments of exhaust systems and associated features thereof embodying the principles and concepts of the present disclosure will be described.

A catalytic converter includes one or more filters. The filter may be formed of ceramic and include openings that are honeycomb-shaped (not limited to any particular shape). In applications where particularly high heat resistance is required, metallic foil monolithic filters made of Kanthal (FeCrAl) may be used. Catalytic converters may include a catalyst coating formed of aluminum oxide, titanium dioxide, silicon dioxide, or a mixture of silica and alumina. The catalyst materials may be selected to form a rough, irregular surface, which greatly increases the surface area compared to the smooth surface of the bare substrate. This in turn maximizes the catalytically active surface available to react with the engine exhaust. Under lean engine operation, there may be excess oxygen and the reduction of NOx may not favored. Under rich conditions, the excess fuel may consume the available oxygen prior to the catalyst, thus only stored oxygen may be available for the oxidation function. Closed-loop control systems may be necessary because of the conflicting requirements for effective NOx reduction and HC oxidation. The control system may prevent the NOx reduction catalyst from becoming fully oxidized, yet replenish the oxygen storage material to maintain its function as an oxidation catalyst.

FIG. 1 illustrates a cross-sectional view of a catalytic converter 100 according to an embodiment of the present disclosure. The catalytic converter 100 may extend along a longitudinal (or horizontal) axis 104. The catalytic converter 100 may include an external shell 102, an inlet port 106, and an outlet port 108. One or more filters 110 may be disposed inside of the external shell 102. An internal structure having a plurality of spaces (or openings) 112 may be provided or arranged inside of the external shell 102. For example, as shown, the spaces 112 may be provided between or adjacent the one or more filters 110. One or more electrical heating elements 114, which are configured to heat the inside of the catalytic converter 100, may be arranged within the spaces 112. The heating elements 114 may include heating wires constructed of, for example, nichrome (NiCr) wires, but are not limited thereto. Electrical leads 116 may extend from a power supply (not shown in the figures for clarity of illustration) to supply electrical energy to the heating elements 114. The heating elements 114, by heating the inside of the catalytic converter 100, significantly and substantially improves the removal or reduction of harmful gases and particulate matters within the catalytic converter 100 compared to conventional catalytic converters. Although FIG. 1 is explained with respect to a catalytic converter, the components and embodiments of FIG. 1 may be directed to or incorporated into any other exhaust converter, for example, a selective catalyst reduction system, an oxidation catalyst, a diesel particulate filter, exhaust pipes, etc.

Figure 2A:
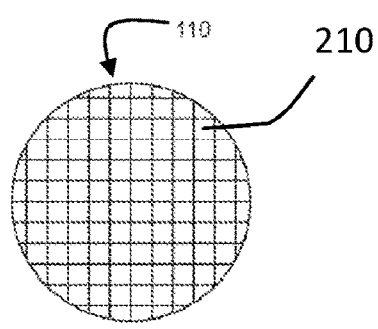
FIG. 2A is a side view of a filter of the catalytic converter of FIG. 1, according to one or more embodiments of the present disclosure.

FIG. 2A shows an end view of the filter 110. In one embodiment, the filter 110 may be, for example, a metallic or a ceramic filter including a plurality of honeycomb shaped openings 210. The openings 210 may be configured to communicate gas and/or particulate matters from one end to the opposite end of the filter 110. The shape and size of the openings 210 of the filter 110 may vary depending on the application of one or more exhaust systems of the present disclosure. In one embodiment, the size of the openings 210 for the filter 110 used in a gasoline engine system may be about 1/16 inch, but is not limited thereto. In another embodiment, the size of the openings 210 for the filter 110 used in a diesel engine system may be between about 1/8 inch to 1/4 inch, but is not limited thereto.

In one embodiment, the filter 110 may be coated with catalyst coating material to maximize or increase contact between the filter 110 and the toxic or harmful gases and particulate matters. The catalyst coating material may slow down the flow of toxic gases and particulate matters that may traverse from the inlet port 106 to the outlet port 108. Additionally, the catalyst coating material may help facilitate rapid heating of the catalytic converter 100. Additionally, the catalyst coating material may facilitate rapid heating of the catalytic converter 100. Embodiments of the catalyst coating and associated features thereof embodying the principles and concepts of the present disclosure are described hereinafter.

Figure 2B:
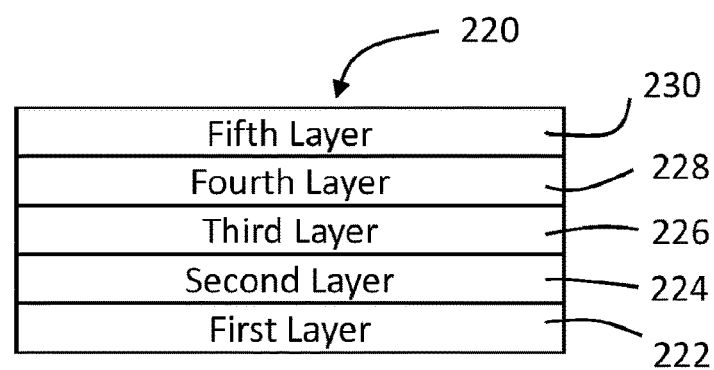
FIG. 2B is a cross-sectional view of a catalyst coating of the catalytic converter of FIG. 1, according to one or more embodiments of the present disclosure.

FIG. 2B shows a cross-sectional view of a catalyst coating 220, in accordance with an embodiment of the present disclosure. The catalyst coating 220 may include a plurality of layers 222-230. The plurality of layers may include, for example, a first layer 222, second layer 224, third layer 226, fourth layer 228, and a fifth layer 230. The first layer 222 may be provided on a surface of the filter 110 or comprise the surface material of the filter itself. The first layer 222 may include, for example, a ceramic material having a thickness of about 0.35 to 0.8 micrometer. The top layer—which is the fifth layer 230 in FIG. 2B, may also include, for example, a ceramic material having a thickness of 0.35 to 0.8 micrometer. The first and fifth layers 222, 230 comprising one or more ceramic materials may provide protection from potential impact or damage for the filter 110 and other layers of the catalyst coating 220. The thickness of the first and fifth layers 222, 230 are not limited thereto and depend on a particular application.

In one embodiment, the second, third, and fourth layers 224, 226, 228 may be sandwiched between the first layer 222 and the fifth layer 230. Further, the second, third, and fourth layers 224-228 may include noble metals. For example, the second layer 224 may include titanium, the third layer 226 may include palladium, and the fourth layer 228 may include rhodium. Additionally or alternatively, gold may be used in addition to the layers 222-230 or in combination with one or more of the layers 222-230. For example, gold may be sprayed (e.g., by spraying scattering spots or dots of gold) in between or on top of the layers 222-230. When gold is utilized in the catalyst coating 220, each or a combination of the layers 222-230 may be made thinner. That is, the effectiveness of the catalyst coating 220 may be improved by using gold in the layers 222-230. In one exemplary embodiment of the present disclosure, the filter 110 used for a gasoline engine system may include honeycomb shaped openings coated with platinum, palladium, rhodium, and ceramic. Additionally or alternatively, gold may be used. Similarly, the filter 110 for a diesel engine system may include hexagonal or honeycomb openings coated with platinum, palladium, rhodium, and ceramic. Geometric surface area can be an important factor for catalytic performance. While not limited thereto, hexagonal shaped openings provide better thermal mass efficiency than square shaped openings.

The thickness of the second, third and fourth layers may be 0.35-0.80 micrometers; however the thickness of each layer is not limited thereto and depends on a particular application. In one embodiment, the filter 110 may be baked at a predetermined temperature after each layer of the catalyst coating 220 is applied. Although five layers are shown in FIG. 2B for the catalyst coating 220, the number of layers for the catalyst coating 220 may not be limited to five. Additionally, the order of the second to fourth layers 224-228 may be interchangeable. However, the first and fifth layers 222, 230 may be disposed preferably on the outer layers of the second to fourth layers 224-228 to provide protection for the noble metal layers (e.g., layers 224-228) and the filter 110. The catalyst coating 220 according to embodiments of the present disclosure rapidly heats up the filter 110 and dramatically reduces or removes undesirable exhaust gases and particulate matters.

In embodiments, the catalyst coating 220 may retain its surface area and may prevent sintering of the catalytic metal particles at high temperatures, for example, approximately 1000° C. or greater. As described above, the catalyst materials may be a mix of precious or noble metals. In some embodiments, platinum may be selected as the main active catalyst. Alternatively, platinum may not be used in some embodiments. Whether the platinum is used may be determined, for example, based on any unwanted additional reactions and/or costs. Additionally or alternatively, palladium and rhodium may be included in the catalyst coating 220. In one embodiment, rhodium may be included in the catalyst coating 220 used for a reduction catalyst, and palladium may be included in the coating materials used for an oxidation catalyst. In one embodiment, platinum may be included in the catalyst coatings to facilitate reduction and/or oxidation. Additionally or alternatively, cerium, copper, iron, manganese, and nickel may be included in the coating materials to facilitate reduction and/or oxidation.

Figure 3:
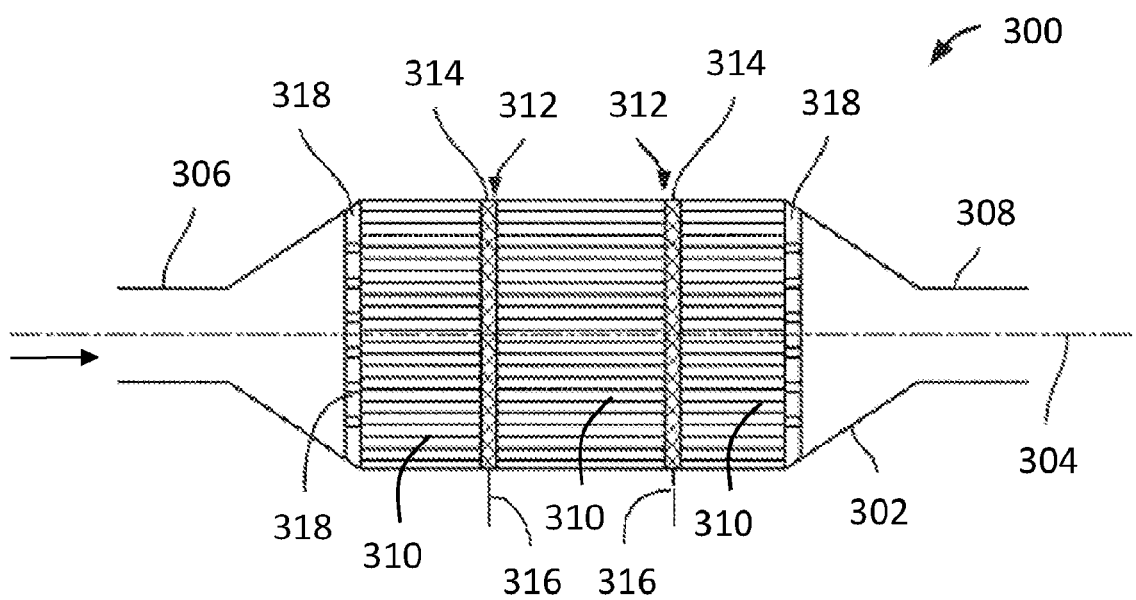
FIG. 3 is a cross-sectional view of a catalytic converter, according to one or more embodiments of the present disclosure.

FIG. 3 illustrates a catalytic converter 300 according to an embodiment of the present disclosure. The catalytic converter 300 may include an external shell 302, an inlet port 306, an outlet port 308, one or more filters 310, and a plurality of spaces 312. In this embodiment, electrical heating elements 314 may be arranged or disposed in the spaces 312. The heating elements 314 may include heating wires constructed of, for example, nichrome wires, but are not limited thereto. Electrical leads 316 may extend from a power supply (not shown in the figure for clarify of illustration and description) to supply electrical energy to the heating elements 314.

Figure 4A:
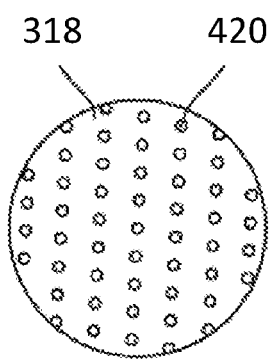
FIGS. 4A-4B are side views of disruptor plates of the catalytic converter of FIG. 3, according to one or more embodiments of the present disclosure.
Figure 4B:
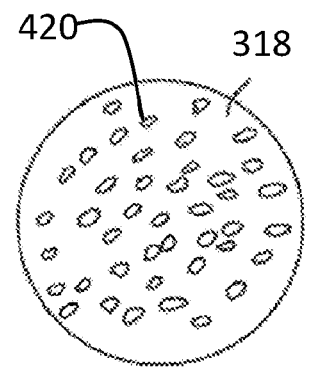
Figure 4C:
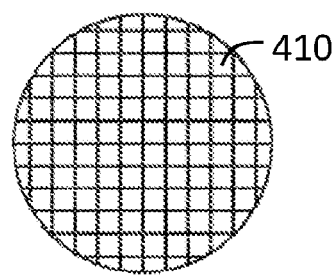
FIG. 4C is a side view of a filter of the catalytic converter of FIG. 3, according to one or more embodiments of the present disclosure.

In one embodiment, the disruptor plates 318 may be placed at or near the inlet port 306 and the outlet port 308. The disruptor plates 318 may be included to add or increase agitation to the flow of exhaust gases traversing across the filter 310. As shown in FIG. 3, the disruptor plates 318 may be oriented or disposed orthogonal to a longitudinal (or horizontal) axis 304 of the external shell 302. Similar to the filter 110 shown in FIG. 1, the filter 310 may be coated with one or more catalytic materials to maximize or increase contact with the toxic gases and particulates and to slow down the flow of the gases within and traversing through the catalytic converter 300. Additionally, the heating elements 314 may further aid in the removal or reduction of harmful gases and particulate matters by heating the inside and the components (e.g., filters 310) of the catalytic converter 300. FIGS. 4A and 4B show an end view of the disrupter plate 318 that may include an array of holes 420 that may extend across in the direction of the flow of exhaust gases and particulate matters. The array of holes 420 may be scattered about the disrupter plate 318 in a uniform pattern as shown in FIG. 4A or in a pseudorandom pattern as shown in FIG. 4B. Further, the size and shape of the holes 420 may be varied in a suitable manner. FIG. 4C shows one example of an end view of the filter 310. Similar to the filter 110 in FIGS. 1 and 2A, the filter 310 may include a plurality of holes 410 and a catalyst coating having a plurality of layers of ceramic and noble metals, similarly to the embodiments discussed above corresponding to FIGS. 2A and 2B.

Figure 5:
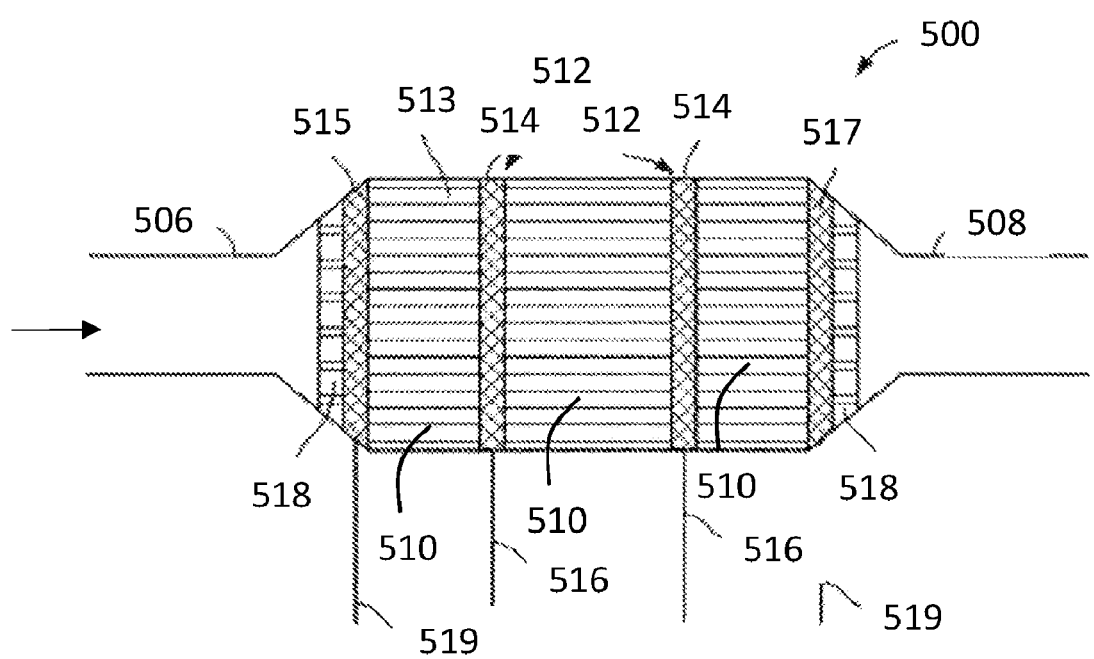
FIG. 5 is a cross-sectional view of a catalytic converter, according to one or more embodiments of the present disclosure.

FIG. 5 depicts a catalytic converter 500 according to an embodiment of the present disclosure. The catalytic converter 500 may include one or more filters 510, heating elements 514, electrical leads 516, secondary planar heating elements 515, 517, disruptor plates 518, and additional electrical leads 519. The heating elements 514 may be arranged or disposed in a plurality of spaces 512. The electrical leads 516 may extend from a power supply to supply power to the heating elements 514 and the secondary planar heating elements 515, 517 that may be arranged near an inlet port 506 and/or an outlet port 508, adjacent to the disruptor plates 518. The additional electrical leads 519 may supply electrical energy to the secondary planar heating elements 515, 517. Although some of the various elements of the present disclosure are described as being planar or having particular orientations, it is not required that these geometrical restrictions be exact, and approximations thereto are within the description of the various embodiments of the present disclosure. Disruption of normal, substantially laminar flow of exhaust gases enhances the efficiency of the catalytic converter 500. As such, the removal or reduction of the toxic gasses and particular matters exiting a catalytic converter is significantly improved by including the multiple heating elements 514, 515, 517 and disruptor plates 518.

In one embodiment, the secondary planar heating elements 515, 517 may be disposed or arranged adjacent or near one or more of the filters 510 instead of being disposed adjacent or near the inlet port 506 and/or outlet port 508. The catalytic converter 500 removes or reduces the harmful gases and particulate matters as they pass through the catalytic converter 500. The secondary planar heating elements 515, 517 may be configured to heat the internal temperature of the catalytic converter 500 to, for example, about 800° C. to 1200° C., which aids in the removal or reduction of the harmful gases and particulate matters within or traversing through the catalytic converter 500. The filter 510 (see FIG. 16 for illustration of an example filtering process) may be coated or sprayed with noble metals to aid in maintaining an internal temperature of, for example, about 800° C. to 1200° C. and in turn further aid in the removal or reduction of harmful gases and particulate matters. Additionally, similar to the embodiments described in accordance with FIGS. 1-4, the catalytic converter 500 may include a catalyst coating such as shown in FIG. 2B to aid in the removal or reduction of harmful gases and particulate matters.

Figure 6:
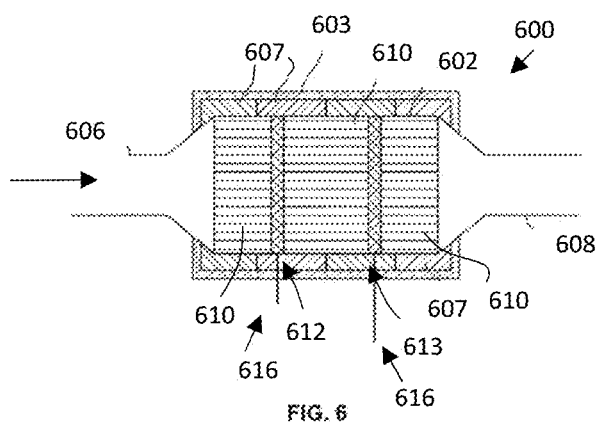
FIG. 6 is a cross-sectional view of a catalytic converter, according to one or more embodiments of the present disclosure.
Figure 7:
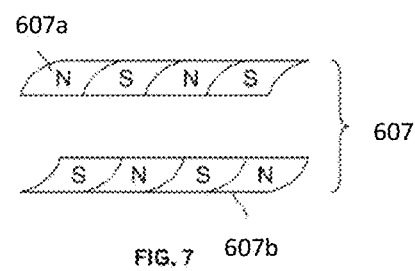
FIG. 7 is an arrangement of the external magnets of the catalytic converter of FIG. 6, according to one or more embodiments of the present disclosure.

FIG. 6 illustrates a catalytic converter 600 in accordance with an embodiment of the present disclosure. The catalytic converter 600 may include one or more filters 610 through which a magnetic field may be maintained between an inlet port 606 and an outlet port 608. In this embodiment, the catalytic converter 600 is enhanced with an encompassing shell 602 partially or internally surrounding an external shell 603. A plurality of magnets 607 may be located or arranged between the shells 602, 603. As shown in FIG. 7, the plurality of magnets 607 may have a curved shape to approximate the outer geometry of the external shell 603 and may be provided in two sets 607a, 607b. The plurality of magnets 607 may be disposed in an array having alternating polarities as shown in FIG. 7. In one embodiment, the magnets 607 facing each other may have opposing polarities. Alternatively, the magnets 607 may have the same polarity and the polarity may not vary along the longitudinal or horizontal direction of the catalytic converter 600. Having magnets facing each other with opposite polarities results in a stronger magnetic field. In one embodiment, the plurality of magnets 607 may include one or more neodymium magnets. In another embodiment, the plurality of magnets 607 may be electromagnets. However, any suitable magnets may be used depending on the desired application. Similar to the embodiments disclosed in FIGS. 1-5, heaters 612, 613 may be arranged in one or more spaces within the catalytic converter 600. Further, electrical leads 616, 616 may be attached to a control unit and a power supply (not shown in the figure for clarity of illustration) that may be configured to switch between the heaters 612, 613 to maintain a desired temperature, for example, by applying electric current between about 6 to 45 amps.

FIG. 8 shows a catalytic converter 800 in accordance with an embodiment of the present disclosure. In this embodiment, an array of magnets 807 may be placed to abut an external shell 802 from an inside surface of the external shell 802. Similar to the embodiments described in accordance with FIGS. 1-7, heating elements 814 may be arranged at or near the spaces 812 next to one or more filters 810 with electrical leads 816 that power the heating elements 814.

FIG. 9A shows an end view of the magnets 807 and FIG. 9B depicts an exploded view of the magnets 807. In one embodiment, a central core magnetic rod 809 may be provided as a part of the set of magnets 807. The central core magnetic rod 809 may allow varying arrangements of polarities of the magnets 507. For example, the magnets 807 that face each other may have the same or different polarities, which may vary along the longitudinal direction. In addition, the central core magnetic rod 809 may be one piece extending from the inlet port 806 to the outlet port 808, with one polarity at each end. Alternatively, the central core magnetic rod 809 may be made of segments that may be separated from each other in the longitudinal direction and have polarities that may vary in the longitudinal direction. Although the magnets 807 have been depicted as fixed magnets, electromagnets may be provided in addition to or alternatively, to be operated with suitable current sources (not shown in the figure for clarity of illustration and description).

Figure 10:
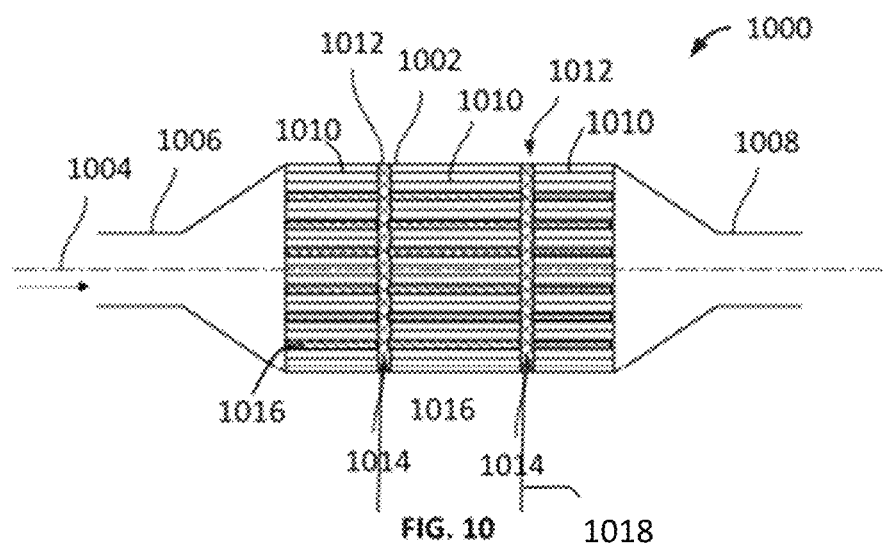
FIG. 10 is a cross-sectional view of a catalytic converter, according to one or more embodiments of the present disclosure.

FIG. 10 illustrates a catalytic converter 1000 according to an embodiment of the present disclosure. The catalytic converter 1000 may include an external shell 1002, an inlet port 1006, an outlet port 1008, one or more filters 1010, a plurality of spaces 1012, and a plurality of heating rods 1016. In one embodiment, electrical heating elements 1014 may be arranged or disposed in the spaces 1012. The heating elements 1014 may include heating wires constructed of, for example, nichrome wires, but are not limited thereto. Electrical leads 1018 may extend from a power supply to supply electrical energy to the heating elements 1014.

Figure 11A:
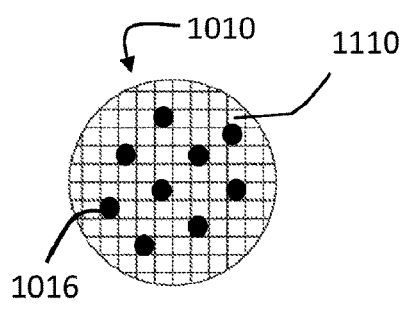
FIG. 11A is a side view of a filter of the catalytic converter of FIG. 10, according to one or more embodiments of the present disclosure.

FIG. 11A shows an end view of the filter 1010 of FIG. 10. In one embodiment, the filter 1010 may be, for example, a metallic or a ceramic filter including a plurality of honeycomb shaped openings 1110. The openings 1110 may be configured to communicate gas and/or particulate matters from one end to the opposite end of the filter 1010. The shape and size of the openings 1110 of the filter 1010 may vary depending on the desired application of the exhaust system of the present disclosure. In one embodiment, the size of the openings 1110 for the filter 1010 used in a gasoline engine system may be about 1/16 inch, but is not limited thereto. In another embodiment, the size of the openings 1110 for the filter 1010 used in a diesel engine system may be between about 1/8 inch to 1/4 inch, but is not limited thereto. Further, the plurality of rods 1016 may be inserted into the plurality of openings 1110. The plurality of rods 1016 may extend from one end of the filter 1010 to the other end across the entire length of the filter 1010. In some embodiments, the plurality of rods 1016 may extend partially through the filter 1010, instead of extending across the entire length of the filter 1010. The plurality of rods 1016 may facilitate rapid heating of the filter 1010 by quickly conducting the heat generated inside of the catalytic converter 1000 and transferring the heat to the filter 1010. The number and location of the plurality of rods 1016 used in the filter 101 may be determined based on the amount or level of backpressure generated within the exhaust system using the catalytic converter 1000. Accordingly, the number of plurality of rods 1016 may be determined at least on the shape and size of the filter, size of the openings 1110 of the filter 1010, etc. Preferably, the level of backpressure measured with the plurality of rods 1016 inserted into the filter 1010 may be zero.

In one embodiment, the one or more filters 1010 may be coated with catalyst coating materials to maximize or increase contact between the filters 1010 and the toxic gases and particulate matters. The catalyst coating materials may slow down the flow of toxic gases and particulate matters that may traverse from the inlet port 1006 to the outlet port 1008. Additionally, the catalyst coating materials may facilitate rapid heating of the catalytic converter 1000. Embodiments of the catalyst coating and associated features thereof embodying the principles and concepts of the present disclosure are described hereinafter. The one or more filters 1010 may be coated with catalyst coating materials in the same manner as described above with respect to FIG. 2B.

Figure 11B:
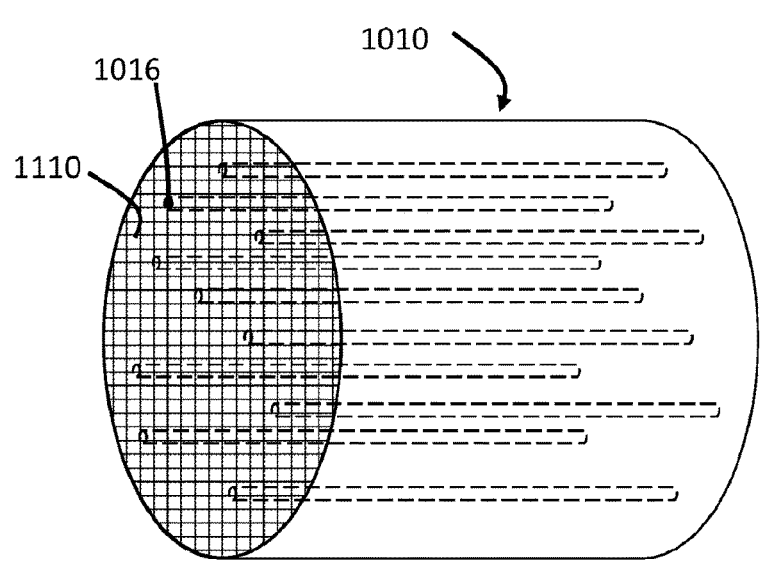
FIG. 11B is a perspective view of a filter of the catalytic converter of FIG. 10, according to one or more embodiments of the present disclosure.

FIG. 11B shows a perspective view of the filter 1010 of FIG. 10 including the plurality of rods 1016. In one embodiment, the plurality of rods 1016 may be inserted into the plurality of openings 1110. Further, the plurality of rods 1016 may extend from one end of the filter 1010 to the other end across the entire length of the filter 1010. In some embodiments, the plurality of rods 1016 may extend partially through the filter 1010, instead of extending across the entire length of the filter 1010. As described above, the number and location of the plurality of rods 1016 may depend on the level of backpressure measured in the exhaust system utilizing the catalytic converter 1000. By utilizing the plurality of rods 1016, in addition to the catalyst coating 1120 described in accordance with FIG. 2B above, the catalytic converter 1000 may be rapidly heated to dramatically improve the removal and reduction of the toxic or harmful gasses and particulates generated in a fossil fuel based internal combustion engine.

FIG. 12 illustrates a catalytic converter 1200 according to one exemplary embodiment of the present disclosure. In addition to the elements shown in FIG. 12, the catalytic converter 1200 may include one or more features disclosed in accordance with the embodiments shown in FIGS. 1-11. The catalytic converter 1200 may include a first housing (or shell) 1212, a second housing (or shell) 1214 that may be encompassed by the first housing 1212, an inlet 1216 where exhaust gases enter the first housing 1212 and an outlet 1218 where the exhaust gases exit the first housing 1212. Within the internal cavity of the first housing 1212, between the inlet 1216 and the outlet 1218, a first filter 1226, and a second filter 1228. The first filter 1226 is configured to oxidize harmful exhaust gases and in particular carbon dioxide. The second filter 1228 may be configured to further reduce/eliminate harmful exhaust gases including, but not limited to, carbon dioxide, carbon monoxide, and nitrogen oxide, as well as hydrocarbons, and other harmful chemicals. The filters 1226, 1228 may be formed of ceramic or metallic materials.

The first filter 1226 and the second filter 1228 may include, for example, ceramic filters including a plurality of honeycomb shaped openings that may be coated with a catalyst coating 1229 with one or more noble metals. The first filter 1226 and the second filter 1228 may include a plurality of heating rods 1230 that may extend through the honeycomb structure. A plurality of heating rods 1230 formed, for example, of a heat-treated metal or alloy (e.g., copper or steel), may extend longitudinally or horizontally across the filters 1226, 1228 such that one end of each heating rod 1230 is orientated generally toward the inlet 1216 and the other end of each heating rod 1230 is orientated generally toward the outlet 1218 of the catalytic converter 1200. Additionally or alternatively, the heating rods 1230 may be arranged to traverse about the filters 1226, 1228. In one embodiment, each heating rod 1230 in the first filter 1226 may extend from one end of the first filter 1226 to the other end of the first filter 1226 over the entire length of the first filter 1226. Similarly, each heating rod 1230 in the second filter 1228 my extend from one end of the second filter 1228 to the other end of the second filter 1228 over the entire length of the second filter 1228. Alternatively, one or more heating rods 1230 may partially extend across the first filter 1226 and/or the second filter 1228. As addressed further below, the heating rods 1230 function to transfer heat into the filters 1226, 1228 and the heated rod mass within the filters 1226, 1228 facilitates maintaining a constant temperature effectively within the catalytic converter 1202. Additionally, between the first housing 1212 and the second housing 1214, a plurality of magnets 1232 may be arranged and disbursed. While the placement of the magnets 1232 is shown between the housings 1212, 1214, the magnets 1232 may be placed on or within both filters 1226, 1228, within the first cavity 1222 and/or external of the first housing 1212. In one embodiments, the number of heating rods 1230 may be determined by the size of the filters 1226, 1228. For example, for a filter having a size of about 12×5 inch, about 6 to 8 rods may be provided. The number of the rods may be based on the backpressure of the exhaust system. In one embodiment, the size of the filter may be modified to reduce or eliminate the exhaust air flow backpressure.

To facilitate monitoring the amount of oxygen in the exhaust gas, an oxygen sensor 1220, which communicates with an electronic control unit, may be disposed or fixed external or internal to the catalytic converter 1200. The oxygen sensor 1220 is configured to measure the amount of oxygen (or the concentration of combustibles) in the exhaust gases leaving the engine. An exhaust system may have both upstream and downstream oxygen sensors 1220. Upstream oxygen sensors 1220 are located before the catalytic converter 1200, while downstream sensors are located after the catalytic converter 1200. The engine computer, which is often referred to as the powertrain control module (PCM), may use data from the upstream oxygen sensor 1220 to regulate the engine's fuel mixture. Meanwhile, the PCM may use the signal from the downstream oxygen sensor 1220 for monitoring the health of the catalytic converter 1200.

The oxygen sensor 1220 may extend into a first cavity 1222 of the first housing 1212, downstream of the inlet 1216 and before the first filter 1226. To increase the internal temperature of the catalytic converter 1202 above a threshold temperature, an electric heater 1224 extending into the first cavity 1222 from outside of the second housing 1214, may be disposed upstream of the first filter 1226. The heater 1224 may be connected to a power source and an electronic control unit that may be arranged external to the catalytic converter 1202 and may be configured to heat the interior of the catalytic converter 1200 above a threshold temperature. The power source and the electronic control unit may control the heater 1224 based on temperature sensor data provided by a temperature sensor 1245 that may be arranged near the outlet 1218. The heater 1224 depicted in FIG. 12 may include a wound metal coil 1225. However, the heater 1224 may take any form (further described later in detail below) to ensure rapid internal heating of the catalytic converter 1200. While the heater 1224 is shown to extend into the catalytic converter 1200 in FIG. 12 before the filters 1226, 1228 more than one heater 1224 may be arranged to extend into the catalytic converter 1200. For example, the heater(s) 1224 may be arranged within one or more of the filters 1226, 1228, or within the first cavity 1222 and/or a second cavity 1223, between the filters 1226, 1228, etc. As such, the placement of the heater(s) 1224 is not limited to the embodiment shown in the figures of the present disclosure. Further, one or more heaters with varying designs in accordance with the present disclosure may be arranged entirely within the cavities 1222, 1223 of the catalytic converter 1200 at any position within the first housing 1212 and/or the second housing 1214 and/or may be fixed external to the catalytic converter 1200 and/or fixed within or external to the tubing 1206 that is located directly upstream of the catalytic converter 1200.

Figure 13:
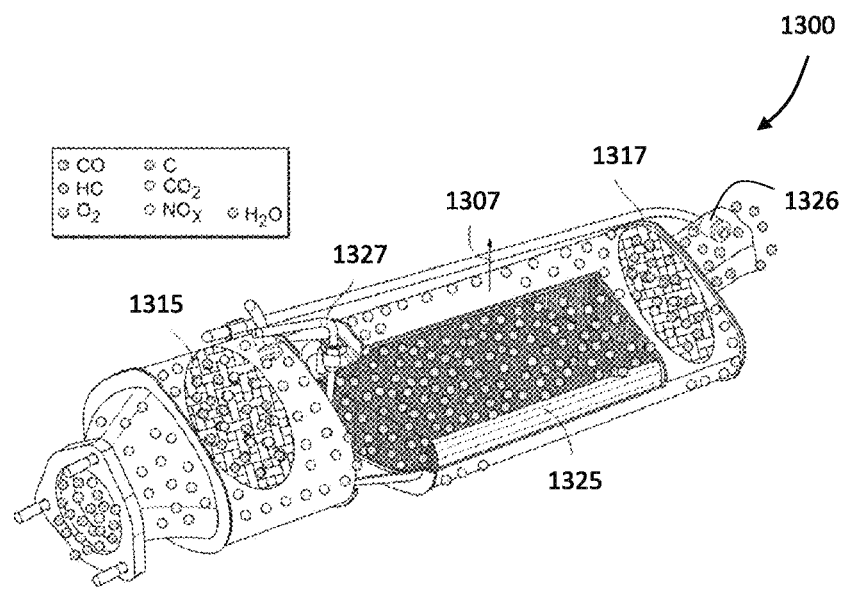
FIG. 13 is a partial cross-sectional view of a catalytic converter, according to one or more embodiments of the present disclosure.

FIG. 13 illustrates an exemplary catalytic converter 1300 according to an embodiment of the present disclosure. The catalytic converter 1300 may include a first heater 1315 in front of a filter 1325, and a second heater 1317 behind the filter 1325. Additionally, temperature sensors 1326, 1327 may be placed adjacent or near the first and second heaters 1315 and 1317 to monitor the internal temperature of the of the catalytic converter 1300 and to ensure that proper internal temperature is maintained. As shown in FIG. 13, various gases may enter and catalytic converter 1300 to be reduced or removed by the catalytic converter 1300 according to embodiments of the present disclosure.

Figure 14:
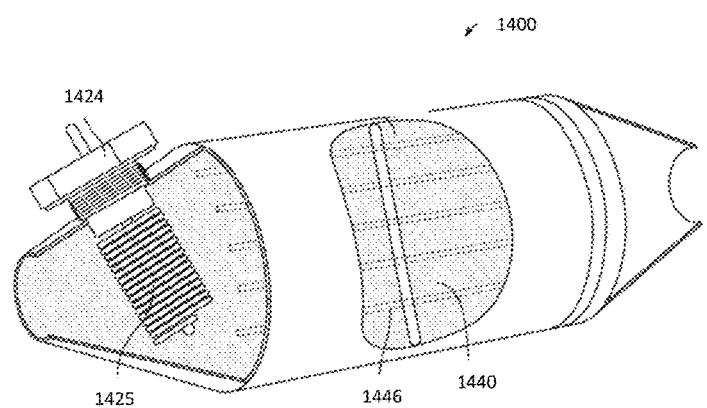
FIG. 14 is a perspective cutaway view of a selective catalytic reduction system, according to one or more embodiments of the present disclosure.

FIG. 14 shows a selective catalytic reduction system (SCR) 1400 in accordance with an embodiment of the present disclosure. In one embodiment, the SCR 1400 may be arranged downstream of a catalytic converter or other exhaust converters (e.g., oxidation catalyst and/or a diesel particulate filter) in accordance with embodiments of the present disclosure. The SCR 1400 may be coupled downstream to a catalytic converter (or other exhaust converter) by a tubing 1606 (shown in FIG. 16). The SCR 1400 is configured to reduce nitrogen oxide ($NO_x$) gases by oxidizing the nitrogen oxide gases and converting them into harmless exhaust emissions (e.g., nitrogen, water, and a small amount of carbon dioxide) that are emitted out of the exhaust system of the present disclosure and into the environment. In one embodiment, the SCR 1400 reduces the exhaust emissions without the need to incorporate a liquid-reductant agent into the exhaust stream to reduce the amount of nitrogen oxide. In other embodiments, SCR 1400 may include one or more injectors to inject a liquid reductant agent (e.g., urea) to facilitate the reduction or removal of harmful exhaust emissions. One source of urea is AdBlue, which comprises about 32.5% high quality urea dissolved in distilled water.

Figure 15A:
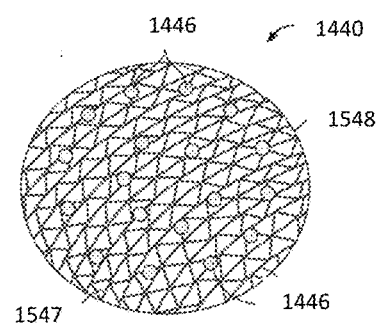
FIG. 15A is an end view of a filter for the selective catalytic reduction system of FIG. 14, according to one or more embodiments of the present disclosure.
Figure 15B:
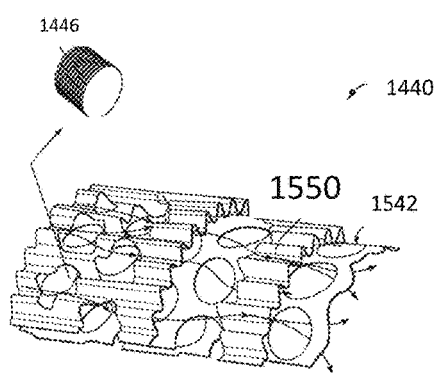
FIG. 15B is a sectional view of the filter of the selective catalytic reduction system of FIG. 14, according to one or more embodiments of the present disclosure.

As illustrated in FIG. 14, the SCR 1400 may include a filter 1440, a plurality of heating rods 1446, and a heating element 1424. The heating element 1424 depicted in FIG. 14 may include a wound metal coil 1425. However, the heating element 1424 may take any form (further described later in detail below) to ensure internal heating of the SCR 1400. Further, as shown in FIG. 15A, the filter 1440 may include a plurality of honeycomb shaped openings 1547. The specific shape and size of the openings 1547 is not limited thereto, and any suitable shape and size may be used according to the desired application of the SCR 1400. In one embodiment, the plurality of heating rods 1446 may be inserted into the honeycomb shaped openings 1547. FIG. 15B shows a partial perspective view of the filter 1440. In addition to the honeycomb shaped openings 1547, the filter 1440 may include a plurality of holes 1542 that may be dispersed about the filter 1440. The plurality of holes 1542 may be included to further disrupt the flow of exhaust gases from a laminar path and to slow down the gases from exiting the SCR 1400. The filter 1440, similar to the filters disclosed in the embodiments of FIGS. 1-13, may be coated with a catalyst coating 1548 in the same manner as described above with respect to FIG. 2B.

In one embodiment, the heating rods 1446 may extend longitudinally through the honeycomb structure such that the one end of each heating rod 1446 may be orientated generally toward an inlet of the SCR 1400 and the other end of each heating rod 1446 may be orientated generally toward an outlet of the SCR 1400. The heating rods 1446 may include a heat-treated metal or alloy (e.g., copper or steel). The heating element 1424 may communicates with an electronic control unit, and may extend into the SCR 1400 upstream of filter 1440. Similar to the filters of the foregoing embodiments disclosed in FIGS. 1-13, the heating rods 1446 and the catalyst coating 1548 of the filter 1440 of the SCR 1400 facilitate rapid heating and ensure that the internal temperature across the filter 1440 is sufficiently maintained. Additionally or alternatively, the SCR 1400 may include one or more nitrogen oxide or $O_2$ sensors that may be monitored and controlled by the electronic control unit for controlling the heating element 1424.

By increasing the internal temperature of the SCR 1400, additional harmful chemicals and particulates of the exhaust gas are burned off. The filter 1440 facilitates to trap and/or slow the flow of the exhaust gases passing across the internal cavity of the SCR 1400 through the honeycomb shaped openings 1547. The catalyst coating 1548 facilitates to further slow and disrupt the flow of the exhaust gases such that additional harmful exhaust emissions may be heated above a threshold temperature (that exceeds a normal operating temperature within the SCR 1400 absent the heating element 1424) and burn off prior to exiting the SCR 1400. In addition to the heating rods 1446 and the catalyst coating 1548, a plurality of magnets (not shown in the figures for clarity of illustration) may be arranged and disbursed internal or external to the SCR 1400 similar to the foregoing embodiment of FIGS. 6-9B.

Similar to the magnets 1232 in the catalytic converter 1200, the polarity of the magnets may further disrupt and slow the flow 1550 of exhaust gases and particulates as they pass over the filter 1440 by increasing the electric current in the vicinity of the magnets to disrupt and to slow the flow of exhaust gases and particulates which in turn allows for heating of the exhaust gases for a longer period of time within the SCR 1400 and in turn further oxidization and reduction of toxic byproducts of exhaust gases. Additionally or alternatively, the magnets may be arranged between the filter 1440 and the selective catalytic reduction system 1400, and/or external the selective catalytic reduction system 1400 housing. Because the temperature within the SCR 1400 may become very high, the magnets may be capable of operating at the expected maximum temperature without suffering degradation (e.g., AlNiCo magnets).

Figure 16:
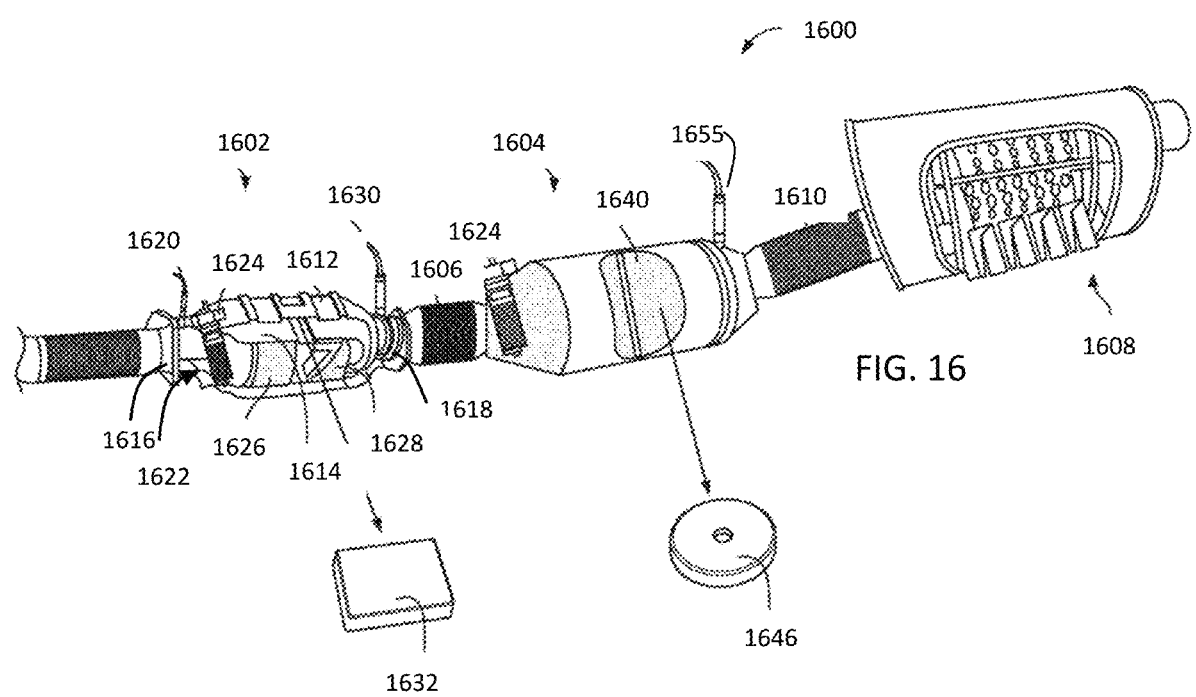
FIG. 16 is a perspective assembly view of an exhaust system or an internal combustion engine that runs on gasoline, according to one or more embodiments of the present disclosure.

FIG. 16 shows an exhaust system 1600 according to an embodiment of the present disclosure. In one embodiment, the exhaust system 1600 may be configured or designed for an internal combustion engine that utilizes gasoline. The exhaust system 1600 may include a catalytic converter 1602, a selective catalytic reduction system (SCR) 1604, one or more electric heaters 1624, one or more heat sensors 1630, one or more gas (or oxygen or $O_2$) sensors 1655, and a muffler 1608. The catalytic converter 1602 may be coupled to the SCR 1604 via a first tubing 1606, and the SCR 1604 may be coupled to the muffler 1608 via a second tubing 1610, as shown in FIG. 16. The heat sensor 1630 may be configured to detect the temperature of the exhaust gas prior to exiting the catalytic converter 1602. The heat sensor 1630, which may be connected to an electronic control unit (ECU), may be located near the inlet 1616 and/or outlet 1618 of the catalytic converter 1602.

In one exemplary embodiment, upon startup of an engine from a cold start, one or more electric heaters 1624 may be simultaneously turned on by the electronic control unit to aid in heating the internal temperature of the catalytic converter 1602 above the temperature of the exhaust gases and particulate matter. The one or more electric heaters 1624 may remain on after reaching a desired temperature or may be turned off and then turned back on if the temperature within the catalytic converter 1602 drops below a predetermined threshold temperature. The electronic control unit which may receive input signals from one or more thermometers and other sensors and may generate a signal to control the activity of the one or more electric heaters 1624. A plurality of rods (not shown in the figures for clarity of illustration) may extend longitudinally or horizontally within the filters 1626, 1628 in an assembled state within the catalytic converter 1602. The rods may provide a conduit for more rapid heat transfer from the one or more electric heaters 1624 through the filters 1626, 1628, and thereby accelerate heating the internal temperature of the catalytic converter 1602 to a desired internal temperature and aid in maintaining the desired internal temperature above a threshold across the surface area of the filters 1626, 1628, and a cavity 1622 of the catalytic converter 1602 to oxidize harmful exhaust gases at least throughout the filters 1626, 1528 and surrounding internal surface areas.

By increasing the internal temperature of the catalytic converter 1602 to a temperature greater than the normal operating temperature of the catalytic converter 1602, harmful chemicals and particulates that are part of the exhaust gas are oxidized and/or burned off before exiting the catalytic converter 1602 more efficiently than in a conventional catalytic converter. The filters 1626, 1628 facilitate to trap and/or slows the flow of the exhaust gases as they passes across the internal cavity of the catalytic converter 1602 through the honeycomb openings, and the noble metal filter coating (not shown in the figure for clarity of illustration and description) aids to further slow and disrupts the flow of the exhaust gases across the cavity 1622 such that more of the harmful exhaust emissions can be heated above a threshold exhaust gas temperature and oxidize and/or burn off prior to exiting the catalytic converter 1602. The threshold temperature may be optimized for any given configuration based on the amount of additional oxidization/burn off desired based on the exhaust system 1600 components and other factors.

In one embodiment, the polarities of magnets 1632 aid to further disrupt and slow the flow of exhaust gases and particulates as they pass through the catalytic converter 1602 by increasing the electric current within the cavity 1622 of the catalytic converter 1602. Disrupting and slowing the flow of exhaust gases and particulates allows for heating of the exhaust gases for a longer period of time within the cavity 1622 of the catalytic converter 1602 and in turn further oxidization and reduction of toxic byproducts of exhaust gases. Because the temperature within the catalytic converter 1602 may be very high, the magnets 1632 may be configured to operate at the expected maximum temperature without suffering degradation (e.g., AlNiCo magnets, neodymium magnets, etc.).

Similar to the SCR 1400 described according to FIGS. 14-15B, the SCR 1604 may be configured to reduce nitrogen oxide (NO$_x$) gases by oxidizing the nitrogen oxide gases and converting them into harmless exhaust emissions (e.g., nitrogen, water, and a small amount of carbon dioxide) by rapidly heating the SCR 1604 through a plurality of rods and a catalyst coating according to the foregoing embodiments of FIGS. 1-15B. Upon exiting the SCR 1604, the remaining exhaust gases may flow through the tubing 1610 that connects the SCR 1604 and into the muffler 1608. The muffler 1608 may be configured to reduce or "muffle" engine noise, and may further reduce remaining harmful exhaust gases and cool the exhaust temperature.

Figure 17:
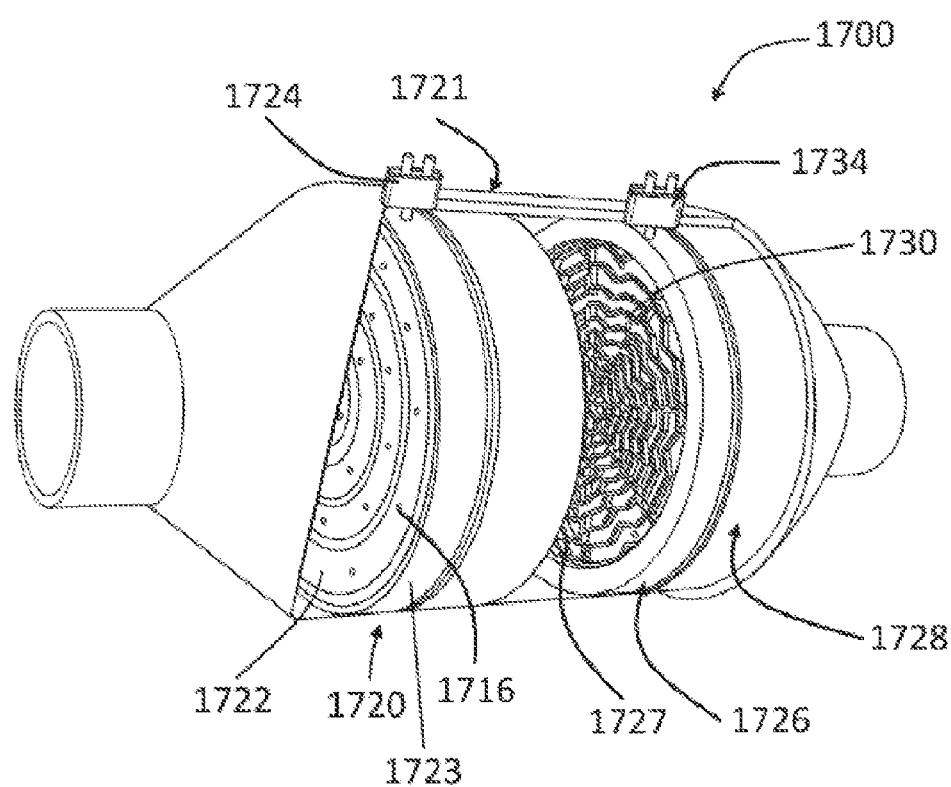
FIG. 17 is a partial cutaway view of an exhaust system converter, according to one or more embodiments of the present disclosure.

FIG. 17 illustrates an exhaust converter 1700 in accordance with an embodiment of the present disclosure. The exhaust converter 1700 may be utilized in a gasoline or a diesel based engine system. Further, the exhaust converter 1700 may be designed or configured to be used as, for example, a catalytic converter, an SCR, oxidation catalyst, a diesel particulate filter (DPF).

In one embodiment, the exhaust converter 1700 may include a first heater 1720, a first filter 1721, a second heater 1726, and a second filter 1728. The first heater 1720 may receive power from a power supply (not shown for clarity of illustration and description) via a first connector 1724, and the second heater 1726 may receive power from the power supply via a second connector 1734. The first heater 1720 and the first filter 1721 may be an integrated unitary device. Alternatively, the first heater 1720 and the first filter 1721 may be separate devices that may be combined or attached together via any suitable securing means (e.g., via welding, screws, bolts, etc.). Similarly, the second heater 1726 and the second filter 1728 may be an integrated unitary device. Alternatively, the second heater 1726 and the second filter 1728 may be separate devices that may be combined or attached together via any suitable securing means (e.g., via welding, screws, bolts, etc.). The first heater 1720 and the second heater 1726 may be different types of heaters, as shown in FIG. 17. Alternatively, the first heater 1720 and the second heater 1726 may be the same type of heaters.

In one embodiment, the first heater 1720 may include a heating element 1722. The heating element 1722 may be made of, for example, a metallic material, and the heating element 1722 may include a plurality of openings (e.g., honeycomb shaped openings). Additionally, the first heater 1720 may include a plurality of heating rods 1716 extending across the first heater 1720 in a horizontal direction. The heating rods 1716 may fully extend horizontally from one end to the other end of the first heater 1720. Alternatively, the heating rods 1716 may partially extend horizontally within the first heater 1720. Further, the heating rods 1716 may be inserted into the plurality of openings of the heating element 1722. In one embodiment, the heating rods 1716 may include, for example, a heat-treated metal or alloy (e.g., copper or steel)

In one embodiment, the first heater 1720 may be heated by applying electric potential between the first connector 1724 and a housing 1723 (e.g., a metal housing) of the first heater 1722. The first connector 1724 and the housing 1723 may be configured to function as a first and second terminals (e.g., positive and negative (or ground) terminals). The heating element 1722 and the housing 1723 may be electrically coupled to a power supply. As such, the first heater 1720 may rapidly heat up when an electric potential is applied by the power supply to induce current to pass through the first heater 1720. Accordingly, the housing 1723, the heating element 1722, and the heating rods 1716 may facilitate rapid heating of the first heater 1720. For example, the heating rods 1716 facilitates transferring the heat generated inside of the first heater 1720 to the heating element 1722. The heating element 1722 may function as a filter that may aid in the removal and reduction of the exhaust gases and particulate matters. The first filter 1721 may be made of a ceramic or a metallic material depending on the desired application of the exhaust converter 1700. Similar to the catalytic converters and the SCRs described in accordance with the foregoing embodiments of FIGS. 1-16 above, the first filter 1721 may include a plurality of heating rods (not shown in the figure for the clarity of illustration) and a thin catalyst coating. Accordingly, the heat generated from the first heater 1720, the thin catalyst coating, and the plurality of heating rods may facilitate rapid heating the first filter 1721.

In one embodiment, the second heater 1726 may include one or more heating wires 1727. As shown in FIG. 17, the heating wires 1727 may be arranged in a web pattern. However, any suitable shape and/or size of the heating wires 1727 may be utilized. The heating wires 1727 may be coupled to the second connector 1734. In this embodiment, the second heater 1726 may be heated by applying electric current to the heating wires 1727. The power supply may be configured to provide electric current to the first and second connectors 1724 and 1734 simultaneously or sequentially. The heat generated by the heating wires 1727 may heat the second filter 1728. The second filter 1728 may include a plurality of heating rods 1730. In some embodiments, the heating wires 1727 may be attached to the heating rods 1730 to prevent potential damage to the heating wires 1727 that may be caused by vibrations or other internal or external movements or forces. The second filter 1728 may be made of a ceramic or a metallic material depending on the desired application of the exhaust converter 1700. Similar to the catalytic converters and the SCRs described in accordance with the foregoing embodiments of FIGS. 1-16 above, the second filter 1728 may include a thin catalyst coating. Accordingly, the heat generated from the second heater 1726, the thin catalyst coating, and the plurality of heating rods 1730 may facilitate rapidly heating of the second filter 1728. In some embodiments, the first filter 1721 and/or the second filter 1728 made of metallic materials may be electrically coupled to one or more terminals of the power supply to further aid in rapid heating of the first filter 1721 and/or second filter 1728. Further, the locations of the first heater 1720 and the second heater 1726 are not limited as shown in FIG. 17. The locations of the first and second heaters 1720, 1726 may be suitably determined based on the desired application of the exhaust converter 1700.

Figure 19:
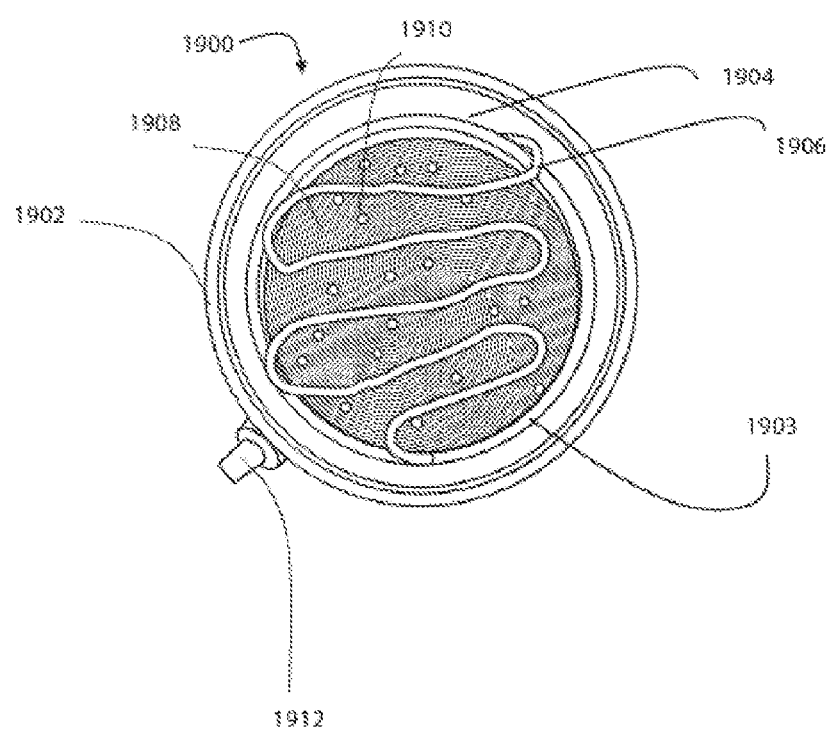
FIG. 19 is a perspective view of a heater, according to one or more embodiments of the present disclosure.

It is understood that the first heater 1720 may include both a heating element 1722 and one or more heating wires such as heating wires 1727 (see, e.g., FIG. 19). Likewise, the second heater 1726 may include one or more heating wires 1727 and a heating element and such as heating element 1722 (see, e.g., FIG. 19). As noted, the heating element 1722 may function as a filter that may aid in the removal and reduction of the exhaust gases and particulate matters.

Figure 18A:
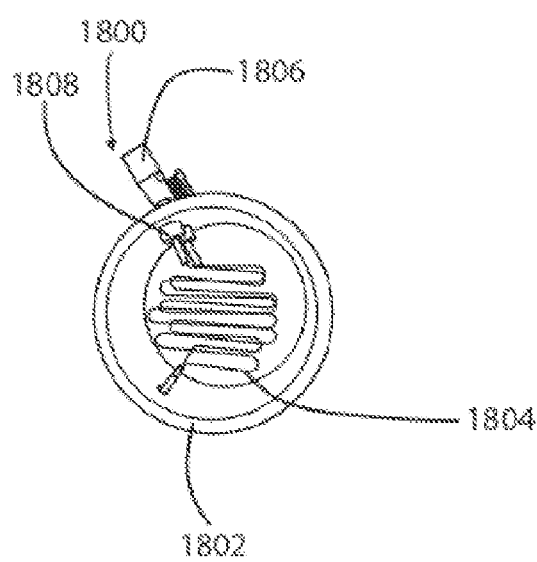
FIG. 18A is a perspective view of a heater, according to one or more embodiments of the present disclosure.

FIGS. 18A-23B show various exemplary heaters and components that may be incorporated into any of the foregoing embodiments disclosed in FIGS. 1-17. FIG. 18A illustrates a perspective view of a heater 1800 according to an embodiment of the present disclosure. The heater 1800 may include a housing (or a chassis) 1802, one or more heating wires 1804, and a connector 1806. In one embodiment, the heating wires 1804 may be coupled to the housing 1802 and the connector 1806. For example, one end of a heating wire 1804 may be coupled to the housing 1802 and the other end of the heating wire 1804 may be coupled to the connector 1806. As shown in FIG. 18A, the connector 1806 may include one or more terminals configured to receive electric current from a power supply and one or more ceramic portions 1808 that function as electrical insulators to provide electrical insulation between the surface of the housing 1802 and the connector 1806. The one or more terminals may be, for example, a positive (or negative) terminal of the connector 1806. The housing 1802 may be configured as a negative (or positive) terminal or ground.

In one embodiment, the heating wires 1804 may include a spiral (or zig-zag) shape, as shown in FIG. 18A. However, the heating wires 1804 may have any suitable shape depending on the desired application of the heater 1800. The heating wires 1804 may be made of a chrome-nickel resistance material having a thickness of about 1.2 mm. The thickness and length of each of the heating wires 1804 may be determined based on the amount (or level) of current applied to the heating wires 1804. For example, a length of about 40 cm may be used for an electric current supply of about 48 to 60 amperes. For about 30 amperes of current supply, a length of about 20 cm may be used. In some embodiments, a plurality of heating wires 1804 may be used by connecting, for example, an end of each of the plurality of heating wires 1804 to each of a plurality of positive terminals of the connector 1806, while connecting all of the other ends of the plurality of heating wires together to a single negative terminal on the surface of the housing 1802. Accordingly, the supply current may be divided into the plurality heating wires 1804, thereby reducing the total amount of current supplied by the number of heating wires 1804. The thickness and length of each of the plurality of heating wires 1804 may be calculated relative to the level of the current supplied to the heating wires 1804. Utilizing a plurality of heating wires 1804 may allow each of the heating wires 1804 to be shorter and thinner. Thus, the heating wires 1804 may heat up substantially quicker than a single heating wire having a larger thickness and length.

Figure 18B:
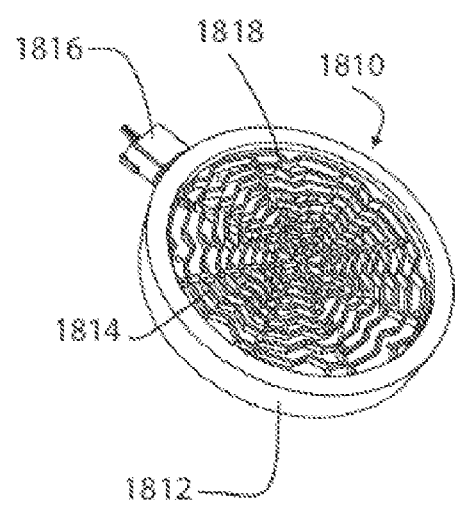
FIG. 18B is a perspective view of a heater, according to one or more embodiments of the present disclosure.

FIG. 18B shows a perspective view of a heater 1810 according to another embodiment of the present disclosure. The heater 1810 may include heating wires 1814 having a web shape (not limited thereto), a housing (or chassis) 1821, and a plurality of rods 1818 configured to hold the heating wires 1814 in place. The heating wires 1814 may heat up when current is supplied by a power supply via the connector 1816. The connector may include a positive terminal and a negative terminal. In some embodiments, the housing 1812 may be configured as a negative terminal or a ground. Similar to the heating wires 1804 disclosed according to the embodiment of FIG. 18A described above, the shape, thickness, and length of the heating wires 1814 may be determined in relation to the level of current supplied from the power supply. The heater 1810 may be arranged, for example, about 1 to 1.5 inches in front of a ceramic honeycomb filter.

Figure 18C:
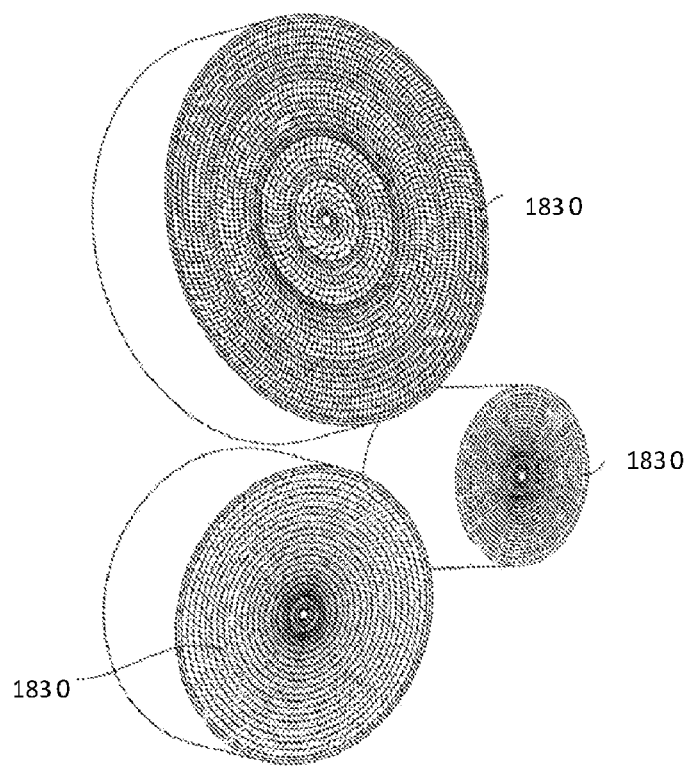
FIG. 18C is a perspective view of heaters, according to one or more embodiments of the present disclosure.

FIG. 18C illustrates a detailed view of heaters 1830 according to another embodiment of the present disclosure. As shown in FIG. 18C, the heaters 1830 may be designed to include different sizes and patterns. The heaters 1830 may be made of metallic materials configured to heat up rapidly when electric current is applied to the heaters 1830. The heaters 1830 may be used additionally or alternatively to any of the heaters disclosed in the embodiments of FIGS. 1-18B.

FIG. 19 illustrates a heater 1900 according to an embodiment of the present disclosure. The heater 1900 may include a housing 1902, a first terminal 1903, a second terminal 1904, one or more heating wires 1906 (although only one is shown, multiple levels of the heating wires, similar to the heating wires 1804 shown in FIG. 18A, may be utilized), a heating element 1908, a plurality of heating rods 1910, and a connector 1912. The housing 1902 may be a metallic housing.

The first terminal 1903 may be a positive (or negative) terminal, and the second terminal 1904 may be a negative (or positive) terminal or ground. In one embodiment, the first terminal 1903 may be electrically coupled to the connector 1912, and the second terminal 1904 may be electrically coupled to the housing 1902.

The heating wire 1906 may be electrically coupled between the first terminal 1903 and the second terminal 1904. In this embodiment, the connector 1912 may be configured to receive electric current from a power supply and may function as a positive (or negative) terminal. Further, the housing 1902 may be configured to function as a negative (or positive) terminal or ground. Accordingly, an electrical potential supplied by the power supply between the positive terminal 1903 (e.g., via the connector 1912) and the negative terminal 1904 (e.g., via the housing 1902) may induce electric current between the first terminal 1903 and the second terminal 1904. Accordingly, the heating wire 1906 coupled between the first terminal 1903 and the second terminal 1904 may heat up based on the level of supplied current. Additionally, the heating element 1908, which may include a metallic material, may be electrically coupled to the first and/or second terminals 1903, 1904, and may also heat up as a result of the current being supplied.

Heating rods 1910 may further facilitate heating up the heating element 1908 by rapidly conducting heat that may be generated by the heating wire 1906. In one embodiment, the heating rods 1910 may be inserted into the openings of the heating element 1908 and may extend from one end of the heating element 1908 to the other end of the heating element 1908. The heating rods 1910 may also include rods that may partially extend from one end of the heating element 1908 to the other end of the heating element 1908. Further, the heating rods 1910 may act as supports configured to hold the heating wire 1906 in place. In this example, the heating rods 1910 partially extend from one end of the heating element 1908 to the other end of the heating element 1908.

In one embodiment, the heating wire 1906 may include a spiral shape, as shown in FIG. 19. However, specific shape and size of the heating wire 1906 may not be limited thereto, and may have any suitable shape or size depending on the desired application of the heater 1900. Similar to the heating wires 1804, the heating wire 1906 may be made of a chrome-nickel resistance material having, preferably, a thickness of about 1.2 mm. The length of the heating wire 1906 may be determined based on the amount (or level) of current applied to the heating wire 1906. For example, a length of about 40 cm may be used for an electric current supply of 48 amperes. For 30 amperes of current supplied, a length of about 20 cm may be used. As such, the length and thickness of the heating wire 1906 may be calculated relative to the level of the current supply. In some embodiments, a plurality of heating wires 1906 may be utilized similar to heating wires 1804.

In one embodiment, heating element 1908 may act as a filter and may include a catalyst coating in accordance with the foregoing embodiments of FIGS. 1-18C. The catalyst coating may further facilitate rapid heating of the heater 1900. Additionally or alternatively, one or more magnets in accordance with the embodiments of FIGS. 6-9B may be placed or arranged in a cavity (or space) 1914 between the housing 1902 and the first and second terminals 1903, 1904 to facilitate rapid heating of the heater 1900. As such, the heater 1900 may be rapidly heated by via one or more combinations of at least the heating wires 1906, heating rods 1910, a catalyst coating, and/or magnets in accordance with the embodiments of FIG. 19.

Figure 20:
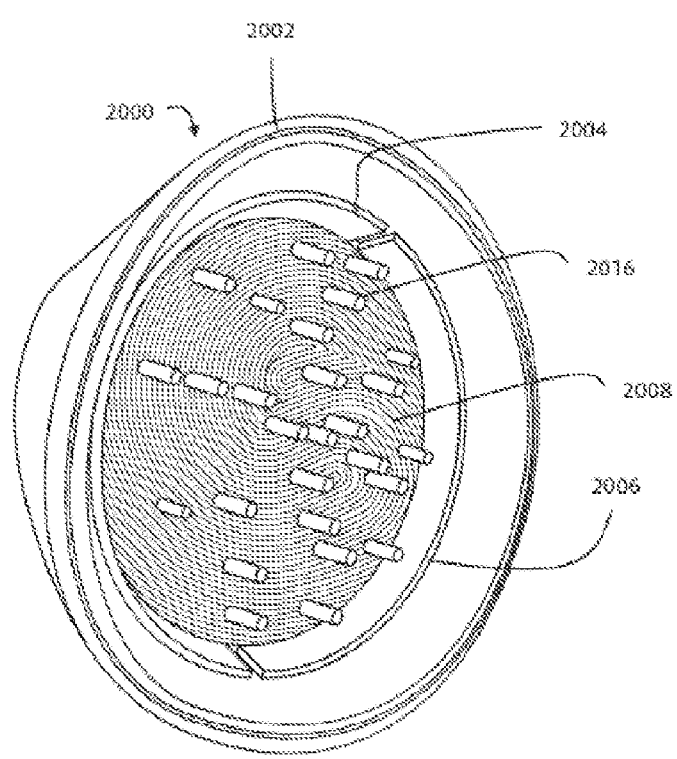
FIG. 20 is a perspective view of a heater, according to one or more embodiments of the present disclosure.

FIG. 20 illustrates a perspective view of the heater 2000 according to an embodiment of the present disclosure. Similar to the heater 1900 of FIG. 19, the heater 2000 may include a housing 2002, a first terminal 2004, a second terminal 2006, a heating element 2008, a plurality of heating rods 2016, and one or more heating wires (not show for clarity of illustration and description). The heater 2000 may function similarly to the heater 1900 disclosed in the foregoing embodiments of FIG. 19. In one embodiment, the plurality of heating rods 2016 may be inserted into the openings of the heating element 2008. The plurality of heating rods 2016 may include a metallic material, and the plurality of heating rods 2016 may secure the heating wires (e.g., heating wires, 1804, 1814, and/or 1906).

Figure 21:
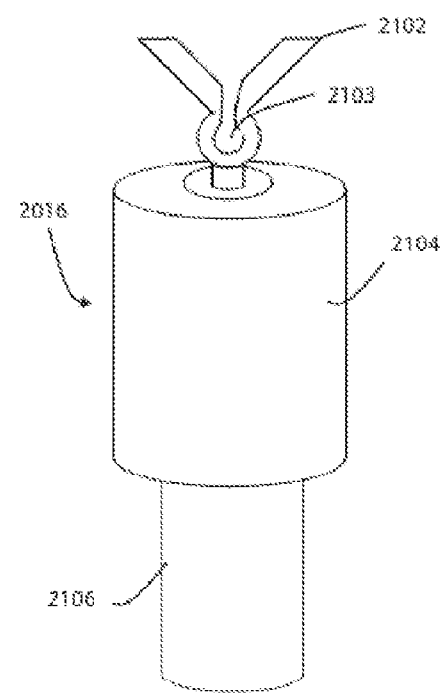
FIG. 21 is a perspective view of a heating pin, according to one or more embodiments of the present disclosure.

FIG. 21 illustrates one exemplary heating rod 2016 according to an embodiment of the present disclosure. The heating rod 2016 may include a rod portion 2106 made of metal (e.g., a heat-treated metal or alloy (e.g., copper or steel)) and a tip portion 2104 made of an aluminum alloy having an insulative property. Accordingly, the tip portion 2104 may prevent passage of current through the heating rod 2016, so as to prevent any shorting or overheating of the heating rod 2016.

Further, the heating rod 2016 may include a clip 2102 (e.g., fastener) configured to secure the heating wires in place. In one embodiment, a heating wire may be snapped into an opening 2103 of the clip 2102. The opening 2013 may have any suitable shape similar to the heating wire, so as to secure the heating wire in the clip 2102. The clip 2102 may be an electrical insulator configured to prevent passage of current through the corresponding heating rod 2016. Accordingly, one or more of the plurality of heating rods 2016 may hold the heating wires of the present disclosure securely in place during operation of a machine or vehicle including the exhaust system of the present disclosure.

In one embodiment, the heating rods 2016 may be spaced, for example, about 2 inches from each other. The spacing of the heating rods 2016 is not limited thereto, but may be spaced apart from each other based on the desired application (e.g., the shape and length of the heating wire) of the present disclosure. Further, the plurality of heating rods 2016 may additionally facilitate rapid heating of the heating element 2008 by conducting heat generated inside of the heater 2000 by the rod portions 2106 of the plurality of heating rods 2016. In one embodiment, the plurality of heating rods 2016 may be inserted directly into a filter of an SCR instead of a heating element as shown in FIG. 20. Thus, the heating rods 2016 may facilitate, for example, via thermal conduction, the additional rapid heating introduced by the inclusion of heating wires 1906 (not shown in FIGS. 20 and 21) but are electrically isolated from said heating wires 1906.

One or more of the heating rods 2016 may extend through the heating element 2008 to further facilitate rapid heating of the heater 2000. In one embodiment, the plurality of heating rods 2016 may have varying lengths. For example, some heating rods 2016 may be longer than other heating rods 2016. That is, the longer heating rods 2016 may be configured to secure heating wire 1906 at one displacement, and the shorter heating rods 2016 may be configured to secure heating wires at another displacement. For example, as shown in FIG. 18A, the longer heating rods 2016 may secure the heating wires 1804 disposed at a top layer portion (displacement), and the shorter heating rods 2016 may secure the heating wires 1804 at a bottom layer portion (displacement).

Figure 22:
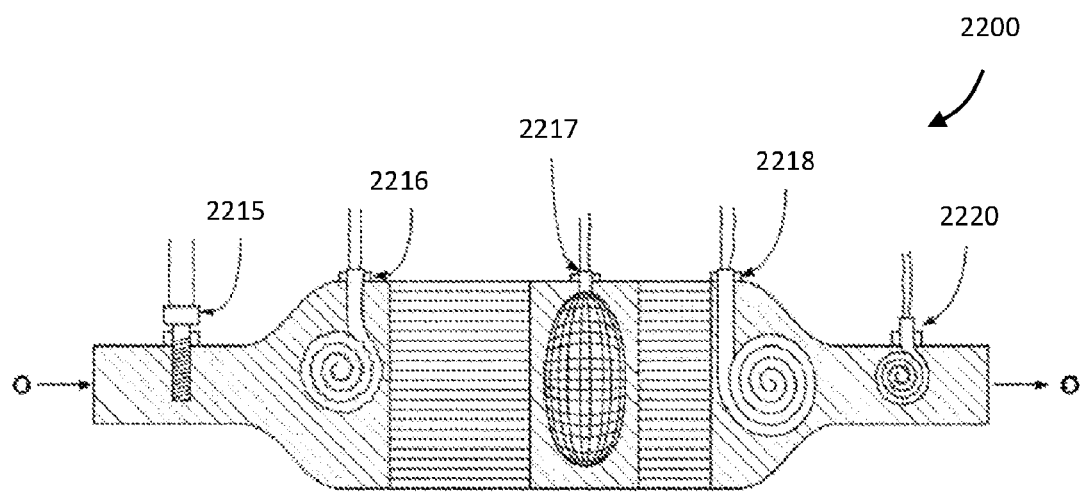
FIG. 22 is a cross-sectional view of a catalytic convert of showing heaters, according one or more embodiments of the present disclosure.

FIG. 22 depicts an exemplary embodiment of an exhaust converter (e.g., a catalytic converter, SCR, oxidation catalyst, DPF, etc.) 2200 of the present disclosure. The exhaust converter 2200 may include a plurality of heaters 2215, 2216, 2217, 2218, 2220 having various types, shapes and sizes that may be placed or arranged at various locations within the exhaust converter 2200. In embodiments of the present disclosure, any suitable number of heaters may be utilized based on the desired application in accordance with the present disclosure.

Figure 23:
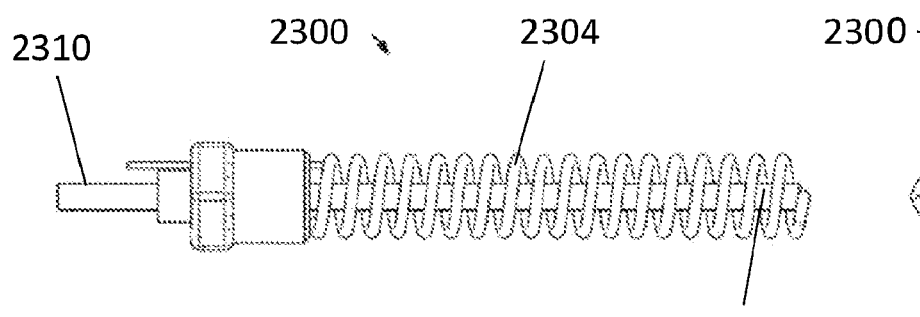
FIGS. 23 and 24 are a perspective and end view of a coil heater, according to one or more embodiments of the present disclosure.
Figure 24:
Figure 41:
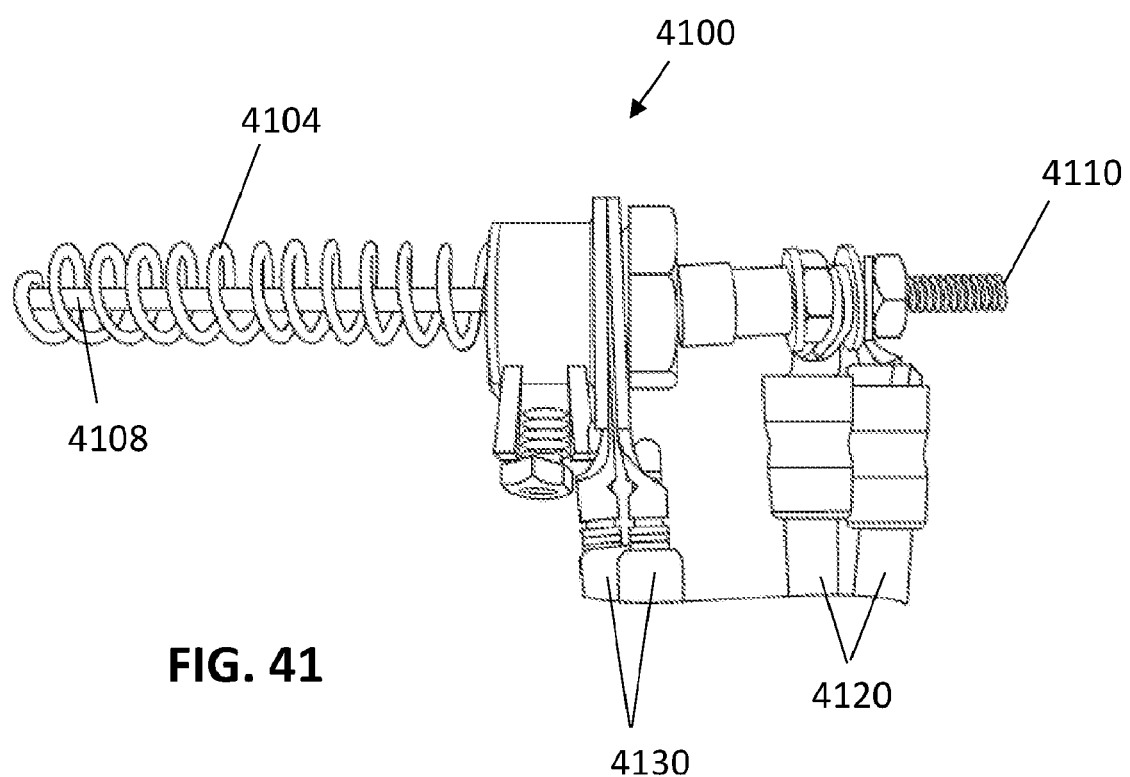
FIG. 41 is a view of a coil heater, according to one or more embodiments of the present disclosure.

FIGS. 23 and 24 depict one type of a heater 2300 according to an embodiment of the present disclosure. The heater 2300 may be inserted into an exhaust converter (e.g., a catalytic converter, SCR, oxidation catalyst, DPF, etc.) of the foregoing embodiments of the present disclosure from the outside thereof and may be screwed in place. As such, the heater 2300 may be removably attached to the exhaust converter of the present disclosure. The heater 2300 may also be inserted into the tubes of the exhaust system. More specifically, such heater may be provided as an aftermarket part and installed in an exhaust tube of an existing vehicle without having to modify the catalytic converter, SCR or DPF components. The same or similar type of heater 4100 is also shown in FIG. 41. The heater 2300/4100 may be formed of a heating wire 2304/4104 helically wrapped around a support stud/rod 2308/4108. The support stud/rod 2308/4108 may be connect to a positive or negative terminal; in one embodiment the support stud/rod 2308/4108 is connected to a negative terminal and may be connected to the housing in which the heater is inserted. The heater 2300/4100 may include a connector stud 2310/4110 which may be connect to a positive or negative terminal; in one embodiment the connector stud 2310/4110 is connected to a positive terminal and configured to be accessible external to the exhaust converter or exhaust tube. FIG. 41 illustrates the external power source connectors 4120 and 4130 which are connected to the heater 4100. In one embodiment, 4120 is a positive power supply cable and 4130 is a negative power supply cable. In another embodiment, 4120 is a negative power supply cable and 4130 is a positive power supply cable. The power source cables 4120 and 4130 may be connected in a variety of ways know to a person of ordinary skill in the art; in GIF. 41 they are illustrated as electrical lugs which are screwed/bolted to the associated terminal.

Figure 25:
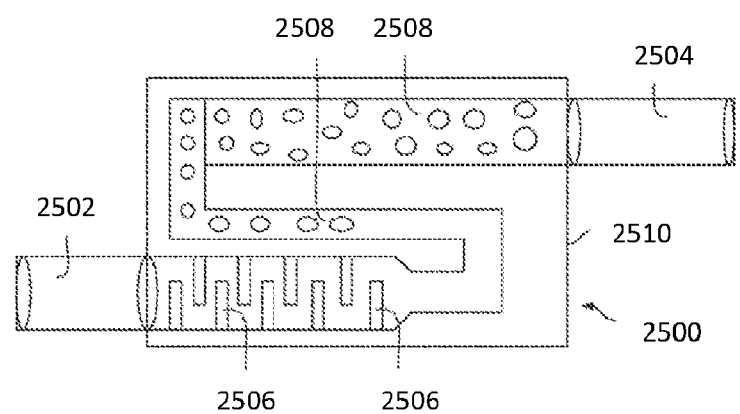
FIG. 25 is a top view of a muffler, according to one or more embodiments of the present disclosure.
Figure 26:
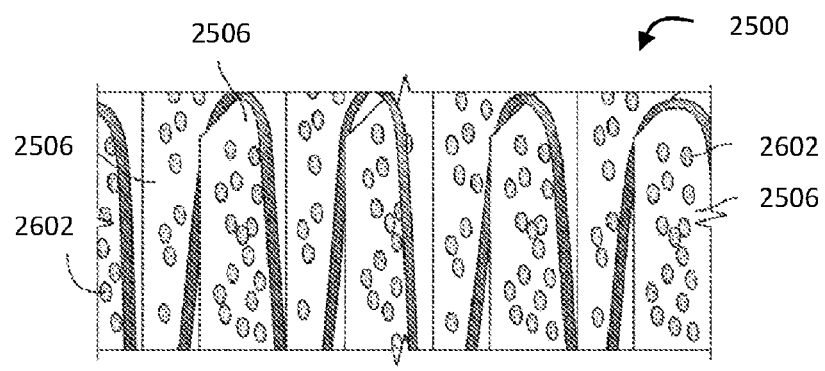
FIG. 26 is a sectional view of the muffler of FIG. 25, according to one or more embodiment the present disclosure.

FIGS. 25 and 26 shows a muffler 2500 according to an embodiment of the present disclosure. In one embodiment, the muffler 2500 may be utilized in the exhaust system 1600 of FIG. 16 that may be configured or designed for an internal combustion engine that may be configured to operate on gasoline or diesel. The muffler 2500 may include a housing 2510 in which one or more silencers 2508 and a plurality of plates 2506 that are interspersed and/or spaced from each other may be located. The plates 2506 may be formed of, for example, steel, and may be coated with one or more noble metal(s) 2602 (such as described above in FIG. 2B). The noble metal coating 2602 may disrupt the flow of the exhaust gases within the housing 2510 such that they become turbulent, which in turn slows the flow of the hot exhaust gases as they pass from an inlet 2502 of the muffler 2500 through and exit the housing 2510 though an outlet 2504. The disruption of the exhaust gases within the muffler 2500 due to the plates 2506 coated with one or more noble metals 2602 allows the exhaust gases and particulate matters more time within the muffler 2500 to burn off and/or oxidize prior to exiting the muffler 2500 and entering the environment. In addition, the plurality of plates 2506 inside the inlet 2502 may recirculates the exhaust air in and out, and may cut down NOx, for example, about 15%.

Figure 27:
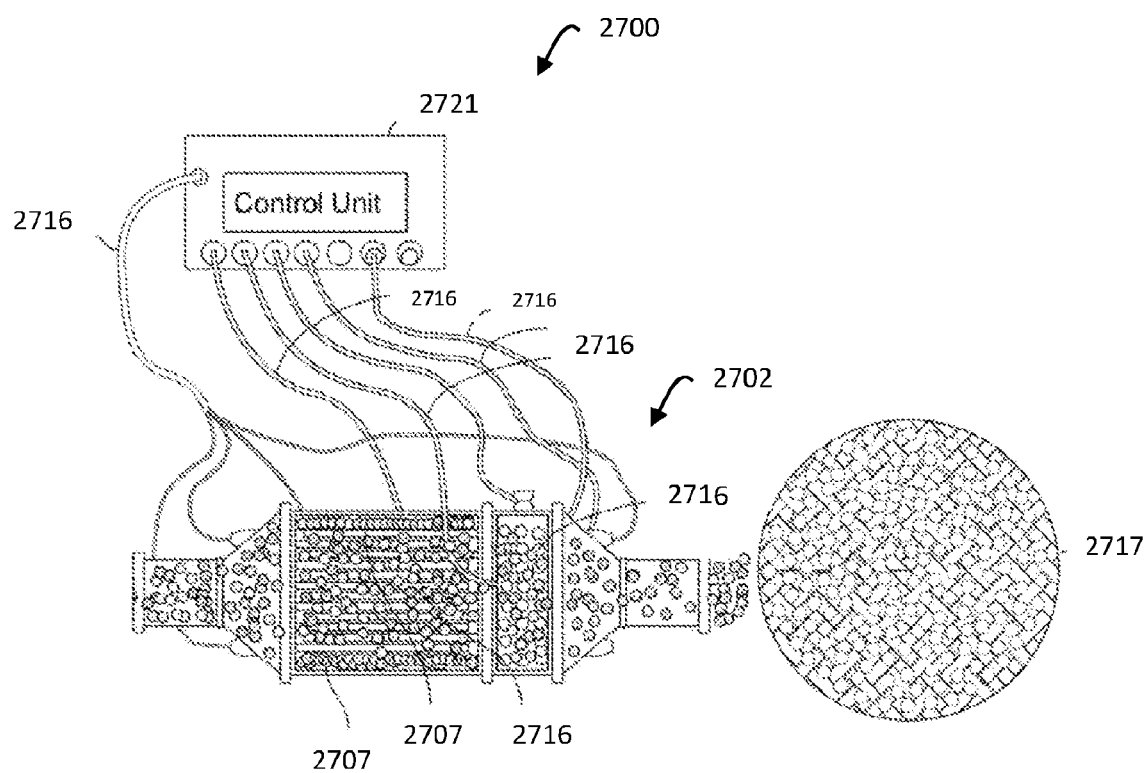
FIG. 27 shows an exemplary exhaust system, according to one or more embodiments of the present disclosure.

FIG. 27 shows an exemplary exhaust system 2700 according to an embodiment of the present disclosure. The exhaust system 2700 may include a catalytic converter 2702 and a control unit 2721 electrically coupled to the catalytic converter 2702. The catalytic converter 2702 may include components similar to the components of the foregoing catalytic converters described according to the embodiments of FIG. 1-26. The control unit 2709 may be electrically coupled to the catalytic converter 2702 via one or more electrical leads (or cables) 2706 to facilitate the operation of the exhaust system 2700 by controlling one or more of the heating elements 2717 based on readings from the one or more sensors. In this embodiment, the catalytic converter 2702 may include a plurality of magnets 2707 and a heating element 2717 to facilitate rapid heating of the catalytic converter 2702.

Figure 28:
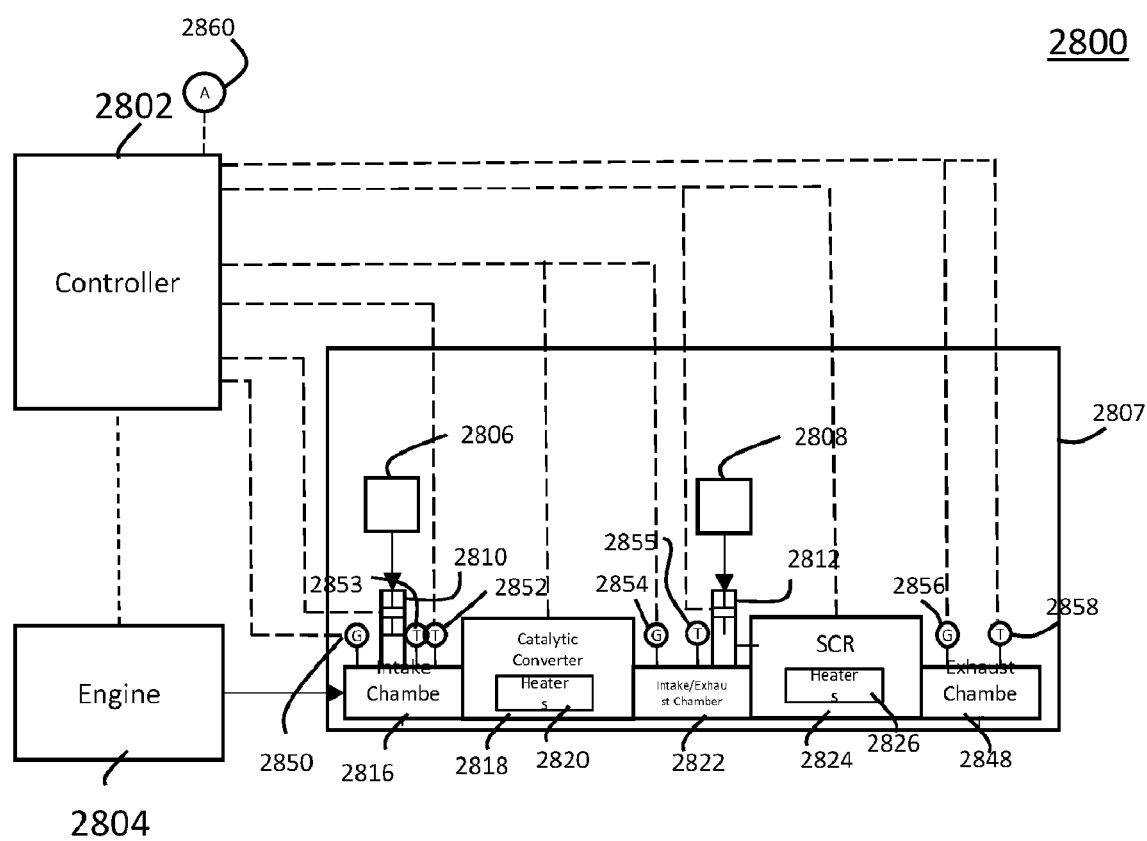
FIG. 28 shows an exemplary exhaust system, according to one or more embodiments of the present disclosure.

FIG. 28 shows an exhaust system 2800 according to an embodiment of the present disclosure. The exhaust system 2800 may include a controller 2802 coupled to an exhaust converter system 2807. The exhaust converter system 2807 may be coupled to an engine 2804 that may generate harmful gases and particulate matters, for example, due to an internal combustion of fossil fuel by the engine 2804. The controller 2802 may be electrically coupled to the engine 2804 and the exhaust converter system 2807. The controller 2802 may be configured to receive various signals and/or data from the engine 2804 and the exhaust converter system 2807 to facilitate controlling of the engine 2804 and the exhaust converter system 2807 to sufficiently operate a vehicle or a machine.

In one embodiment, the exhaust converter system 2807 may include an intake chamber 2816 coupled to the engine 2804 to communicate exhaust gases from the engine 2804 to a catalytic converter 2818. The catalytic converter 2818 may include one or more heaters 2820 and other components associated with a catalytic converter as described above in accordance with the foregoing embodiments of FIGS. 1-27. The exhaust converter system 2807 may further include an intake/exhaust chamber 2822 to communicate filtered (or converted) and/or reduced gases down to a selective reduction catalyst filtering system (SCR) 2824. The SCR 2824 may include one or more heaters 2826 and other components associated with the foregoing SCR according to the embodiments of FIGS. 1-27. Further, the exhaust converter system 2807 may include an exhaust chamber 2848 that may be coupled to a muffler (not shown for clarity of illustration and description).

In one embodiment, the exhaust converter system 2807 may include gas sensors 2850, 2854, 2856. For example, the gas sensor 2850 may be coupled to the intake chamber 2816, the gas sensor 2854 may be couple to the intake/exhaust chamber 2822, and the gas sensor 2856 may be coupled to the exhaust chamber 2848. The gas sensors 2850, 2854, 2856 may include, for example, an oxygen (e.g., $O_2$) sensor, but are not limited thereto and any suitable gas sensor may be utilized based on the desired application of the exhaust system 2800. Additionally, the exhaust converter system 2807 may include temperature sensors 2852, 2853, 2855, 2858, and dosing injectors 2810, 2812 coupled to solution tank 2806, 2808 for injecting or pumping a dosing solution, such as a urea, salt water, or ammonia solution, among other possible solutions, to the exhaust flow gas. The gas sensor 2850 may be arranged before the catalytic converter 2818, and the gas sensor 2854 may be arranged between the catalytic converter 2818 and the SCR 2824.

The controller 2802 may receive signals from the temperature sensor 2852 to controls the heater 2818. Further, the controller 2802 may receive signals from the temperature sensor 2853 to control the dosing injector 2810. For example, when a predetermined temperature in the catalytic converter 2818 is detected by the temperature sensor 2853, the controller 2802 may send command signals to the dosing injector 2810 to inject or shoot dosing solution into the catalytic converter 2818. In one embodiment, the dosing injector 2810 may continuously inject dosing solution supplied by the solution tank 2806 into the catalytic converter 2818 at a predetermined interval if the temperature sensor 2853 detects that a predetermined temperature is maintained. Alternatively, the temperature sensor 2853 may be configured to detect a predetermined temperature range, for example, about 340 to 410 degrees Celsius. In other words, the dosing solution injected into the catalytic converter 2818 at the predetermined temperature or the predetermined temperature range may improve reduction or removal of harmful gases (e.g., NOx, etc.) in the catalytic converter 2818.

In one embodiment, the gas sensor 2850 may detect the condition or state of the exhaust gas in the intake chamber 2816, and the gas sensor 2854 may detect the condition or state of the exhaust gas in the intake/exhaust chamber 2822. That is, the gas sensors 2850, 2854 may transmit data related to the condition or state of the exhaust gas to the controller 2802. Accordingly, the controller 2802 may utilize the received gas data to monitor the effectiveness of the catalytic converter 2818 and to perform appropriate functions to achieve desirable performance of the catalytic converter 2818. Further, the controller 2802 may utilize the received gas data and display the gas monitoring information on one or more displays coupled to the exhaust system 2800. In one embodiment, the controller 2802 may automatically control the engine 2804 and/or the exhaust converter system 2807 to achieve desired performance and and/or functionality of the exhaust system 2800. In another embodiment, an operator of the exhaust system 2800 may manually control the engine 2804 and/or the exhaust converter system 2807 to achieve desired performance and/or functionality of the exhaust system 2800 based on the gas and/or temperature monitoring data displayed on the display coupled to the exhaust system 2800. In yet another embodiment, the exhaust system 2800 may be controlled both automatically and manually.

In one embodiment, the temperature sensor 2852 may detect the internal temperature of the catalytic converter 2818. The controller 2802 may utilize the temperature data received from the temperature sensor 2852 to control the heater 2820. That is, the controller 2802 may control the heater 2820 to maintain a desired temperature inside of the catalytic converter 2818 to achieve desired performance (e.g., sufficient reduction of harmful exhaust gases and particulate matters) and/or functionality of the catalytic converter 2818.

In one embodiment, the SCR 2824 may be controlled in the similar manner as described in relation to the catalytic converter 2818. That is, the controller 2802 may receive signals from the gas sensors 2854, 2856 and the temperature sensors 2855, 2858 to control the dosing injector 2812 and the heaters 2826, similarly to controlling the catalytic converter 2818 as described above, to achieve desired performance and/or functionality of the SCR 2824. In some embodiments, more than one SCR may be utilized in the exhaust converter system 2807 to further reduce or remove the harmful exhaust gases and particulate matters.

In one embodiment, the controller 2802 may receive data from an altitude sensor 2860. The altitude sensor 2860 may be mounted on any suitable location of a vehicle. Since the level of altitude may offset the pressures within the engine and the exhaust converter system 2807, the controller 2802 may perform appropriate functions to offset the pressure variance caused by the change in altitude. For example, at relatively higher altitude the exhaust system 2800 may intake relatively less oxygen in the engine 2804. Accordingly, the controller 2802 may transmit control signals to adjust a throttle position switch to introduce additional air into the engine 2804. The change in altitude may affect fuel efficiency as well as air pressure in the engine. That is, at a relatively higher altitude level, the engine may burn less gas. Further, relatively less air with more fuel may cause damage, for example, to the catalytic converter 2818. As such, the controller 2802 may transmit appropriate signals to various components (e.g., throttle position switch, heaters, etc.).

Figure 28A:
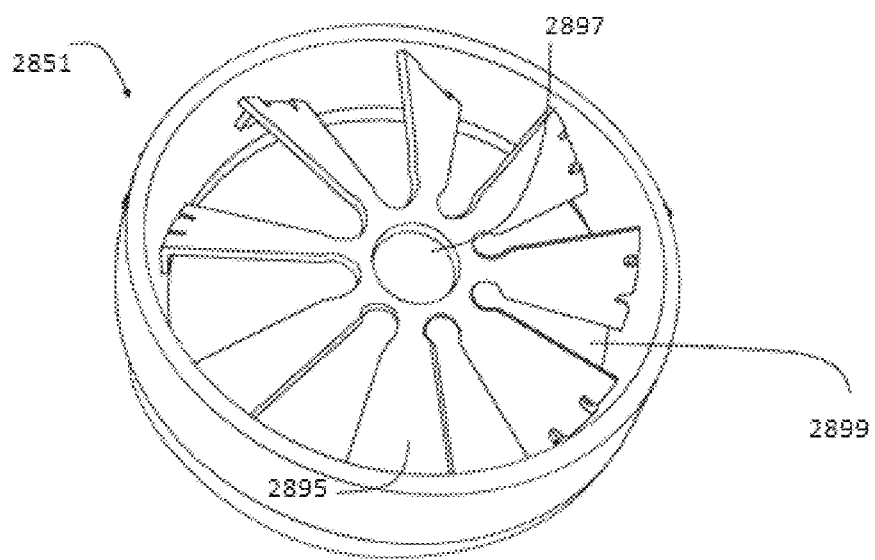
FIG. 28A shows an exemplary dosing solution distributor, according to one or more embodiments of the present disclosure.

FIG. 28A shows an exemplary dosing solution distributor 2851 according to an embodiment of the present disclosure. The dosing solution distributor 2851 is located downstream of one or more dosing injectors 2810, 2812. The one or more dosing solution distributors 2851 may be located between the dosing injectors 2810, 2812 and the catalytic converter 2818 and the SCR 2824, respectively. The dosing solution distributor 2851 may include a plurality of wings (or plates) 2895 disposed at a predetermined distance from each other. Further, the dosing solution distributor 2851 may include a plurality of openings 2899 between each of the wings 2895, and a circular aperture 2897 at the center of the dosing solution distributor 2851, as shown in FIG. 28A. The dosing solution distributor 2851 prevents deterioration (e.g., cracking) of a honeycomb filter in a catalytic converter and/or an SCR by evenly distributing the dosing solution sprayed by the dosing injectors 2810, 2812. In one embodiment, each of the wings 2895 may be angled at a predetermined angle to give a turbine effect and to distribute the dosing solution evenly to the filter of a catalytic converter and/or an SCR. The shape, size, and number of the wings 2895 are not limited thereto, and may be varied according to the desired application or performance of the dosing solution distributor 2851.

Figure 29:
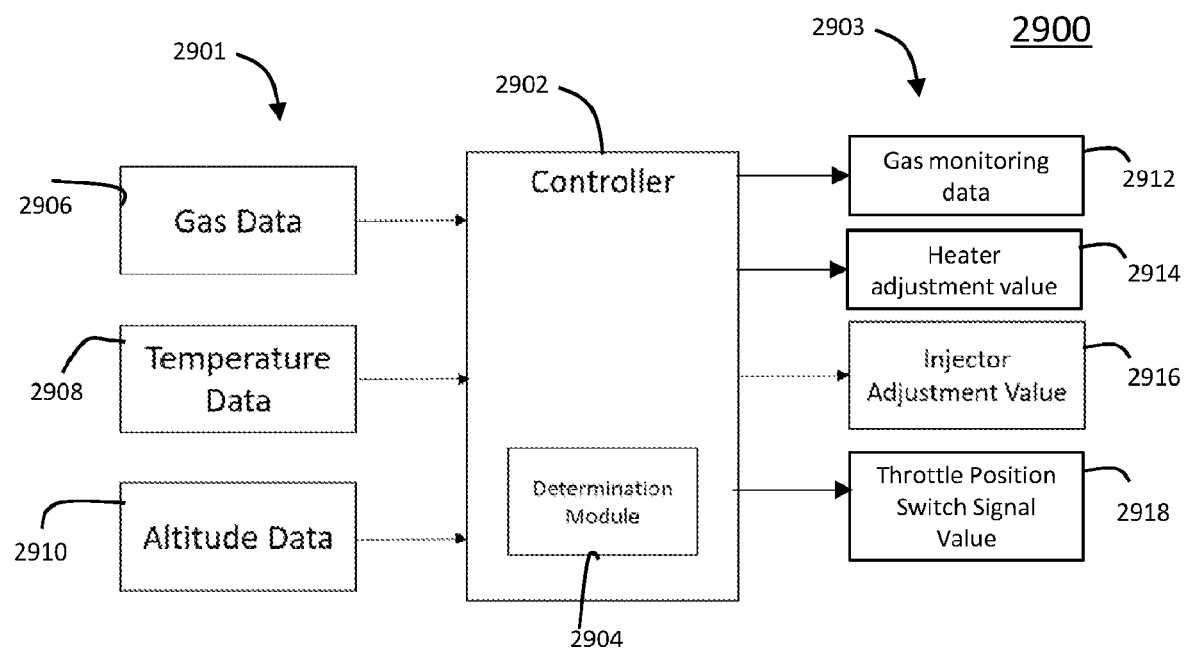
FIG. 29 shows a schematic view of an exemplary exhaust control system, according to one or more embodiments of the present disclosure.

FIG. 29 illustrates a schematic view of an exemplary exhaust control system 2900 for operation and/or control of an exhaust system according to an embodiment of the present disclosure. The exhaust control system 2900 may include a plurality of inputs 2901, for example, gas data 2906, temperature data 2908, and altitude data 2910, a controller 2902, and a plurality of outputs 2903, for example, gas monitoring data 2912, heater adjustment value 2914, injector adjustment value 2916, and throttle position switch signal value 2918. The controller 2902 may include a determination module 2904, a memory, a secondary storage device, and a processor, such as a central processing unit or any other means for accomplishing a task consistent with the present disclosure. The memory or secondary storage device associated with the controller 2902 may include non-transitory computer-readable media and may store data and/or software routines that assist controller 2902 in performing its functions, such as the process disclosed in relation to the exhaust system 2800 of FIG. 28. Further, the memory or secondary storage device associated with the controller 2902 may store data received from various inputs associated with the sensors disclosed in the exhaust system 2800 or other systems of the present disclosure. Commercially available microprocessors may be configured to perform the functions of the controller 2902. It should be appreciated that the controller 2902, could readily embody a general machine controller capable of controlling numerous other machine functions. Various other known circuits may be associated with controller 2902, including signal-conditioning circuitry, communication circuitry, actuation circuitry, and other appropriate circuitry.

In one embodiment, the controller 2902 may control one or more heaters (e.g., heaters 2818, 2826). For example, based on the temperature data 2908 received from one or more temperature sensors (e.g., temperatures sensors 2853, 2852, 2858) according to the foregoing embodiments of FIGS. 1-28, the determination module may calculate or determine a heater adjustment value 2914. The controller 2902 may then transmit the heater adjustment value 2914 to control the one or more heaters (e.g., heaters 2818, 2826) in accordance with the foregoing embodiments of the present disclosure.

In one embodiment, the controller 2902 may control one or more dosing injectors 2810, 2812. For example, based on the temperature data 2908, the determination module 2904 may calculate or determine an injector adjustment value 2916. The controller 2902 may then transmit the injector adjustment value 2916 to control to the one or more dosing injectors 2810, 2812 in accordance with the foregoing embodiments of the present disclosure. In one embodiment, the determination module 2904 may utilize the altitude data 2910, to calculate or determine the throttle position switch signal value 2918. The controller 2902 may then control a throttle position switch in accordance with the foregoing embodiments of the present disclosure. In one embodiment, the determination module 2904 may generate gas monitoring data 2912 based on gas data 2906 received from one or more gas sensors (e.g., 2850, 2854, 2856). For example, the determination module may compare the amount gas detected by the gas sensor 2850 and the gas sensor 2854. The determination module may then generate gas monitoring data 2912. The controller 2902 may then transmit the gas monitoring data 2912 to a display according to the foregoing embodiments according to the present disclosure. In some embodiments, the determination module 2904 may utilize gas data 2906, temperature data 2907, and altitude data 2910 simultaneously or sequentially to determine appropriate data and values for controlling the heaters, injectors, throttle position switches, and/or displays in accordance with the embodiments of the present disclosure. Accordingly, the controller 2902 may be configured to facilitate automatic and/or manual control of the heaters, injectors, throttle position switches, and/or displays according to the embodiments of the present disclosure.

In one embodiment, a catalytic converters according to the foregoing embodiments may be placed or arranged so that exhaust gases may flow from one or more inlet ports according to the foregoing embodiments through one or more disruptor plates (in some embodiments) of the foregoing embodiments, and through one or more heaters or heating elements of the foregoing embodiments. Additionally, the exhaust gases may be additionally heated in some embodiments by one or more additional heaters and subjected to magnetic fields by the magnets of the foregoing embodiments. The additional heaters and/or magnetic fields may interact with the individual molecules and ions of the gases passing through catalytic converters and increase the efficiency of catalytic conversion that takes place before exiting a catalytic converter. In addition to heaters being included within a catalytic converter, the heaters may be added to existing catalytic converters on a vehicle or a machine.

According to testing results, exhaust systems equipped or modified according to the foregoing embodiments of the present disclosure resulted in carbon emissions, waste gases (NOx, CO, etc.) and particulate matters reduction by, about, 95-99% in gasoline powered cars and 90-97% in diesel power cars.

Figure 30A:
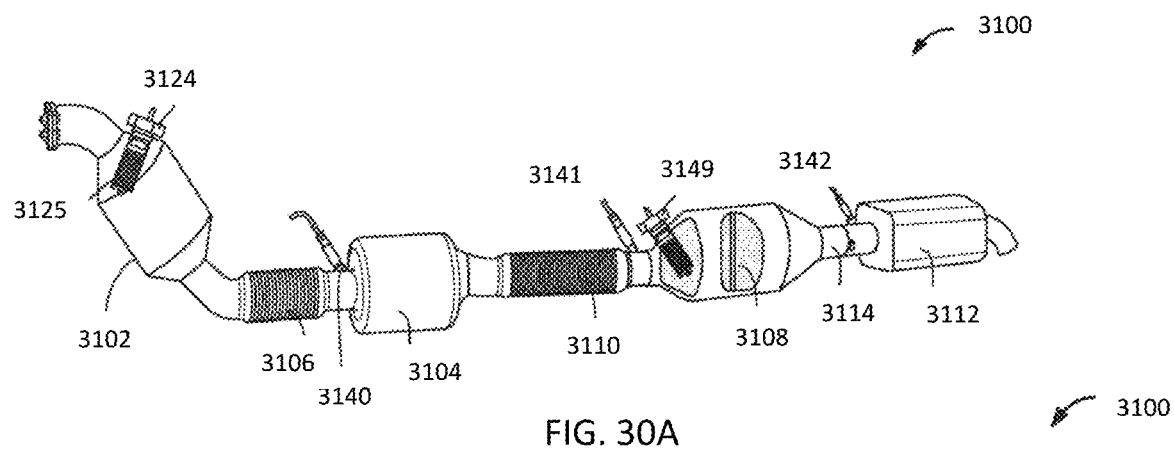
FIGS. 30A-30C show an exhaust system for a vehicle that runs on diesel fuel, according to one or more embodiments of the present disclosure.
Figure 30B:
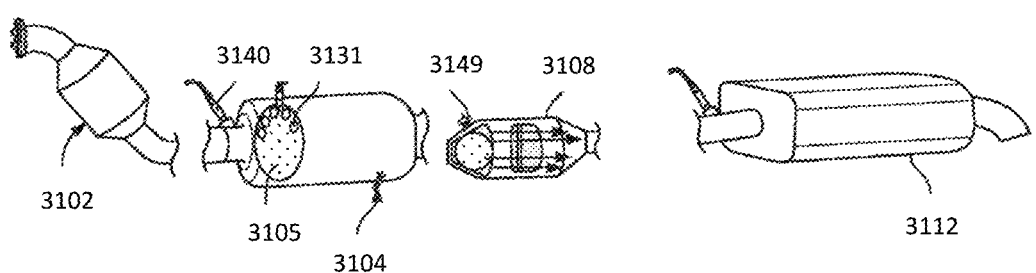

FIGS. 30A and 30B illustrate an embodiment of an exhaust system 3100 for a vehicle that runs on diesel fuel. As shown in FIGS. 30A and 30B, the exhaust system 3100 may include an oxidation catalyst 3102, a diesel particulate filter (DPF) 3104, a selective catalytic reduction filtration system (SCR) 3108, and a muffler 3112. Although the oxidation catalyst 3102, and DPF 3104, and SCR 3108 are shown separately, in some embodiments, the oxidation catalyst 3102, DPF 3104, and/or SCR 3108 may be combined into a single unitary system included in a single housing. The exhaust system 3100 may further include a first tubing 3106 that connects the oxidation catalyst 3102 to the diesel particulate filter 3104, and a second tubing 3110 that connects the DPF 3104 to the SCR 3108, and a third tubing 3114 that connects SCR 3108 to the muffler 3112. The exhaust system 3100 may also include heaters 3124, 3149 and sensors 3140, 3141, 3142.

Figure 30C:
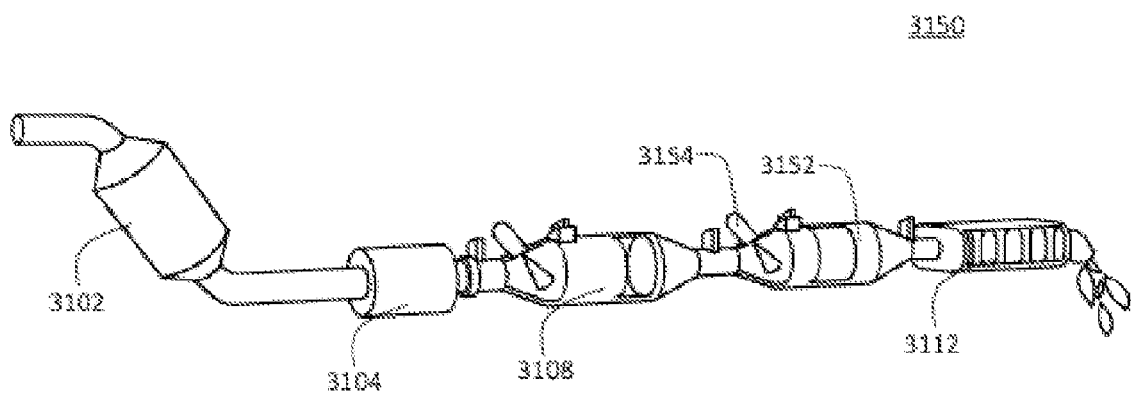

FIG. 30C shows an exhaust system 3150 according to another embodiment of the present disclosure. The exhaust system 3150 may include the similar components as those shown in FIGS. 31A and 33B. In addition, the exhaust system 3150 may include an additional SCR 3152 including an injector 3154. The additional SCR 3152 and the injector 3154 in this embodiment may facilitate additional reduction and removal of the harmful gases after being treated by the oxidation catalyst 3102, the diesel particulate filter 3104, and the SCR 3108.

As depicted in FIG. 31, the oxidation catalyst 3102 may include a housing 3216, an inlet 3218 where exhaust gases enter a cavity 3220 of the housing 3216 and an outlet 3222 where the exhaust gases exit the housing 3216. An oxygen sensor (e.g., 02 sensor) may be fixed externally to the housing 3216 and may extend into the cavity 3220, downstream of the inlet 3218 to assess the percentage of oxygen in the exhaust gas. An electric heater 3124 (see FIG. 32) may extend into the cavity 3220 from outside of the housing 3216. The heater 3124 may be connected external of the oxidation catalyst 3102 to a power source and an electronic control unit. The heater 3124 depicted in FIG. 30A may include a wound metal coil 3125. However, the heater 3124 can take any form to ensure internal hearting of the oxidation catalyst 3102. To assess the temperature of the exhaust gas prior to exiting the oxidation catalyst 3102, a heat sensor may be located near the inlet 3218 and/or outlet 3222.

As shown in FIG. 31, within the cavity 3220 of the housing 3216, downstream of the heater 3124, at least one filter 3226 is arranged. The filter 3226 is configured to filter harmful gases and particulate including, but not limited to, carbon dioxide ($CO_2$), carbon monoxide (CO), nitrogen oxide (NOx) as well as hydrocarbons (HC), particulate matter (PM) and other harmful chemicals and debris. The filter 3226 may be formed of, for example, ceramic, and may be coated with one or more noble metals 3228 (such as described above in FIG. 2B) and may include a plurality of honeycomb shaped openings. The openings of the filter 3226 are configured to disrupt the flow of exhaust gases and trap particulate matter to prevent the particulate matter from being emitted into the environment.

A plurality of rods 3230, which may be formed of a heat-treated metal or alloy (e.g., copper or steel) may extend longitudinally through the honeycomb structure of the filter 3226. The rods 3230 may also or instead extend across the filter 3226. Additionally, one or more magnets 3232 may be disbursed inside of the housing 3216. The magnets 3232 may be arranged near or in contact with the filter 3226 and/or within the filter 3226.

Similar to an engine that utilizes gasoline as disclosed above in reference to FIG. 16, upon startup of a diesel engine that utilizes the exhaust system 3100 from a cold start, the electric heater 3124 may simultaneously be turned on by an electronic control unit (ECU) to aid in heating the internal temperature of the oxidation catalyst 3102, DPF 3104, and SCR 3108 above a temperature of the exhaust gases and particulate matters. The heater 3124 may remain on after reaching a desired temperature or it may be turned off and then turned back on if the temperature within the oxidation catalyst 3102, DPF 3104, and/or SCR 3108 drops below a threshold temperature. The rods 3230 are configured to accelerate heating the internal temperature of the oxidation catalyst 3102 to a desired internal temperature and aid in maintaining the desired internal temperature at least throughout the filter 3226 and surrounding internal surface area.

By increasing the internal temperature of the oxidation catalyst 3102, harmful chemicals and particulates that are part of the exhaust gas are oxidized and/or burned off before exiting the oxidation catalyst 3102. The noble metal filter coating 3228 aids to further slow and disrupts the flow of the exhaust gases traversing across the inside of the cavity of the oxidation catalyst 3102 such that more of the harmful exhaust emissions can be heated above a threshold temperature and burn off prior to exiting the oxidation catalyst 3102.

The magnets 3232 further disrupt and slow the flow of exhaust gases and particulates as they pass through the oxidation catalyst 3102, similar to the magnets 1232, 1632, 1646 incorporated into the gasoline exhaust system 1600 and catalytic converter 1200, by increasing the electric current within the cavity 3220 of the oxidation catalyst 3102 via the polarity of the magnets 3232. Disrupting and slowing the flow of exhaust gases and particulates allows for heating of the exhaust gases for a longer period of time within the cavity 3220 of the oxidation catalyst 3102 and in turn further oxidization and reduction of toxic byproducts of exhaust gases. Upon exiting the oxidation catalyst 3102, the remaining harmful exhaust gases, particulates and debris travel through the tubing 3110 and into the diesel particulate filter 3104. The diesel particulate filter 3104 may be designed to trap particulates (e.g. soot) after they exit the oxidation catalyst 3102 and prior to exiting the exhaust system 3100 and being emitted into the environment.

As shown in FIG. 32, the diesel particulate filter 3104 includes a ceramic filter 3105 that may have a plurality openings (e.g., honeycomb shaped openings) that are configured to trap particulates (e.g., soot) to prevent the particulates from being emitted into the environment. Similar to the filters of the foregoing embodiments of the present disclosure, the filter 3105 may be coated with one or more noble metals 3336 and may include a plurality of rods 3338 that extend through the honeycomb structure. The rods 3338 may be formed of a heat-treated metal or alloy (e.g., copper or steel). Additionally, one or more magnets 3339 may be disbursed near or in contact with the filter 3105 and/or within the filter 3105.

In order to reduce the particulate matter that has accumulated on the filter 3105 and prevent the particulate matter from blocking the filter 3105 and in turn creating backpressure in the exhaust system 3100, the filter 3105 must be cleaned through regeneration by burning off the particulate that has accumulated on the filter 3105. There are two types of regeneration-active regeneration and passive regeneration. Active regeneration involves raising the actual exhaust gas temperature by introducing additional thermal energy. In contrast, passive methods are based on lowering the required temperatures to a range in which the available temperature is adequate for regeneration. Unlike existing regeneration systems, a heater 3140, which communicates with an electronic control unit, may be placed upstream of the DPF 3104 and may be used in combination with the rods 3338, noble metal coating 3336 and one or more magnets 3339 arranged within the DPF 3104 to increase the electrical current (via the magnets 3339), disrupt the flow of exhaust gases and particulate matter (via the noble metal coating 3336) and raise the temperature of the filter 3105 (via the rods 3338) and in turn raise the temperature of the particulates that are trapped on and within the filter to oxidize the particulate and create a gaseous byproduct (i.e., $CO_2$). Additionally, the percentage of nitrogen dioxide in the exhaust gas is reduced and converted to nitrogen monoxide. This chemical process is constantly repeated so that the filter 3105 may be continuously cleaned during regular operation of the exhaust system. As such, no additional aid may be needed with regeneration, for example, with the assistance from an engine management system.

Downstream of the diesel particulate filter 3104 is the selective catalytic reduction system 3108, which, similar to the SCR 1604 in the gasoline exhaust system 1600, is configured to reduce nitrogen dioxide gases by oxidizing them and converting them into harmless exhaust emissions (e.g., nitrogen, water, and a small amount of carbon dioxide) that are emitted out of the exhaust system 3100 and into the environment without the need to introduce a liquid-reductant agent that into the exhaust stream.

The SCR 3108 may include a filter 3342 having a plurality of openings (e.g., honeycomb shaped openings) 3344 and small holes 3346 dispersed about the filter 3342. Similar to the SCR 1604 in the gasoline exhaust system 1600, the filter 3342 may be coated with one or more noble metals 3348 (such as described above in FIG. 2B), and may include a plurality of rods 3350 that extend through the honeycomb structure and one or more magnets 3347 dispersed about the filter 3342.

Referring to back FIG. 30A, an electric heater 3149, which communicates with an electronic control unit, may be provided in the selective catalytic reduction system 3108, upstream of filter 3342. The heater 3149 may be configured to raise the internal temperature of the selective catalytic reduction system 3108 above a threshold temperature in conjunction with the rods 3350 and metal coating 3348 to ensure that the internal temperature across the filter 3342 and surrounding internal surface area is greater than the temperature of the remaining exhaust gases and particulate matter and is maintained to further reduce the percentage of nitrogen oxide gases as they travel across the filter 3342. The small holes 3346 and magnets 3347 may be included to aid in further disrupting the flow of exhaust gases as they travel within the selective catalytic reduction system 3108 and to provide more time for the exhaust gases to oxidize and/or be burned off as they pass through the heated selective catalytic reduction system 3108 before exiting. The SCR 3108 may include one or more nitrogen oxide sensors to ensures that the SCR 3108 operates efficiently.

Upon exiting the SCR 3108, the remaining exhaust gases may flow through the tubing 3114 to the muffler 3112. The muffler 3112 may be substantially similar to the muffler 1608 for the gasoline exhaust system 1600. As depicted in FIGS. 25 and 26, the muffler 3112 may include a housing in which one or more silencers and a plurality of plates that are interspersed and/or spaced from each other are located. The plates, which can, for example, be formed of steel, are coated with one or more noble metal(s). The noble metal coating (such as described above in FIG. 2B) may aid to disrupt the flow of the exhaust gases within the housing such that they become turbulent, which in turn slows the flow of the hot exhaust gases as they pass from an inlet of the muffler 3112 through and exit the muffler housing though an outlet. The disruption of the exhaust gases within the muffler 3112 due to the inclusion of the noble metal coated plates allows the exhaust gases and particulate matter more time within the muffler 3112 to burn off and/or oxidize prior to exiting the muffler 3112 and entering the environment.

Figure 42:
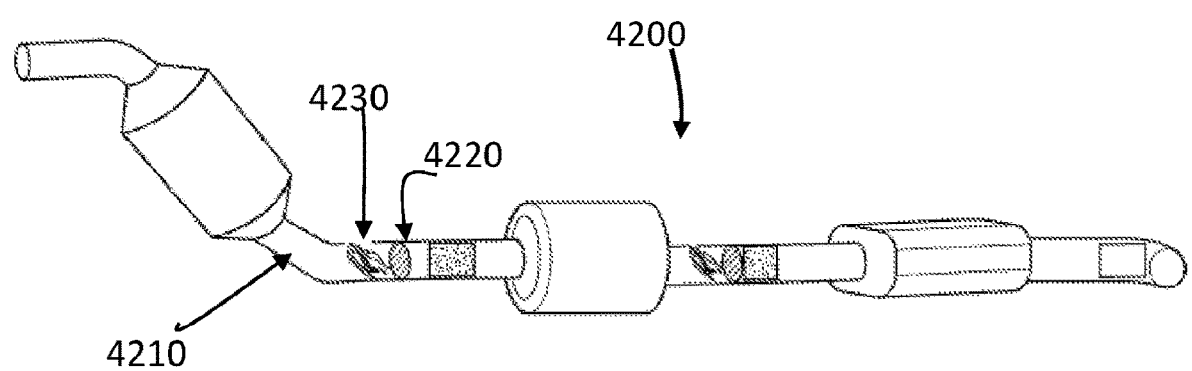
FIGS. 42 and 43 are assembly views of an exhaust system having an exhaust pipe heater, according to one or more embodiments of the present disclosure.
Figure 43:
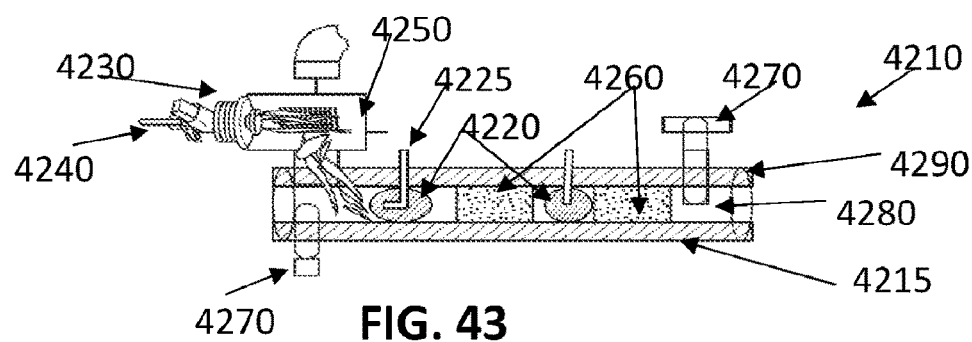

According to another embodiment of the invention, one or more heaters 4220 may be attached to or disposed inside one or more of various exhaust pipes 4210 (e.g., connection pipes, extension pipes, etc.) of an exhaust system 4200 (herein, "exhaust pipe heater"), such as shown in FIGS. 42 and 43. The exhaust pipes 4210 may be made from aluminized or stainless steel.

For example, in an exhaust system 4200 for a gasoline powered engine, one or more exhaust pipe heaters 4220 may be disposed inside the exhaust pipe 4210 at a location that is before the inlet port of the catalytic converter, between the catalytic converter and the SCR, and/or between the SCR and the muffler. Similarly, in an exhaust system 4200 for a diesel powered engine, one or more exhaust pipe heaters 4220 may be disposed within the exhaust pipe 4210 at a location that is before the diesel oxidation catalyst, between the diesel oxygen catalyst and the DPF, and/or between the DPF and the SCR. The exhaust pipe heaters 4220 may receive power from a power supply (not shown) via an electrical connector 4225 (such as electrical connectors 1724, 1734 described above). The exhaust pipe heaters may be separately powered via separate electrical connectors 4225 or powered together via a single electrical connector 4225. In a gasoline or diesel powered vehicle, the exhaust pipe heaters 4220 may be electrically connected to and powered by the vehicle's primary battery (not shown) or alternatively a secondary battery (not shown) via one or more electrical connectors 4225.

The exhaust pipe heaters 4220 can be installed within an existing exhaust pipe 4210 of an exhaust system 4200 or as part of a replacement exhaust pipe 4210 for an existing exhaust system. For example, the replacement exhaust pipe 4210 having the one or more exhaust pipe heaters 4220 may be connected to the exhaust manifold, the catalytic converter, the SCR, and/or the muffler of the exhaust system 4200. It is understood that some catalytic converters are integrated into the exhaust manifold.

As shown in FIGS. 42 and 43, the exhaust pipe 4210 may further comprise a dosing system 4230. The dosing system 4230 may include a dosing injector 4240 (such as dosing injectors 2810, 2812 described above) coupled to a dosing solution tank 4250 (such as dosing solution tanks 2806, 2808 described above) for injecting or pumping a dosing solution, such as a urea, salt water, or ammonia solution, among other possible solutions, to the exhaust flow gas. The exhaust pipe 4210 may further include one or more gas sensors 4270 (such as gas sensors 2850, 2854, 2856 described above). Additionally, the exhaust pipe may include a temperature sensor (such as temperature sensors 2852, 2853, 2855, 2858 described above), The dosing solution may be injected into the exhaust pipe 4210 at a predetermined temperature or a predetermined temperature range to further improve reduction or removal of harmful gases (e.g., NOx, etc.) in the exhaust pipe 4210.

Accordingly, as discussed above, a controller (such as controller 2802 described above) (not shown) may receive signals from the gas sensors 4270 and/or temperature sensor to control an amount of current supplied to the heater and the timing in which the current is supplied to the exhaust pipe heater 4220 based on the received signals. Additionally, the dosing system 4230 may receive signals from the controller to control a timing and a duration of the dosing solution spray based on signals received from the one or more sensors. For example, when a predetermined temperature in the exhaust pipe 4210 is detected by the temperature sensor, the controller may send command signals to the dosing injector to inject or shoot dosing solution into the exhaust pipe based on the detected temperature. In one embodiment, the dosing injector 4240 may continuously inject dosing solution supplied by the dosing solution tank 4250 into the exhaust pipe 4210 at a predetermined interval if the temperature sensor detects that a predetermined temperature is maintained. Alternatively, the temperature sensor may be configured to detect a predetermined temperature range, for example, about 340 to 410 degrees Celsius. In other words, the dosing solution injected into the exhaust pipe 4210 at the predetermined temperature or the predetermined temperature range may improve reduction or removal of harmful gases (e.g., NOx, etc.) in the exhaust pipe 4210. Additionally, the temperature sensor may detect the internal temperature of the exhaust pipe. The controller may utilize the temperature data received from the temperature sensor to control the exhaust pipe heater 4220. That is, the controller may control the exhaust pipe heater 4220 to maintain a desired temperature inside of the exhaust pipe 4210 to achieve desired performance (e.g., sufficient reduction of harmful exhaust gases and particulate matters) and/or functionality of the exhaust system.

Additionally, the exhaust pipe 4210 may include one or more magnets (such as magnets 607 described above) located or arranged on or adjacent to an exterior surface 4215 of the exhaust pipe 4210. The magnets (not shown herein) may have a curved shape to approximate the outer geometry of the exhaust pipe and may be disposed in an array having alternating polarities (such as shown in FIG. 7 above). In one embodiment, the magnets facing each other may have opposing polarities. Alternatively, the magnets may have the same polarity and the polarity may not vary along the longitudinal or horizontal direction of the exhaust pipe 4210. Having magnets facing each other with opposite polarities results in a stronger magnetic field. In one embodiment, the plurality of magnets may include one or more neodymium magnets. In another embodiment, the one or more magnets may be electromagnets. However, any suitable magnets may be used depending on the desired application. Additionally, the exhaust pipe 4210 may include an outer shell or an outer surface (e.g., tape, fastener, covering, etc.) (not shown) and one or more of the magnets may be arranged or disposed between an exterior surface of the exhaust pipe and the outer shell. Additionally, the exhaust pipe may comprise one or more filters 4260 (such as filter 110 described above).

According to an embodiment, the exhaust pipe 4210 is configured to be coupled to an exhaust system component. The exhaust system component may include one or more of the following: an exhaust manifold, a catalytic converter, a selective catalytic reduction system (SCR), a diesel oxidation catalyst, a diesel particulate filter (DPF), a selective catalytic reduction system (SCR), and a muffler. The exhaust pipe 4210 may include an exhaust pipe heater 4220 disposed inside a cavity 4280 of the exhaust pipe 4210. The exhaust pipe heater 4220 may include a housing 4290, a heating wire disposed inside the housing (such as heating wires 1804, 1906 described above), and an electrical connector 4225 attached to the housing and electrically connected to the heating wire. The electrical connector 4225 may be configured to receive power from a power supply (not shown) that is external from the exhaust pipe heater 4220 to supply electrical current to the heating wire. The exhaust pipe heater 4220 may be configured to heat gas inside the exhaust pipe 4210 to reduce toxic gases and/or particulate matter exiting the exhaust pipe 4210. The exhaust pipe 4210 may further include one or more magnets arranged adjacent to an exterior surface 4215 of the exhaust pipe 4210 to aid in disruption and slowing of the flow of exhaust gases in the cavity 4280 of the exhaust pipe 4210. The exhaust pipe 4210 may further include a second surface (not shown) that is positioned outside of the exterior surface 4215 and the one or more magnets may be disposed between the second surface and the exterior surface 4215 of the exhaust pipe 4210. The second surface may be a surface of an exterior shell, an exterior casing, tape or other adhesive, a fastener, etc.

The exhaust pipe 4210 may include an exhaust pipe heater 4220 disposed inside a cavity 4280 of the exhaust pipe 4210. The exhaust pipe heater 4220 may include a housing 4290, a heating wire disposed inside the housing (such as heating wires 1804, 1906 described above), and an electrical connector 4225 attached to the housing and electrically connected to the heating wire. The electrical connector 4225 may be configured to receive power from a power supply (not shown) that is external from the exhaust pipe heater 4220 to supply electrical current to the heating wire. The exhaust pipe heater 4220 may be configured to heat gas inside the exhaust pipe 4210 to reduce toxic gases and/or particulate matter exiting the exhaust pipe 4210. The exhaust pipe 4210 may further include one or more magnets arranged adjacent to an exterior surface 4215 of the exhaust pipe 4210 to aid in disruption and slowing of the flow of exhaust gases in the cavity 4280 of the exhaust pipe 4210. The exhaust pipe 4210 may further include a second surface (not shown) that is positioned outside of the exterior surface 4215 and the one or more magnets may be disposed between the second surface and the exterior surface 4215 of the exhaust pipe 4210. The second surface may be a surface of an exterior shell, an exterior casing, tape or other adhesive, a fastener, etc.

Figure 44:
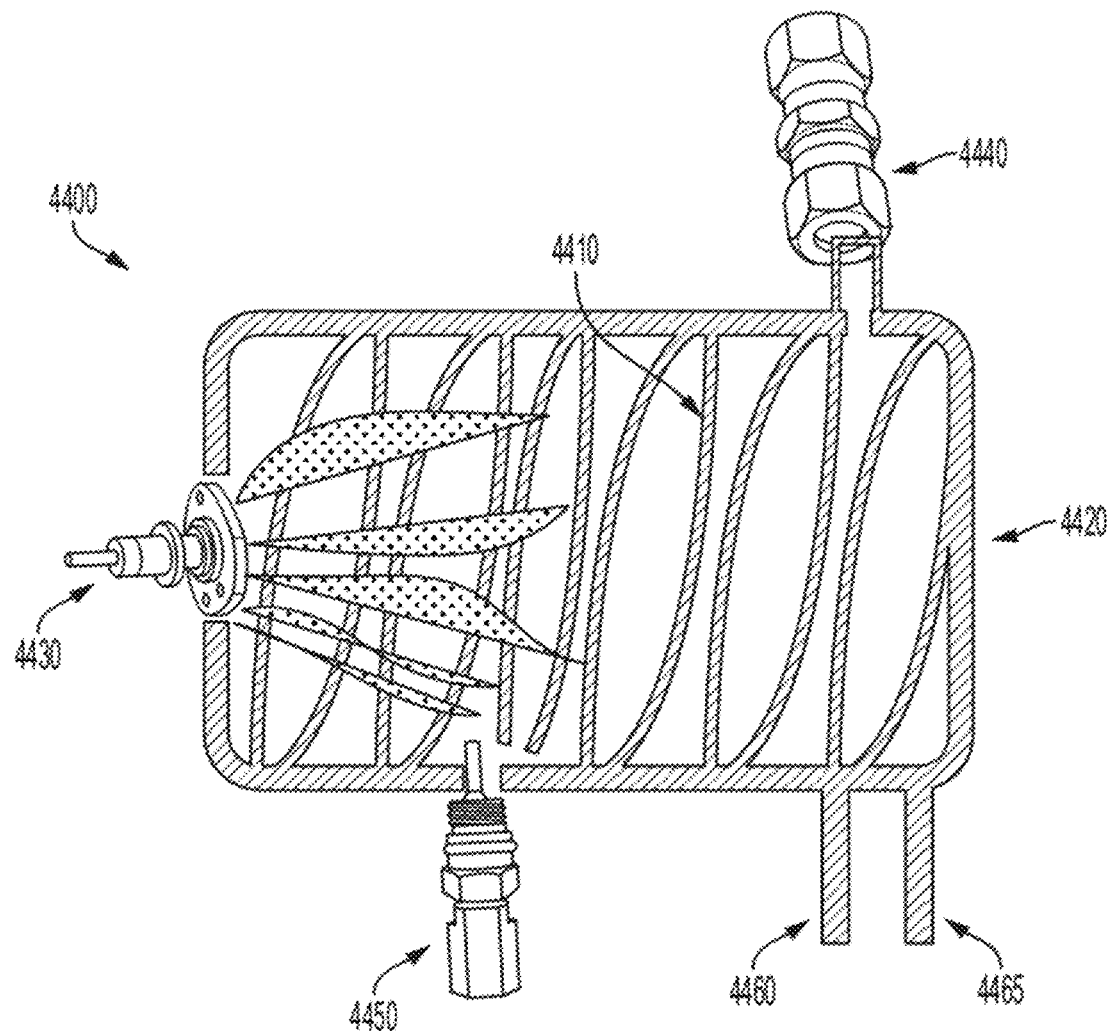
FIG. 44 is a view of an external heater, according to one or more embodiments of the present disclosure.

FIG. 44 shows an external heater 4400 according to an embodiment of the invention. The external heater 4400 may be located external and be connected to one or more components of an exhaust system. The one or more components may be a catalytic converter, a selective catalytic reduction system (SCR), a diesel oxidation catalyst, a diesel particulate filter (DPF), a selective catalytic reduction system (SCR), a muffler, or exhaust pipes of the exhaust system (shown in FIG. 46).

In one embodiment, the external heater 4400 has a heater housing 4420, which may be made of steel or aluminum (not limited thereto), and a heating wire 4410 (such as heating wires 1804, 1906 described above) or alternative a heating element disposed therein. The heating wire 4410 is not limited to any configuration or shape. The external heater 4400 may further include a connection pipe 4440 (such as a metal or flexible connection pipe or other attachment means such as connection pipe 4615 described below) and a temperature sensor 4450 (such as temperature sensors 2852, 2853, 2855, 2858 described above). Temperature sensor 4450 may also function as an altitude sensor. The external heater 4400 may further include a dosing system 4430. The dosing system 4430 may include a dosing injector (such as dosing injectors 2810, 2812, 4240 described above) coupled to a dosing solution tank (such as dosing solution tanks 2806, 2808, 4250 described above) for injecting or pumping a dosing solution, such as a urea, salt water, or ammonia solution, among other possible solutions, into the exhaust system. The dosing solution may be injected into the external heater 4400 at a predetermined temperature or a predetermined temperature range to further improve reduction or removal of harmful gases (e.g., NOx, etc.) in the exhaust system. The external heater 4400 may receive power from a power supply (not shown) via an electrical connector (such as electrical connectors 1724, 1734 described above) or via first and second terminals 4460 and 4465. For example, first terminal 4460 may be a positive terminal and second terminal 4465 may be a negative terminal. In a gasoline or diesel powered vehicle, the external heater 4400 may be electrically connected to and powered by the vehicle's primary battery (not shown) or alternatively a secondary battery (not shown) via first and second terminals 4460 and 4465.

Figure 45:
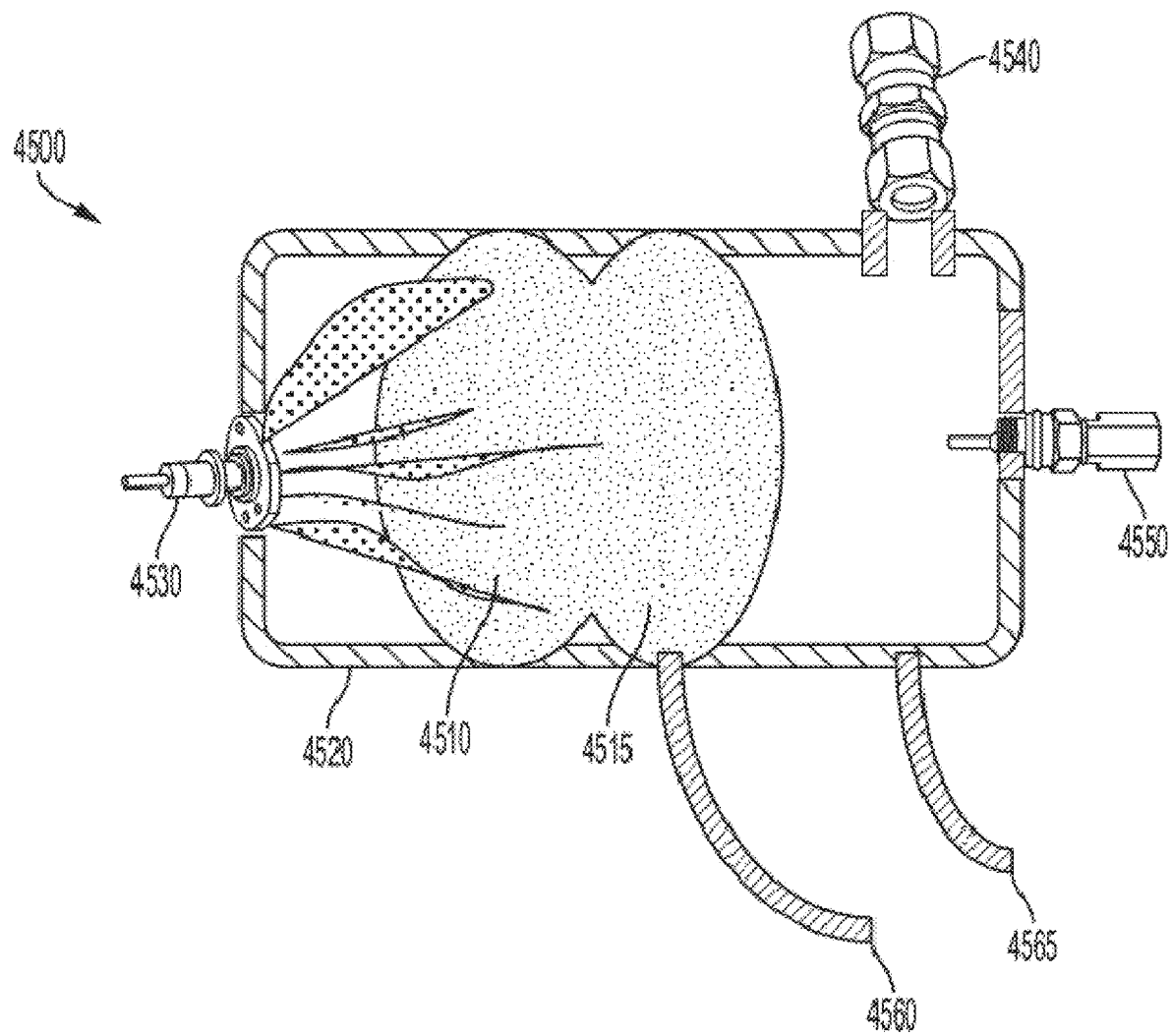
FIG. 45 is a view of an external heater, according to one or more embodiments of the present disclosure.

FIG. 45 shows an external heater 4500 according to another embodiment of the invention. The external heater 4500 may be located external and be connected to one or more components of an exhaust system. The one or more components may be a catalytic converter, a selective catalytic reduction system (SCR), a diesel oxidation catalyst, a diesel particulate filter (DPF), a selective catalytic reduction system (SCR), a muffler, or exhaust pipes of the exhaust system (shown in FIG. 46).

In one embodiment, the external heater 4400 has a heater housing 4520, which may be made of steel or aluminum (not limited thereto), and a plurality of heating elements 4510, 4515 disposed therein (such as heating elements 1908, 2008, 2717 described above). The heating elements are 4510, 4515 is not limited to any configuration or shape. The heating elements 4510, 4515 may include a heating wire (such as heating wires 1804 and 1906 described above) and/or a heating element, for example, a honeycomb or hexagonal shape heater as described above. Thus, the heating elements 4510, 4515 may act as a filter and may include a catalyst coating such as shown in FIG. 2B to aid in the removal or reduction of harmful gases and particulate matters.

The external heater 4500 may further include a connection pipe 4540 (such as a metal or flexible connection pipe or other attachment means such as connection pipe 4615 described below) and a temperature sensor 4550 (such as temperature sensors 2852, 2853, 2855, 2858, 4450 described above). Temperature sensor 4550 may also function as an altitude sensor. The external heater 4500 may further include a dosing system 4530. The dosing system 4530 may include a dosing injector (such as dosing injectors 2810, 2812, 4240 described above) coupled to a dosing solution tank (such as dosing solution tanks 2806, 2808, 4250 described above) for injecting or pumping a dosing solution, such as a urea, salt water, or ammonia solution, among other possible solutions, into the exhaust system. The dosing solution may be injected into the external heater 4500 at a predetermined temperature or a predetermined temperature range to further improve reduction or removal of harmful gases (e.g., NOx, etc.) in the exhaust system. The external heater 4500 may receive power from a power supply (not shown) via an electrical connector (such as electrical connectors 1724, 1734 described above) or via first and second terminals 4560 and 4565. For example, first terminal 4560 may be a positive terminal and second terminal 4565 may be a negative terminal. In a gasoline or diesel powered vehicle, the external heater 4500 may be electrically connected to and powered by the vehicle's primary battery (not shown) or alternatively a secondary battery (not shown) via first and second terminals 4560 and 4565.

Figure 46:
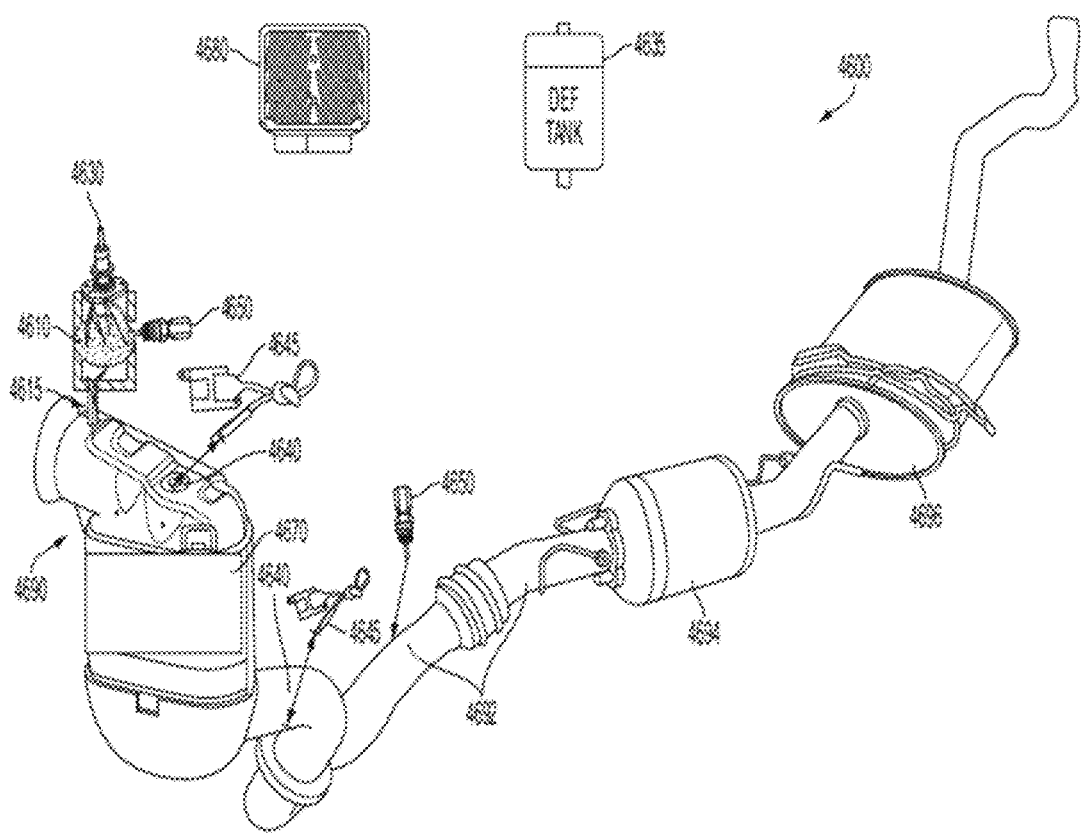
FIG. 46 is an assembly view of an exhaust system having one or more external heaters, according to an embodiment of the present disclosure.

FIG. 46 shows an exhaust system 4600 that incorporates one or more external heaters 4610 (such as external heaters 4400 and 4500 described above). In one embodiment, the exhaust system 4600 includes, but is not limited to, a catalytic converter or DPF 4690, exhaust pipes 4692, a SCR 4694 and a muffler 4696. The external heater 4610 may be connected to any one or more of the foregoing components of the exhaust system 4600. In FIG. 46 the external heater 4610 is located external and connected to the catalytic converter/DPF 4690. It is understood that the external heater 4610 can be connected to a different component, such as at an inlet of the SCR 4694, or to both the catalytic converter/DPF 4690 and the SCR 4694 (or other component, such as one or more exhaust pipe 4692).

The external heater 4610 may be connected to the exhaust system component—in this embodiment the catalytic converter/DPF 4690—via a connection pipe 4615, such as a metal or flexible connection pipe or other attachment means. Alternatively, the external heater 4610 may be directly coupled to the exhaust system component by either forming a hole and fastening the external heater 4610 to the hole or by using an existing sensor hole in the exhaust system component.

The external heater 4610 may include one or more temperature sensors 4650 (such as temperature sensors 2852, 2853, 2855, 2858, 4450, 4550 described above). Temperature sensor 4650 may also function as an altitude sensor. The external heater 4610 may further include a dosing system 4630. The dosing system 4630 may include a dosing injector (such as dosing injectors 2810, 2812, 4240 described above) coupled to a dosing solution tank 4635 (such as dosing solution tanks 2806, 2808, 4250 described above) for injecting or pumping a dosing solution, such as a urea, salt water, or ammonia solution, among other possible solutions, into the exhaust system. The dosing solution may be injected into the external heater 4610 at a predetermined temperature or a predetermined temperature range to further improve reduction or removal of harmful gases (e.g., NOx, etc.) in the exhaust system. The external heater 4610 may receive power from a power supply (not shown) via an electrical connector (such as electrical connectors 1724, 1734 described above). In a gasoline or diesel powered vehicle, the external heater 4500 may be electrically connected to and powered by the vehicle's primary battery (not shown) or alternatively a secondary battery (not shown).

The exhaust system 4600 may further include one or more gas sensors 4640 (such as gas sensors 2850, 2854, 2856 described above). The gas sensors 4640 may include, for example, an oxygen (e.g., $O_2$) sensor, but are not limited thereto and any suitable gas sensor may be utilized based on the desired application of the exhaust system 4600. Each of the gas sensors 4640 may be controlled by a dedicated controller 4645 that is separate from, for example, an existing controller of the vehicle exhaust system.

The catalytic converter/DPF 4690 may include one or more magnets 4670 located or arranged adjacent to or on an exterior surface of the catalytic converter/DPF 4690. The one or more magnets 4670 may be disposed in an array having alternating polarities as shown in FIG. 7. In one embodiment, the magnets 4670 facing each other may have opposing polarities. Alternatively, the one or more magnets 4670 may have the same polarity and the polarity may not vary along the longitudinal or horizontal direction of the catalytic converter/DPF 4690. Having magnets facing each other with opposite polarities results in a stronger magnetic field. In one embodiment, the plurality of magnets 4670 may include one or more neodymium magnets. In another embodiment, the one or more magnets 4670 may be electromagnets. However, any suitable magnets may be used depending on the desired application. It is understood that the one or more magnets 4670 may be located adjacent or on an exterior surface of other components of the exhaust system, such as the SCR 4694, muffler 4696, and/or exhaust pipes 4692.

Additionally, gas sensors 4640 may be coupled external to one or more components of the exhaust system 4600. In FIG. 46, a first gas sensor 4640 is coupled to the catalytic converter/DPF 4690 and a second gas sensor 4640 is couple to an exhaust pipe 4692 attached to an outlet port of the catalytic converter/DPF 4690. The gas sensors 4640 may include, for example, an oxygen (e.g., $O_2$) sensor, but are not limited thereto and any suitable gas sensor may be utilized based on the desired application of the exhaust system 4600. Each of the gas sensors 4640 may be controlled by a dedicated controller 4645 that is separate from, for example, an existing controller of the vehicle exhaust system.

Additionally, temperature sensors 4450 may be coupled externally to one or more components of the exhaust system 4600. For example, as illustrated in FIG. 46, a temperature sensor 4650 is coupled externally to an exhaust pipe 4692 attached to an outlet port of the catalytic converter/DPF 4690. Temperature sensor 4650 may also function as an altitude sensor.

Additionally, the exhaust system may be coupled to a controller 4680. The controller 4680 may receive signals from the temperature sensors 4650 to controls the external heater 4610. Further, the controller 4680 may receive signals from the temperature sensors 4650 to control the dosing system 4630. For example, when a predetermined temperature in the catalytic converter/DPF 4690 is detected by the temperature sensor 4650, the controller 4680 may send command signals to the dosing system 4630 to inject or shoot dosing solution into the catalytic converter/DPF 4690. In one embodiment, the dosing system 4630 may continuously inject dosing solution supplied by the dosing solution tank 4635 into the catalytic converter/DPF 4690 at a predetermined interval if the temperature sensor 4650 detects that a predetermined temperature is maintained. Alternatively, the temperature sensor 4650 may be configured to detect a predetermined temperature range, for example, about 340 to 410 degrees Celsius. In other words, the dosing solution injected into the catalytic converter/DPF 4690 at the predetermined temperature or the predetermined temperature range may improve reduction or removal of harmful gases (e.g., NOx, etc.) in the catalytic converter/DPF 4690.

In one embodiment, the gas sensors 4640 may transmit data related to the condition or state of the exhaust gas to the dedicated controller 4645. Accordingly, the controller 4645 may utilize the received gas data to monitor the effectiveness of the catalytic converter/DPF 4690 and to perform appropriate functions to achieve desirable performance of the catalytic converter/DPF 4690.

FIG. 34 illustrates an exhaust system 3400 for a coal burning apparatus, device or the like. The exhaust system 3400 includes a housing 3402. Sequentially, within the housing 3402 is a first selective catalytic reduction filtration system (SCR) 3406 directly downstream of an inlet 3404, a first electric heater 3408, a second SCR 3410, a second heater 3412 and another filter 3413 with a honeycomb structure. Additionally, dispersed about the interior of the housing 3402, near the internal sidewall is a plurality of magnets 3415. The design and properties of the SCR 3406, 3410 and heaters 3408, 3412 may be substantially similar to the foregoing embodiments discussed above with regard to the gasoline and diesel exhaust systems 1600, 3100, and as such the substantially similar features are incorporated by references as part of the exhaust system 3400.

Downstream of the exhaust system 3400 in FIG. 34 is a first electric blower 3414, a plurality of filters 3416 that include a honeycomb structure 3517 (see details in FIGS. 35A and 35B), chutes 3219 that direct unburned particles (e.g., coal) to a waste bin 3418 in which the unburned particles are disposed, an additional metal filtration system 3420, a second electric blower 3432 and a smoke stack 3424 through which clean gases exit into the environment.

Figure 36:
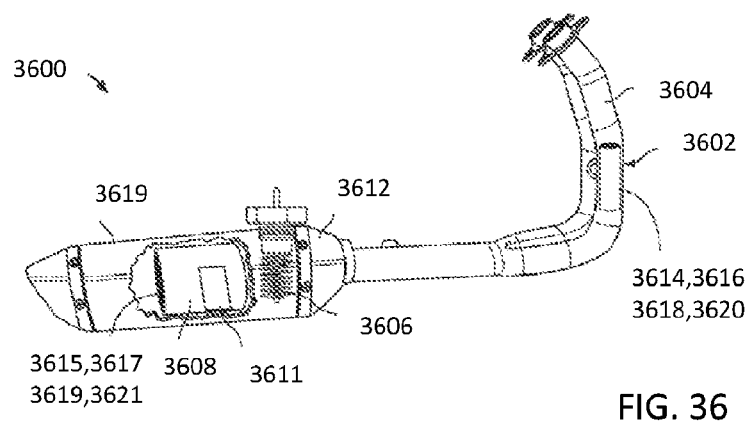
FIG. 36 is an exhaust system for a motorcycle, according to one or more embodiments of the present disclosure.

FIG. 36 depicts an exhaust system 3600 for a motorcycle. As shown in FIG. 36, a first selective catalytic reduction filtration system (SCR) 3602 may be arranged within an exhaust tubing 3604 and an electric heater 3606 and a second SCR 3608 may be arranged within an exhaust housing 3609. As shown in FIG. 36, the heater 3606 may be arranged to extend within the housing 3609 near an inlet 3612 of the housing 3609 with the second SCR 3608 located downstream of the heater 3606. In one embodiment, the first SCR 3602 and the second SCR 3608 may include copper ceramic. The heater 3606 may be configured to operate using the desired voltage (e.g., 6-45 amps) of the vehicle.

The first and second SCR 3602, 3608, like the SCR of the foregoing embodiments discussed above, are configured to reduce nitrogen oxide gases by oxidizing the nitrogen oxide gases and converting them into harmless exhaust emissions that are emitted out of the exhaust system 3600 and into the environment with or without the need to introduce a liquid-reductant agent into the selective catalytic reduction filtrations systems 3602, 3608. The first and second SCRs 3602, 3608 each, respectively, may include a filter 3614, 3615 that may include a plurality of honeycomb shaped openings coated with one or more noble metals 3616, 3617, a plurality of rods 3618, 3619 formed of a metal or alloy that may extend longitudinally through the honeycomb structure and one or more magnets 3620, 3621. Additionally or alternatively, the rods 3618, 3619 may extend to traverse about the filter 3614, 3615. The rods 3618, 3619 and noble metal coating 3616, 3617 (such as described above in FIG. 2B) facilitates rapid heating of the first and second SCRs 3602, 3608, and ensure the internal temperature across the filters 3614, 3615 is maintained. The magnets 3620, 3621 may be arranged and disbursed within the filters 3614, 3615 to aid, through their polarity, to further disrupt and slow the flow of exhaust gases and particulates as they pass over the filters 3614, 3615 by increasing the electric current in the vicinity of the magnets 3620, 3621 to allow for heating of the exhaust gases for a longer period of time within each respective selective catalytic reduction system 3602, 3608 and in turn further oxidization and reduction of toxic byproducts of exhaust gases. Additionally or alternatively, the placement of the magnets 3620, 3621 within the filter 3614, 3615, the magnets 3620, 3621 may be arranged adjacent to the filters 3614, 3615 and/or external each respective selective catalytic reduction system 3602, 3608 housing. While two selective catalytic reduction systems 3602, 3608 are shown, exhaust system 3600 may include a single selective catalytic reduction system 3608 in the housing 3609.

Figure 37:
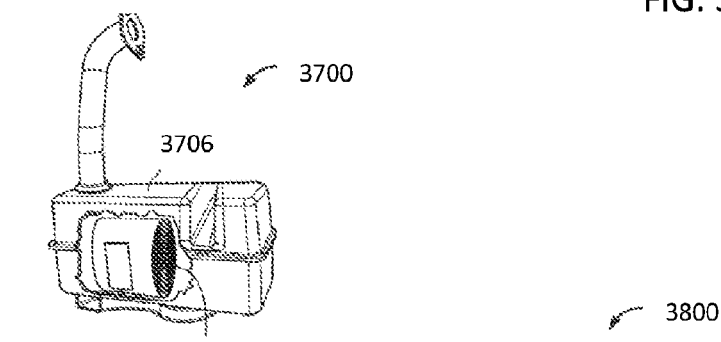
FIG. 37 is an exhaust system for a lawnmower, according to one or more embodiments of the present disclosure.

FIG. 37 depicts an exhaust system 3700 for a lawnmower. As shown, an electric heater 3702 and a selective catalytic reduction filtration system 3704 may be arranged within an exhaust housing 3706. The heater 3702 may be arranged to extend within the housing 3706 upstream within the housing 3706 with the SCR 3704 located downstream of the heater 3702. The heater 3702 may be configured to operate using the desired voltage (e.g., 6-45 amps) of the vehicle. When the lawnmower and/or another machine do not operate on a battery the heat may be supplied by the engine instead of using a heater.

The SCR 3704 like the selective catalytic reduction filtration systems discussed above, may be configured to reduce nitrogen oxide gases by oxidizing and converting them into harmless exhaust emissions that are emitted out of the exhaust system 3700 and into the environment with or without the need to introduce a liquid-reductant agent into the selective catalytic reduction filtration system 3704. The selective catalytic reduction system 3704 includes a filter 3708 that may include, similar to the foregoing embodiments, a plurality of honeycomb shaped openings, may be coated with one or more noble metals 3710 (such as described above in FIG. 2B), includes a plurality of rods 3712 formed of a metal or alloy that extend longitudinally through the honeycomb structure and one or more magnets 3714 arranged within the filter 3708. The heater 3702, rods 3712, metal coating 3710 and magnets 3714 may operate similar to the function(s) as discussed above with regard to the exhaust systems of the foregoing embodiments of the present disclosure. Additionally or alternatively, the magnets 3714 may be arranged adjacent to the filters 3708 and/or external the housing 3706 of the exhaust system 3700.

Figure 38:
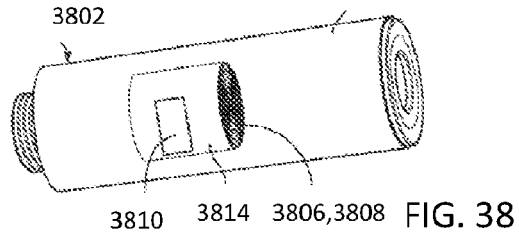
FIG. 38 is a non-battery operated exhaust system, according to one or more embodiments of the present disclosure.

FIG. 38 depicts an exhaust system 3800 for a non-battery operated machinery that utilizes a fossil fuel. As shown, a selective catalytic reduction filtration system 3802, which may or may not utilize a liquid-reductant agent, includes a filter 3804 that may be arranged within a housing 3803 and that may include a plurality of honeycomb shaped openings, may be coated with one or more noble metals 3806 (such as described above in FIG. 2B), and may include a plurality of rods 3808 formed of a metal or alloy that extend longitudinally through the honeycomb structure and one or more magnets 3810 arranged within the filter 3804. The rods 3808, metal coating 3806 and magnets 3810 may perform substantially similar function(s) as discussed above with regard to the exhaust systems of the foregoing embodiments with the difference with respect to the exhaust system 3800 that the elements may not be heated within the housing 3803. Additionally or alternatively to the placement of the one or more magnets 3810 within the filter 3804, the magnets 3810 may be arranged adjacent to the filters 3804 and/or external to the housing 3803 of the exhaust system 3800.

The embodiment shown in FIG. 39 illustrates an exhaust system for a power plant and steel plant or any similar plants having a smokestack, such as an exhaust system for a coal burning apparatus, device or the like. Those features shared with FIG. 34 will not be re-discussed here.

The new features of FIG. 39 include a coal burning and steel manufacturer and any other manufacturing facility that uses a smoke exhaust system 3100 having, among others, a dosing system that focuses on oxides of nitrogen (NOx) reduction capabilities to support application ranges from low to high flow selective catalytic reduction (SCR) dosing applications, and numerous other features of the smoke stack for reducing emission of sulfur dioxide ($SO_2$) and NOx from the power plant.

The dosing system may include, among other features, a dosing solution tank 003, controller 001, and a dosing solution injector 0035. The dosing solution tank 003 may contain a dosing solution of, for example, urea, salt water, or ammonia, among other possible solutions. The dosing solution facilitates reduction of nitrogen oxides present in the system and is preferably injected as an aqueous reducing agent into the exhaust gas upstream of an SCR catalytic converter.

The dosing solution tank 003 includes a fill opening with cap and a pump 002 coupled to the controller 001. The dosing solution tank 003 is not limited to any particular size, e.g., 500 gallons, 2000 gallons, or any desired size. The output of the pump is coupled to the dosing injector 0035. The dosing injector 0035 may be an off the shelf injector to meet the system requirements or a custom designed injector based on the system requirements. The controller 001 may also include system wiring for power, data, and communications, although wireless coupling of the data and communication are also contemplated.

As previously described herein, one or more heaters may be added to the selective catalytic reduction (SCR) filtration system. Additionally, any added heater may be paired with a dosing injector 0035 at one or more of the locations such that the injected treatment solution passes through the heater. The coal burning exhaust system may also include at least one sensor, such as a gas temperature (heat) sensor or an $O_2$ flow sensor. Other embodiments may have one or both of a gas temperature (heat) sensor or an $O_2$ flow sensor at one or more of the locations. The output of each of these sensors is received by the control unit to determine the temperature of the heaters and/or the duty cycle of the injectors. The dosed treatment solution (e.g., dose) may be sent from the controller 001 through feeder line 09, and dose overflow and air are bled through dose overflow line 08. Likewise, the tank may have an overflow and air bleed line 008, or similar pressure-control valve for controlling the flow of the dosed treatment solution.

As shown in FIG. 39, the dosing injector 0035 provides dosing solution (e.g., urea, salt water or ammonia) to the heater which has been heated to a sufficient vaporizing temperature depending on the environment and system. The dosing solution is vaporized and thus produces steam into the system. This lowers the combustion temperature, which if low enough, reduces the concentration of thermal NOx formed. The temperature of the heater and the active time of the treatment solution injection may be monitored and controlled by the controller 001. For example, the most efficient heater temperature would be from 400 degrees F. up to any desired temperature, such as a maximum of 1800 degrees F. For example, the active time of the dosing solution injection is typically one dose for every minutes. The number of injections may vary, including multiple dose injections depending on the system. The time may vary, including more or less than every 15 minute depending on the system. But the system will work at a lower or higher concentration.

Similar to the exhaust system of FIG. 34, but with additions, FIG. 39 illustrates a plurality of filters 300/400/500 that include a honeycomb structures and chutes that direct unburned particles (e.g., coal) to a waste bin 4000 in which the unburned particles are disposed, an additional metal filtration system 400, a second electric blower 601, and a smoke stack through which clean gases exit into the environment.

The smoke stake of FIG. 39 may include a dual shell design to improve efficiency and environmental considerations. Specifically, the smoke stack of FIG. 39 includes an inner and an outer shell separated by gap in which fresh air is blown utilizing blower motor 39602 and fresh air feeder pipes 000. This air passage cools the second (outer) shell of the smoke stack. The dual shell smoke stack may be defined by an inner stack 92 through which all the exhaust from the exhaust system is passed, and an outer shell 90 which is exposed on one side to the outside environment, as well as an air void 80 located between the inner stack 92 and outer shell 90 that allows fresh air to be blown there through keeping the outer shell 90 relatively cool to the environment. The inner shell may also include a heat pad 93 to assist in keeping the heat within the inner shell.

FIG. 40 shows a top view of the smoke stack and helps to illustrate the exhaust duct 4, the heat pad 3 (93), the inner duct 1 (92), and fresh air opening 2 between the inner duct 1 and the outer duct. The inner duct 1 may be formed with steel as opposed to the more expensive brick construction. The heat pad 3 may include an aluminum backing and be installed to the inner duct 1 withstanding temperatures up to 2200 F or higher.

As noted above, the foregoing design eliminates the high cost of brick constructed smoke stack, which deteriorate over time. The inner duct 1 along with the heat pad 3 keeps the heat concentrate to the inside where the exhaust can continue to be processed. Furthermore, the fresh air gap before the second duct means the outwardly facing second duct is low temperature, safe to touch by environmental organisms (e.g., birds), has less mechanical upkeep, and does not deteriorate quickly due to large temperature fluctuations. For convenience, the following list identifies the features disclosed in FIG. 39 according to an embodiment of the invention:

- 001—controller
- 002—dose level controller and dose liquid pump to controller
- 003—dosing solution tank
- 008—overflow line and air bleeder
- 08—dose overflow line from dosing injector
- 09—feeder line
- 0035—dosing injector
- 12—heat sensor
- 10—wires (e.g., positive electrical connecter wires and negative)
- 79—main electrical box and safety box
- 400—SCR noble metallic coated SCR filter with a heater same time for NOx
- 300—ceramic noble metallic filter (e.g., serves same purpose as oxidation catalytic)
- 500—heated ceramic particular filter
- 13—heat sensor and safety sensor
- 39600—blower motor (e.g., variable blower motor)
- 14—steam and temperature sensor
- 25—electrical heater
- 26—SCR metallic catalytic converter system
- 27—particulate filter
- 28—NOx storage filter
- 010—negative electrical cable
- 3000—second filter housing
- 4000—dust and unburned coil dust collector
- 00—fresh air feeder pipes for the second opening of smoke duck
- 39601—second blower motor
- 39602—blower motor for the fresh air between the main smoke duck and second housing
- 89—first housing smoke duct opening
- 90—second outer shell smoke duct
- 80—between the 2-shell opening for fresh air blowers true to keep the outer shell cooler
- 93—heat pat (e.g., with aluminum backer installation to the first smoke duct)
- 7000—magnet(s)
- 8000—heat pad
- 9000—inner shell
- 0112—outer shell For convenience, the following list identifies the features disclosed in FIG. 40, which illustrates a top view of the smokestack shown in FIG. 40 according to an embodiment of the invention:

1—inner steel smoke duct housing
2—fresh air duct opening
3—heat pad with aluminum wrap (attached to the inner shell)
4—first body smoke duct housing opening The foregoing description and accompanying drawings illustrate principles, exemplary embodiments, and modes of operation of the present invention. However, the present invention should not be construed as being limited to the particular embodiments disclosed herein. Variations to the embodiments discussed above will be appreciated by those skilled in the art without departing from the scope of the invention. Accordingly, the above-described embodiments and accompanying drawings should be regarded as illustrative rather than restrictive.

What is claimed is:

1. An assembly for improving an exhaust system comprising:
    a heater configured to be coupled to a controller, the heater configured to be connected to the exhaust system to heat exhaust gases, the heater comprising:
        a housing,
        a connection pipe configured to connect the heater to a component of the exhaust system,
        a heating element coupled to the controller,
        a temperature sensor to detect a temperature inside the housing and transmit a corresponding signal to the controller, and
        a dosing solution injector coupled to the temperature sensor via the controller, the dosing solution injector configured to spray a dosing solution inside the housing based on the transmitted signal to generate vapor to flow through the connection pipe to the component;
    a magnet configured to be arranged adjacent to an exterior surface of the component to generate a magnetic field inside the component and aid in disruption and slowing of a flow of the exhaust gases in the component; and
    a second heater arranged to heat the exhaust gases prior to the exhaust gases flowing through an inlet port of the component or after the exhaust gases have passed through an outlet port of the component.

2. The assembly of claim 1, wherein the component is one or more of the following: a catalytic converter, a diesel oxidation catalyst, a diesel particulate filter (DPF), and a selective catalytic reduction system (SCR).

3. The assembly of claim 1, wherein the component is two or more of the following: a catalytic converter, a diesel oxidation catalyst, a diesel particulate filter (DPF), and a selective catalytic reduction system (SCR).

4. The assembly of claim 1, further comprising a dosing solution reservoir that houses the dosing solution and is coupled to the dosing solution injector.

5. The assembly of claim 1, further comprising a dosing solution distributor located downstream of the dosing solution injector and configured to distribute the dosing solution spray, sprayed by the dosing solution injector.

6. The assembly of claim 1, further comprising a gas sensor configured to be coupled to the component to transmit a corresponding signal to the controller.

7. The assembly of claim 1, wherein the controller is a dedicated controller configured to control the assembly.

8. The assembly of claim 1, wherein the heating element is a heating wire.

9. The assembly of claim 1, wherein the second heater comprises:
    a second heater housing;
    a first terminal and a second terminal configured to be electrically coupled to a power supply via an exterior of the second heater housing;
    a heating wire coupled to the first and second terminals;
    a filter affixed within the second heater housing; and
    a plurality of heating rods inserted through one or more openings in the filter, the heating rods configured to conduct heat from the heating wire to the filter, at least one of the heating rods to support the heating wire disposed outside of the filter, wherein the plurality of heating rods are configured to conduct heat from the heating wire to the filter.

10. The assembly of claim 9, wherein the second heater is configured to receive first signals from the controller to control an amount of current supplied to the second heater and a timing in which the current is supplied to the second heater, whereby the supplied current and the timing are based on one or more sensors located within the exhaust system or the second heater.

11. The assembly of claim 9, wherein one or more of the plurality of heating rods extend through two ends of the filter.

12. The assembly of claim 9, wherein the second heater housing includes a second heating wire displaced from the heating wire.

13. The assembly of claim 12, wherein the heating wire and the second heating wire are displaced in two parallel planes.

14. The assembly of claim 9, wherein one or more of the plurality of heating rods comprise a rod portion and a tip portion.

15. The assembly of claim 14, wherein the one or more tip portions are formed at ends of one or more of the plurality of the heating rods.

16. The assembly of claim 15, wherein the one or more tip portions are configured to conduct heat from the heating wire to the filter.

17. The assembly of claim 16, further comprising: one or more fasteners disposed at the one or more tip portions, the fastener configured to support the heating wire.

18. The assembly of claim 17, wherein the one or more fasteners are formed of an insulative material such that electrical current does not transfer from the heating wire to the heating rod.

19. The assembly of claim 9, wherein the heating rods comprise at least two lengths.

20. The assembly of claim 1, further comprising a second temperature sensor to detect a temperature in the component and transmit a corresponding signal to the controller, wherein the controller is configured to transmit a signal to the dosing solution injector to spray the dosing solution when a predetermined temperature in the component is detected.

21. A method for installing an assembly for improving an exhaust system comprising:
    attaching a heater configured to be coupled to a controller, the heater configured to be connected to the exhaust system to heat exhaust gases, the heater comprising:

a housing,
a connection pipe configured to connect the heater to a component of the exhaust system,
a heating element coupled to the controller,
a temperature sensor to detect a temperature inside the housing and transmit a corresponding signal to the controller, and
a dosing solution injector coupled to the temperature sensor via the controller, the dosing solution injector configured to spray a dosing solution inside the housing based on the transmitted signal to generate vapor to flow through the connection pipe to the component;
attaching a magnet configured to be arranged adjacent to an exterior surface of the component to generate a magnetic field inside the component and aid in disruption and slowing of a flow of the exhaust gases in the component; and
attaching a second heater to heat the exhaust gases prior to the exhaust gases flowing through an inlet port of the component or after the exhaust gases have passed through an outlet port of the component.

22. The method of claim 21, wherein the exhaust system is a vehicle exhaust system, and the component is one or more of the following: a catalytic converter, a diesel oxidation catalyst, a diesel particulate filter (DPF), and a selective catalytic reduction system (SCR).

23. The method of claim 21, wherein the second heater comprises:
a second heater housing;
a first terminal and a second terminal configured to be electrically coupled to a power supply via an exterior of the second heater housing;
a heating wire coupled to the first and second terminals;
a filter affixed within the second heater housing; and
a plurality of heating rods inserted through one or more openings in the filter, the heating rods configured to conduct heat from the heating wire to the filter, at least one of the heating rods to support the heating wire disposed outside of the filter, wherein the plurality of heating rods are configured to conduct heat from the heating wire to the filter.

24. The method of claim 23, wherein the second heater is configured to receive first signals from the controller to control an amount of current supplied to the second heater and a timing in which the current is supplied to the second heater, whereby the supplied current and the timing are based on one or more sensors located within the exhaust system or the second heater.

25. The method of claim 21, further comprising a second temperature sensor to detect a temperature in the component and transmit a corresponding signal to the controller, wherein the controller is configured to transmit a signal to the dosing solution injector to spray the dosing solution when a predetermined temperature in the component is detected.

26. A method for improving an exhaust system comprising:
receiving, at a heater, a current in response to a signal from a controller;
generating heat, via the heater, inside a component of the exhaust system;
injecting, via a dosing solution injector, a dosing solution into the heater;
generating, by the heater, a vapor comprising the dosing solution;
directing, by the heater, the vapor into the component;
generating, by a magnet, a magnetic field inside the component;
disrupting and slowing, by the magnet and magnetic field, an exhaust gas flow in the component; and
generating heat, via a second heater arranged within the exhaust system to heat the exhaust gases prior to the exhaust gases flowing through an inlet port of the component or after the exhaust gases have passed through an outlet port of the component.

27. The method of claim 26, wherein the heater comprises a plurality of heating elements.

28. The method of claim 27 further comprising:
generating, by a heat sensor, a temperature signal corresponding to a temperature of the heater;
transmitting, by the heat sensor, the temperature signal to the controller; and
receiving, by the heater, a second current based on the temperature signal.

29. The method of claim 28 further comprising:
generating, by a gas sensor, a gas signal corresponding to a composition of the exhaust gas flow within the component;
transmitting, by the gas sensor, the gas signal to the controller; and
receiving, by the heater, a third current based on the gas signal and the temperature signal.

30. The method of claim 29 further comprising:
generating, by a second gas sensor, a second gas signal corresponding to a second composition of the exhaust gas flow within a second component;
transmitting, by the second gas sensor, the second gas signal to the controller; and
receiving, by the heater, a fourth current based on the gas signal, the second gas signal, and the temperature signal.

31. The method of claim 26, wherein the second heater comprises:
a second heater housing;
a first terminal and a second terminal configured to be electrically coupled to a power supply via an exterior of the second heater housing;
a heating wire coupled to the first and second terminals;
a filter affixed within the second heater housing; and
a plurality of heating rods inserted through one or more openings in the filter, the heating rods configured to conduct heat from the heating wire to the filter, at least one of the heating rods to support the heating wire disposed outside of the filter, wherein the plurality of heating rods are configured to conduct heat from the heating wire to the filter.

32. The method of claim 31, wherein the second heater is configured to receive first signals from the controller to control an amount of current supplied to the second heater and a timing in which the current is supplied to the second heater, whereby the supplied current and the timing are based on one or more sensors located within the exhaust system or the second heater.

33. The method of claim 26, further comprising a second temperature sensor to detect a temperature in the component and transmit a corresponding signal to the controller, wherein the controller is configured to transmit a signal to the dosing solution injector to spray the dosing solution when a predetermined temperature in the component is detected.

* * * * *